United States Patent
Anderson et al.

(10) Patent No.: US 7,680,836 B2
(45) Date of Patent: Mar. 16, 2010

(54) SYSTEMS AND METHODS FOR A SNAPSHOT OF DATA

(75) Inventors: Robert J. Anderson, London (GB);
Neal T. Fachan, Seattle, WA (US);
Justin M. Husted, Seattle, WA (US);
Eric M. Lemar, Seattle, WA (US);
Aaron J. Passey, Seattle, WA (US);
Darren P. Schack, Seattle, WA (US)

(73) Assignee: Isilon Systems, Inc., Seattle, WA (US)

( * ) Notice: Subject to any disclaimer, the term of this patent is extended or adjusted under 35 U.S.C. 154(b) by 504 days.

(21) Appl. No.: 11/506,610

(22) Filed: Aug. 18, 2006

(65) Prior Publication Data

US 2008/0046476 A1 Feb. 21, 2008

(51) Int. Cl.
G06F 7/00 (2006.01)
G06F 17/00 (2006.01)
G06F 12/00 (2006.01)
G06F 17/30 (2006.01)

(52) U.S. Cl. ...................... 707/202; 707/204
(58) Field of Classification Search ................. 707/200, 707/101, 2, 8, 102, 202
See application file for complete search history.

(56) References Cited

U.S. PATENT DOCUMENTS

| | | | |
|---|---|---|---|
| 5,163,131 A | 11/1992 | Row et al. | |
| 5,181,162 A | 1/1993 | Smith et al. | |
| 5,212,784 A | 5/1993 | Sparks | |
| 5,230,047 A | 7/1993 | Frey et al. | |
| 5,251,206 A | 10/1993 | Calvignac et al. | |
| 5,258,984 A | 11/1993 | Menon et al. | |
| 5,329,626 A | 7/1994 | Klein et al. | |

(Continued)

FOREIGN PATENT DOCUMENTS

EP 0774723 5/1997

(Continued)

OTHER PUBLICATIONS

Nov. 15, 2002 International Search Report PCT/US02/24728.

(Continued)

*Primary Examiner*—James Trujillo
*Assistant Examiner*—Bruce M Moser
(74) *Attorney, Agent, or Firm*—Knobbe, Martens, Olson & Bear, LLP

(57) ABSTRACT

In one embodiment, a user or client device is connected to a distributed file system comprised of one or more physical nodes. The data on each of the physical nodes store metadata about files and directories within the file system. Some of the embodiments permit a user to take a snapshot of data stored on the file system. The snapshot may include a single file, a single directory, a plurality of files within a directory, a plurality of directories, a path on the file system that includes nested files and subdirectories, or more than one path on the file system that each include nested files and directories. According to one embodiment, the system stores representations of the snapshots that govern a file or directory and its descendants within metadata associated with that file or directory. Before modifying a file or directory, the system updates the representations of the governing snapshots by traversing the metadata of ancestors of the file or directory.

18 Claims, 31 Drawing Sheets

U.S. PATENT DOCUMENTS

| | | |
|---|---|---|
| 5,359,594 A | 10/1994 | Gould et al. |
| 5,403,639 A | 4/1995 | Belsan et al. |
| 5,548,724 A | 8/1996 | Akizawa et al. |
| 5,596,709 A | 1/1997 | Bond et al. |
| 5,612,865 A | 3/1997 | Dasgupta |
| 5,649,200 A | 7/1997 | Leblang et al. |
| 5,657,439 A | 8/1997 | Jones et al. |
| 5,668,943 A | 9/1997 | Attanasio et al. |
| 5,680,621 A | 10/1997 | Korenshtein |
| 5,694,593 A | 12/1997 | Baclawski |
| 5,696,895 A | 12/1997 | Hemphill et al. |
| 5,734,826 A | 3/1998 | Olnowich et al. |
| 5,761,659 A | 6/1998 | Bertoni |
| 5,774,643 A | 6/1998 | Lubbers et al. |
| 5,799,305 A | 8/1998 | Bortvedt et al. |
| 5,805,578 A | 9/1998 | Stirpe et al. |
| 5,805,900 A | 9/1998 | Fagen et al. |
| 5,806,065 A | 9/1998 | Lomet |
| 5,822,790 A | 10/1998 | Mehrotra |
| 5,862,312 A | 1/1999 | Mann |
| 5,870,563 A | 2/1999 | Roper et al. |
| 5,878,410 A | 3/1999 | Zbikowski et al. |
| 5,878,414 A | 3/1999 | Hsiao et al. |
| 5,884,046 A | 3/1999 | Antonov |
| 5,884,098 A | 3/1999 | Mason, Jr. |
| 5,884,303 A | 3/1999 | Brown |
| 5,890,147 A | 3/1999 | Peltonen et al. |
| 5,933,834 A | 8/1999 | Aichelen |
| 5,943,690 A | 8/1999 | Dorricott et al. |
| 5,966,707 A | 10/1999 | Van Huben et al. |
| 5,996,089 A | 11/1999 | Mann |
| 6,021,414 A | 2/2000 | Fuller |
| 6,029,168 A | 2/2000 | Frey |
| 6,038,570 A | 3/2000 | Hitz et al. |
| 6,044,367 A | 3/2000 | Wolff |
| 6,055,543 A | 4/2000 | Christensen et al. |
| 6,070,172 A | 5/2000 | Lowe |
| 6,081,833 A | 6/2000 | Okamoto et al. |
| 6,081,883 A | 6/2000 | Popelka et al. |
| 6,108,759 A | 8/2000 | Orcutt et al. |
| 6,117,181 A | 9/2000 | Dearth et al. |
| 6,122,754 A | 9/2000 | Litwin et al. |
| 6,138,126 A | 10/2000 | Hitz et al. |
| 6,154,854 A | 11/2000 | Stallmo |
| 6,173,374 B1 | 1/2001 | Heil et al. |
| 6,209,059 B1 | 3/2001 | Ofer et al. |
| 6,219,693 B1 | 4/2001 | Napolitano et al. |
| 6,449,730 B2 | 9/2001 | Mann |
| 6,321,345 B1 | 11/2001 | Mann |
| 6,334,168 B1 | 12/2001 | Islam et al. |
| 6,353,823 B1 | 3/2002 | Kumar |
| 6,384,626 B2 | 5/2002 | Tsai et al. |
| 6,385,626 B1 | 5/2002 | Tamer et al. |
| 6,393,483 B1 | 5/2002 | Latif et al. |
| 6,397,311 B1 | 5/2002 | Capps |
| 6,405,219 B2 | 6/2002 | Saether et al. |
| 6,408,313 B1 | 6/2002 | Campbell et al. |
| 6,434,574 B1 | 8/2002 | Day et al. |
| 6,453,389 B1 | 9/2002 | Weinberger et al. |
| 6,457,139 B1 | 9/2002 | D'Errico et al. |
| 6,463,442 B1 | 10/2002 | Bent et al. |
| 6,499,091 B1 | 12/2002 | Bergsten |
| 6,502,172 B2 | 12/2002 | Chang |
| 6,502,174 B1 | 12/2002 | Beardsley et al. |
| 6,523,130 B1 | 2/2003 | Hickman et al. |
| 6,526,478 B1 | 2/2003 | Kirby |
| 6,546,443 B1 | 4/2003 | Kakivaya et al. |
| 6,549,513 B1 | 4/2003 | Chao et al. |
| 6,557,114 B2 | 4/2003 | Mann |
| 6,567,894 B1 | 5/2003 | Hsu et al. |
| 6,567,926 B2 | 5/2003 | Mann |
| 6,571,244 B1 | 5/2003 | Larson |
| 6,571,349 B1 | 5/2003 | Mann |
| 6,574,745 B2 | 6/2003 | Mann |
| 6,594,655 B2 | 7/2003 | Tal et al. |
| 6,594,660 B1 | 7/2003 | Berkowitz et al. |
| 6,598,174 B1 | 7/2003 | Parks et al. |
| 6,618,798 B1 | 9/2003 | Burton et al. |
| 6,662,184 B1 | 12/2003 | Friedberg |
| 6,671,686 B2 | 12/2003 | Pardon et al. |
| 6,671,704 B1 | 12/2003 | Gondi et al. |
| 6,732,125 B1 | 5/2004 | Autrey et al. |
| 6,848,029 B2 | 1/2005 | Coldewey |
| 6,895,534 B2 | 5/2005 | Wong et al. |
| 6,907,011 B1 | 6/2005 | Miller et al. |
| 6,917,942 B1 | 7/2005 | Burns et al. |
| 6,922,696 B1 | 7/2005 | Lincoln et al. |
| 6,934,878 B2 | 8/2005 | Massa et al. |
| 6,940,966 B2 | 9/2005 | Lee |
| 6,954,435 B2 | 10/2005 | Billhartz et al. |
| 6,990,604 B2 | 1/2006 | Binger |
| 7,007,044 B1 | 2/2006 | Rafert et al. |
| 7,007,097 B1 | 2/2006 | Huffman et al. |
| 7,017,003 B2 | 3/2006 | Murotani et al. |
| 7,043,485 B2 | 5/2006 | Manley et al. |
| 7,069,320 B1 | 6/2006 | Chang et al. |
| 7,111,305 B2 | 9/2006 | Solter et al. |
| 7,124,264 B2 | 10/2006 | Yamashita |
| 7,146,524 B2 | 12/2006 | Patel et al. |
| 7,152,182 B2 | 12/2006 | Ji et al. |
| 7,177,295 B1 | 2/2007 | Sholander et al. |
| 7,184,421 B1 | 2/2007 | Liu et al. |
| 7,228,299 B1 | 6/2007 | Harmer et al. |
| 7,240,235 B2 | 7/2007 | Lewalski-Brechter |
| 7,249,118 B2 | 7/2007 | Sandler et al. |
| 7,257,257 B2 | 8/2007 | Anderson et al. |
| 7,313,614 B2 | 12/2007 | Considine et al. |
| 7,318,134 B1 | 1/2008 | Oliveira et al. |
| 7,373,426 B2 | 5/2008 | Jinmei et al. |
| 7,440,966 B2 | 10/2008 | Adkins et al. |
| 7,451,341 B2 | 11/2008 | Okaki et al. |
| 7,509,448 B2 | 3/2009 | Fachan et al. |
| 7,533,298 B2 | 5/2009 | Smith et al. |
| 2001/0047451 A1 | 11/2001 | Noble et al. |
| 2002/0010696 A1 | 1/2002 | Izumi |
| 2002/0035668 A1 | 3/2002 | Nakano et al. |
| 2002/0038436 A1 | 3/2002 | Suzuki |
| 2002/0055940 A1 | 5/2002 | Elkan |
| 2002/0072974 A1 | 6/2002 | Pugliese et al. |
| 2002/0075870 A1 | 6/2002 | de Azevedo et al. |
| 2002/0078180 A1 | 6/2002 | Miyazawa |
| 2002/0083078 A1 | 6/2002 | Pardon et al. |
| 2002/0083118 A1 | 6/2002 | Sim |
| 2002/0087366 A1 | 7/2002 | Collier et al. |
| 2002/0095438 A1 | 7/2002 | Rising et al. |
| 2002/0124137 A1 | 9/2002 | Ulrich et al. |
| 2002/0138559 A1 | 9/2002 | Ulrich et al. |
| 2002/0156840 A1 | 10/2002 | Ulrich et al. |
| 2002/0156891 A1 | 10/2002 | Ulrich et al. |
| 2002/0156973 A1 | 10/2002 | Ulrich et al. |
| 2002/0156974 A1 | 10/2002 | Ulrich et al. |
| 2002/0156975 A1 | 10/2002 | Staub et al. |
| 2002/0161846 A1 | 10/2002 | Ulrich et al. |
| 2002/0161850 A1 | 10/2002 | Ulrich et al. |
| 2002/0161973 A1 | 10/2002 | Ulrich et al. |
| 2002/0163889 A1 | 11/2002 | Yemini et al. |
| 2002/0165942 A1 | 11/2002 | Ulrich et al. |
| 2002/0166026 A1 | 11/2002 | Ulrich et al. |
| 2002/0166079 A1 | 11/2002 | Ulrich et al. |
| 2002/0169827 A1 | 11/2002 | Ulrich et al. |
| 2002/0174295 A1 | 11/2002 | Ulrich et al. |
| 2002/0174296 A1 | 11/2002 | Ulrich et al. |
| 2002/0178162 A1 | 11/2002 | Ulrich et al. |
| 2002/0191311 A1 | 12/2002 | Ulrich et al. |

| | | |
|---|---|---|
| 2002/0194523 A1 | 12/2002 | Ulrich et al. |
| 2002/0194526 A1 | 12/2002 | Ulrich et al. |
| 2002/0198864 A1 | 12/2002 | Ostermann et al. |
| 2003/0005159 A1 | 1/2003 | Kumhyr |
| 2003/0014391 A1 | 1/2003 | Evans et al. |
| 2003/0033308 A1 | 2/2003 | Patel et al. |
| 2003/0109253 A1 | 6/2003 | Fenton et al. |
| 2003/0120863 A1 | 6/2003 | Lee et al. |
| 2003/0125852 A1 | 7/2003 | Schade et al. |
| 2003/0131860 A1 | 7/2003 | Ashcraft et al. |
| 2003/0135514 A1 | 7/2003 | Patel et al. |
| 2003/0149750 A1 | 8/2003 | Franzenburg |
| 2003/0158873 A1 | 8/2003 | Sawdon et al. |
| 2003/0163726 A1 | 8/2003 | Kidd |
| 2003/0172149 A1 | 9/2003 | Edsall et al. |
| 2003/0177308 A1 | 9/2003 | Lewalski-Brechter |
| 2003/0182325 A1 | 9/2003 | Manely et al. |
| 2004/0003053 A1 | 1/2004 | Williams |
| 2004/0024963 A1 | 2/2004 | Talagala et al. |
| 2004/0078812 A1 | 4/2004 | Calvert |
| 2004/0133670 A1 | 7/2004 | Kaminsky et al. |
| 2004/0143647 A1 | 7/2004 | Cherkasova |
| 2004/0153479 A1 | 8/2004 | Mikesell et al. |
| 2004/0189682 A1 | 9/2004 | Troyansky et al. |
| 2004/0199734 A1 | 10/2004 | Rajamani et al. |
| 2004/0205141 A1 | 10/2004 | Goland |
| 2004/0230748 A1 | 11/2004 | Ohba |
| 2004/0260673 A1* | 12/2004 | Hitz et al. ............... 707/1 |
| 2005/0066095 A1 | 3/2005 | Mullick et al. |
| 2005/0114402 A1 | 5/2005 | Guthrie |
| 2005/0114609 A1 | 5/2005 | Shorb |
| 2005/0131860 A1 | 6/2005 | Livshits |
| 2005/0171960 A1 | 8/2005 | Lomet |
| 2005/0171962 A1 | 8/2005 | Martin et al. |
| 2005/0188052 A1 | 8/2005 | Ewanchuk et al. |
| 2005/0192993 A1 | 9/2005 | Messinger |
| 2005/0289169 A1 | 12/2005 | Adya et al. |
| 2005/0289188 A1 | 12/2005 | Nettleton et al. |
| 2006/0004760 A1 | 1/2006 | Clift et al. |
| 2006/0041894 A1 | 2/2006 | Cheng |
| 2006/0059467 A1 | 3/2006 | Wong |
| 2006/0074922 A1 | 4/2006 | Nishimura |
| 2006/0083177 A1 | 4/2006 | Iyer et al. |
| 2006/0095438 A1 | 5/2006 | Fachan et al. |
| 2006/0101062 A1 | 5/2006 | Godman et al. |
| 2006/0129584 A1 | 6/2006 | Hoang et al. |
| 2006/0129631 A1 | 6/2006 | Na et al. |
| 2006/0129983 A1 | 6/2006 | Feng |
| 2006/0230411 A1 | 10/2006 | Richter et al. |
| 2006/0277432 A1 | 12/2006 | Patel |
| 2006/0288161 A1 | 12/2006 | Cavallo |
| 2007/0091790 A1 | 4/2007 | Passey et al. |
| 2007/0094269 A1 | 4/2007 | Mikesell et al. |
| 2007/0094277 A1 | 4/2007 | Fachan et al. |
| 2007/0094310 A1 | 4/2007 | Passey et al. |
| 2007/0094431 A1 | 4/2007 | Fachan |
| 2007/0094452 A1 | 4/2007 | Fachan |
| 2007/0168351 A1 | 7/2007 | Fachan |
| 2007/0171919 A1 | 7/2007 | Godman et al. |
| 2007/0195810 A1 | 8/2007 | Fachan |
| 2007/0233684 A1 | 10/2007 | Verma et al. |
| 2007/0233710 A1 | 10/2007 | Passey et al. |
| 2008/0005145 A1* | 1/2008 | Worrall ............... 707/101 |
| 2008/0010507 A1 | 1/2008 | Vingralek |
| 2008/0021907 A1 | 1/2008 | Patel et al. |
| 2008/0031238 A1 | 2/2008 | Harmelin et al. |
| 2008/0034004 A1* | 2/2008 | Cisler et al. ............... 707/200 |
| 2008/0044016 A1 | 2/2008 | Henzinger |
| 2008/0046432 A1 | 2/2008 | Anderson et al. |
| 2008/0046443 A1 | 2/2008 | Fachan et al. |
| 2008/0046444 A1 | 2/2008 | Fachan et al. |
| 2008/0046445 A1 | 2/2008 | Passey et al. |
| 2008/0046475 A1 | 2/2008 | Anderson et al. |
| 2008/0046476 A1 | 2/2008 | Anderson et al. |
| 2008/0046667 A1 | 2/2008 | Fachan et al. |
| 2008/0059541 A1 | 3/2008 | Fachan et al. |
| 2008/0126365 A1 | 5/2008 | Fachan et al. |
| 2008/0154978 A1 | 6/2008 | Lemar et al. |
| 2008/0168458 A1 | 7/2008 | Fachan et al. |
| 2008/0294611 A1 | 11/2008 | Anglin et al. |

FOREIGN PATENT DOCUMENTS

| | | |
|---|---|---|
| WO | WO 94/29796 | 12/1994 |
| WO | WO 00/57315 | 9/2000 |
| WO | WO 01/14991 | 3/2001 |
| WO | WO 01/33829 | 5/2001 |
| WO | WO 02/061737 | 8/2002 |
| WO | WO 03/012699 | 2/2003 |
| WO | WO 2004/046971 | 6/2004 |
| WO | WO 2008/021527 | 2/2008 |
| WO | WO 2008/021528 | 2/2008 |

OTHER PUBLICATIONS

Apr. 20, 2004 International Search Report PCT/US03/36699.
Aug. 6, 2004 International Search Report PCT/US03/33704.
European Search Report dated May 21, 2007 issued to EP application No. 02756944.1-2201.
Philip A. Bernstein, Vassos Hadzilacos, and Nathan Goodman, *Concurrency Control and Recovery in Database Systems*, Addison-Wesley, 1987.
Birk, Y., *Deterministic load-balancing schemes for disk-based video-on-demand storage servers*, Mass Storage Systems 1995; Storage—At the Forefront of Information Infrastructures', Proceedings of the Fourteenth IEEE Symposium on Monterey, CA, Sep. 11-14, 1995, pp. 17-25.
Kenneth P. Birman, *Building Secure and Reliable Network Applications*, Manning, 1996, pp. 1-327.
Kenneth P. Birman, *Building Secure and Reliable Network Applications*, Manning, 1996, pp. 328-619.
Coulouris et al., *Distributed Systems Concepts and Design*; Addison-Wesley, Second Edition, 1994, pp. 353-371 and 377-405.
Jim Gray and Andreas Reuter, *Transaction Processing: Concepts and Techniques*, Morgan Kaufmann, 1993, pp. 1-328.
Jim Gray and Andreas Reuter, *Transaction Processing: Concepts and Techniques*, Morgan Kaufmann, 1993, pp. 329-664.
Jim Gray and Andreas Reuter, *Transaction Processing: Concepts and Techniques*, Morgan Kaufmann, 1993, pp. 665-1105.
Nancy A. Lynch, *Distributed Algorithms*, Morgan Kaufmann, 1996, pp. 1-409.
Nancy A. Lynch, *Distributed Algorithms*, Morgan Kaufmann, 1996 pp. 410-871.
Sape Mullender, editor, *Distributed Systems* (2nd Ed.), ACM Press/Addison-Wesley Publishing Co., New York, NY, USA, 1993, pp. 1-327.
Sape Mullender, editor, *Distributed Systems* (2nd Ed.), ACM Press/Addison-Wesley Publishing Co., New York, NY, USA, 1993, pp. 328-604.
Gibson, Garth A. et al., *The Scotch Parallel Storage System*, IEEE, 1995, pp. 403-410.
Gerhard Weikum, et al., *Transactional Information Systems: Theory, Algorithms, and the Practice of Concurrency Control and Recovery*, Morgan Kaufmann, 2002, pp. 1-450.
Gerhard Weikum, et al., *Transactional Information Systems: Theory, Algorithms, and the Practice of Concurrency Control and Recovery*, Morgan Kaufmann, 2002, pp. 451-863.
Sanjay Ghemawat et al., *The Google File System*, Symposium on Operating Systems Principles, Oct. 19-22, 2003, 15 pages, Bolton Landing, NY.
Pei Cao et al., The TickerTAIP parallel RAID architecture, 1993, 12 pages, Princeton, NJ.
Pei Cao et al., The TickerTAIP parallel RAID architecture, ACM Transactions on Computer Systems, vol. 12, No. 3, Aug. 1994, 34 pages, Palto Alto, California.
Bob Duzett, et al., *An Overview of the nCube 3 Supercomputer*, IEEE, Jul. 1992, pp. 458-464.

John Henry Hartman, *The Zebra Striped Network File System*, (Sc.B. (Brown University) 1987, pp. 1-148.

Darrell D.E, Long et al., *Swift/RAID: A Distributed RAID System, Computing Systems*, vol. 7, No. 3 Summer 1994, pp. 333-359.

Michael Stonebraker et al., *Distributed Raid: A new Multiple copy Algorithm*, IEEE 1990, pp. 430-434, Berkeley, California.

Stallings, William, *Operating Systems*, Prentice Hall, Fourth Edition; 2001, pp. 197-253 and 265-293.

United States Court of Appeals, Federal Circuit, *Seachange International, Inc.* Vs. *nCUBE, Corp.*, Oct. 26, 2004, 28 pages.

United States Court of Appeals, Federal Circuit, *Seachange International, Inc.* Vs. *C-Corp, Inc.*, Jun. 29, 2005, 22 pages.

United States District Court, Delaware, *Seachange International, Inc.* Vs. *nCUBE, Corp.*, Apr. 7, 2004, 13 pages.

United States District Court, Delaware, *Seachange International, Inc.* Vs. *nCUBE, Corp.*, Aug. 29, 2000, 12 pages.

Feb. 22, 2008 Int'l Search report PCT/US07/018326, 20 pages.

May 8, 2008 Int'l Search report PCT/US07/018324, 13 pages.

May 18, 2009 Int'l Search report PCT/US08/059798, 18 pages.

Kumar, Akhil, "An analysis of borrowing policies for escrow transactions in a replicated data environment", Institute of Electrical and Electronics Engineers; Proceedings of the International Conference on Data Engineering, Los Angeles, Feb. 5-9, 1990; Los Alamitos, IEEE, Comp. Soc. Press, US. vol. Conf. 6, Feb. 5, 1990, pp. 446-454, XP010018185 ISBN: 978-0-8186-2025-6 p. 446, left-hand column, line 1-p. 447, last line.

Steven M. Bauer, Letter to Steve Goldman, Jul. 31, 2007 (including the first page of the patents), 8 pages.

Arthur S. Rose, Letter to Steven M. Bauer, Aug. 7, 2006, 2 pages.

Steven M. Bauer, Letter to Arthur S. Rose, Sep. 25, 2006, 2 pages.

Steven M. Bauer, Letter to Arthur S. Rose, Oct. 31, 2006, 1 page.

Arthur S. Rose, Letter to Steven M. Bauer, Nov. 9, 2006, 2 pages.

Steven M. Bauer, Letter to Arthur S. Rose, Feb. 6, 2007, 2 pages.

Arthur S. Rose, Letter to Steven M. Bauer, Feb. 23, 2007, 1 page.

Steven M. Bauer, Letter to Arthur S. Rose, Jun. 7, 2006 (including claim chart), 28 pages.

Arthur S. Rose, Letter to Steven M. Bauer, Jun. 22, 2007, 1 page.

Todd A. Gerety, Letter to Arthur S. Rose, Jun. 26, 2007 (exhibits listed separately below), 1 page.

Isilon Systems, "Isilon IQ Plateform Overview", 4 pages, 2007 (Exhibit A).

Isilon Systems, "Uncompromising Reliability through Clustered Storage", Sep. 2006, 10 pages (Exhibit B).

Byteandswitch, "Discovery Chooses Isilon," Apr. 23, 2007, 1 page (Exhibit C).

Taneja Group Technology Analysts, "The Power of InfiniBand and Clustered Storage", Dec. 2005, 8 pages (Exhibit E).

Arthur S. Rose, Letter to Steven M. Bauer, Aug. 31, 2007, 4 pages.

Ramez Elmasri, Fundamentals of Database Systems 3rd ed, Sep. 30, 1999, Addison-Wesley, pp. 155, 169, 171, 172, 173, 178, 181, 182, 381, 771.

MCSA/MSCE/MCDBA Self Paced Training Kit: MS SQL Server 2000 System Administration, May 14, 2003, Microsoft Press, Second Edition, 12 pages.

Supp EPO Search Report, App. No. EP 03 78 3599; dated Apr. 29, 2008, 2 pages.

Levy E., Ed.—Institute of Electrical and Electronics Engineers: "Incremental restart (database management)" Proc. Int. Conf. Data Eng., Kobe, JP, Apr. 8-12, 1991; IEEE Comp. Soc. Press, U.S., vol. Conf. 7, Apr. 8, 1991, pp. 640-648.

Haerder T et al: "Principles of Transaction-Oriented Database Recovery" ACM Computing Surveys, ACM, New York, NY, US, vol. 15, No. 4, Dec. 1, 1983, pp. 287-317.

Gray J et al: "Transaction processing: concepts and techniques (excerpt), Passage" Transaction Processing: Concepts and Techniques, Jan. 1, 1993, pp. 373-445.

Garcia-Molina H et al: "Database System Implementation, passage" Database System Implementation, Jan. 1, 2000, pp. I-V, 423-509.

Wedde H. F., et al.: "A universal framework for managing metadata in the distributed Dragon Slayer System", Proceedings of the Euromicro Conference. Euromicro. Informatics: Inventing the Future, Proceedings of Euromicro Workshop On Multimedia and Telecommunications, vol. 2, Sep. 5, 2000, pp. 96-101.

Tanenbaum, Andrew S., MINIX Operating System, Japan, Apr. 21, 1989, 1st Edition, pp. 328, 505; Also attached is what Applicant believes is the English language version: Tanenbaum, Andrew S., Operating Systems: Design and Implementation, Prentice-Hall, 1987, pp. 279, 347, 348.

Yamashita, Hirofumi, et al., "Development of RAID Filesystem VAFS/HR," The Special Interest Group Notes of IPSJ, Japan, Information Processing Society of Japan, Sep. 16, 1994, vol. 94, No. 80, p. 9-6.

Lougher P. et al., "Scalable storage servers for digital audio and video," International Conference on Storage and Recording Systems, 1994, Keele, UK, Jan. 1, 1994, pp. 140-143.

Jan. 14, 2009 Non-Final Rejection in U.S. Appl. No. 11/506,596 filed on Aug. 18, 2006.

Jan. 7, 2009 Non-Final Rejection in U.S. Appl. No. 11/506,591 filed on Aug. 18, 2006.

Feb. 3, 2009 Non-Final Rejection in U.S. Appl. No. 11/507,069 filed on Aug. 18, 2006.

Jul. 2, 2009 Response to Jan. 14, 2009 Non-Final Rejection in U.S. Appl. No. 11/506,596 filed on Aug. 18, 2006.

Jul. 2, 2009 Response to Jan. 7, 2009 Non-Final Rejection in U.S. Appl. No. 11/506,591 filed on Aug. 18, 2006.

Jul. 2, 2009 Response to Feb. 3, 2009 Non-Final Rejection in U.S. Appl. No. 11/507,069 filed on Aug. 18, 2006.

Reddy, P. Krishna et al., Reducing the blocking in two phase commit with backup sites Apr. 15, 2003, Elsevier, pp. 39-47.

IOS Commands, Feb. 6, 2005, Pantz.org, [online], <web.archive.org/web/20050206184604/http://pantz.org/os/ios/ioscommands.shtml>, pp. 1-12 as printed.

IP Forwarding with Cisco Routers Lab Exercises, Jun. 15, 1999 [online], <ws.edu.isoc.org/data1999/1481713642400af6a2de65a/ip_fwd_cisco_config.ppt>, pp. 1-11 as printed.

Hisyuki Aoki, Parallel Filesystem MFS, IPSJ SIG Technical Reports, Japan, Information Processing Society of Japan, Aug. 26, 1996, vol. 96, No. 79, pp. 31 to 36 (1'. English language abstract).

Yoshitake Shinkai, Cluster File System: HAMFS, Fujitsu, Japan, Fujitsu Limited, Jul. 9, 1999, vol. 50, No. 4, pp. 210 to 214 (2'. English language abstract).

Hirofumi Yamashita, Development of RAID Filesystem FAFS/HR, IPSJ SIG Technical Reports, Japan, Information Processing Society of Japan, Sep. 16, 1994, vol. 94, No. 80, pp. 9 to 16 (3'. English language abstract).

\* cited by examiner

| 301 | MODE | |
| --- | --- | --- |
| 302 | LIN | |
| 303 | LAST SNAP_ID | |
| 304 | GOV_LIST | |
| | • | • |
| | • | • |
| | • | • |
| | • | • |

| 311 | SNAP_ID | 497 |
|---|---|---|
| 312 | LIN | 0 |
| 313 | LIN | 0 |
| 314 | LIN | 0 |
| 315 | LIN | 0 |
| 316 | LIN | 0 |
| 317 | LIN | 0 |

| | | |
|---|---|---|
| SNAP_ID | 497 | ← 311 |
| LIN | 5001 | → 318 |
| LIN | 5003 | → 319 |
| LIN | 5004 | → 320 |
| LIN | 0 | → 321 |
| LIN | 0 | → 322 |
| LIN | 0 | → 323 |

*FIG. 4B*

SYSTEMS AND METHODS FOR A SNAPSHOT OF DATA

CROSS-REFERENCED APPLICATIONS

This application was filed on the same day (Aug. 18, 2006) as the following applications with the same title (Systems and Methods for a Snapshot of Data), U.S. application Ser. Nos. 11/506,596, 11/506,591, and 11/507,069, all three of which are hereby incorporated by reference in their entirety herein.

FIELD OF THE INVENTION

This invention relates generally to a computer system, and more specifically to taking snapshots of data in a computer system.

BACKGROUND

The amount of data stored on digital computing systems has increased dramatically in recent years. Accordingly, users have become increasingly reliant on the storage devices of these systems to store this data. Typically, the data stored on the storage devices undergo modifications. These modifications may arise from user intervention, periodic system updates or alterations, computer initiated processes, or some other source. Whatever the source of the modifications, it is often useful to preserve and permit access to previous versions of the data such as, for example, files and directories. Some instances of when access to previous versions may be useful include, but are not limited to, inadvertently deleted or overwritten data, providing external access to older versions of data while newer versions are being updated, and determining changes to storage device usage over time.

One response to preserving older versions of files has been to copy the entire contents of the storage device to a backup or second storage device. A digital computing system employing this technique will often encounter numerous problems. One, copying entire data systems is time consuming and delays write requests to data on the storage device. Second, this type of backup is financially expensive because it often requires the purchase of additional storage space. Finally, this option does not permit system flexibility. Backups of portions of the file system can reduce the time and expense encountered with traditional methods.

Moreover, the aforementioned problems are amplified when modern, large-capacity storage devices and distributed storage systems comprising numerous large-capacity storage devices are considered.

Because of the foregoing challenges and limitations, there is a need to provide a more efficient manner in which to provide snapshots of data in a system.

SUMMARY OF THE INVENTION

The embodiments disclosed herein generally relate to a computer system, and more specifically to taking snapshots of data in a computer system.

One embodiment of the present invention includes a method for taking a snapshot of a portion of a file system including files and directories. The method may include accepting at least one path that represents a portion of a file system where the portion is less than the entire file system; retrieving at least one data structure that represents the topmost level of the at least one path; and prior to any modifications of the portion of the file system represented by the at least one path, indicating in the at least one data structure that the at least one path is governed by a snapshot.

Another embodiment of the present invention includes a data structure for tracking modifications in a file system. The data structure may include a first representation of a snapshot that is associated with the data structure; and a second representation of data structures governed by the snapshot that have been modified.

An additional embodiment of the present invention includes a data structure associated with files or directories in a file system. The data structure may include an identification field comprised of a first portion and second portion, wherein the first portion is common to versions of the data structure and the second portion is unique to a particular version of the data structure; a representation of snapshots that govern the data structure; and a last access field that indicates when the representation was last updated.

A further embodiment of the present invention includes a system for accessing snapshot data in a file system. The system may include a storage device comprising a file system; and a processor operably coupled to the storage device configured to accept an access request to a path corresponding to a portion of the file system, determine that the portion of the file system is governed by a snapshot, identify locations in the storage device that store snapshot data, retrieve the snapshot data; and generate an indication that the snapshot data is not the current version of the data.

Another embodiment of the present invention includes a data storage system with per-file snapshot capability. The data storage system may include directory and file nodes forming a data structure tree; and a software snapshot module configured to allow for preservation of data on a per-file basis as of a given point in time.

An additional embodiment of the present invention includes a data storage system with snapshot capability on a per directory and downstream files basis. The data storage system may include a directory and file nodes forming a data structure tree; and a software snapshot module configured to preserve data stored in all directories and files downstream of the directory which is both closest to the files that include the desired data to be preserved as of a given time and from which directory paths lead down to all said files including the desired snapshot data.

A further embodiment of the present invention includes a method of preserving data stored in a storage system as of a selected time. The method may include identifying the file within the storage system that includes the desired data to be preserved as of a selected time; and preserving all the data within said file as of said selected time.

An additional embodiment of the present invention includes a method of preserving data stored in a storage system as of a selected time. The method may include identifying the files within the storage system that include the desired data to be preserved as of a selected time; identifying the directory in the directory/file tree closest to all the identified files and from which paths lead down to the identified files; and preserving the data in all the files downstream of the identified directory including all downstream files, if any, that were not identified as including data desired to be preserved as of said selected time.

Another embodiment of the present invention includes a method of modifying data in a file stored in a processor accessible storage system while preserving data stored in the file as of a point in time. The method may include locating the desired file within a hierarchical storage structure; and checking a node at least one level up the hierarchical storage structure leading to the desired file for an indication that data existing in the file prior to modification should be preserved.

A further embodiment of the present invention includes a processor accessible data storage system allowing for the preservation of data in a file as of a point in time. The system may include a hierarchical structure for storing data including directory nodes and file nodes; and an indication that the data in a file should be preserved as of specified point in time stored initially at a node other than the file node.

An additional embodiment of the present invention includes a method of accessing the data stored in a storage system as of a selected point in time. The method may include locating the desired file within an index storage structure using a file identifier and a snapshot identifier; and checking the index storage structure for the desired file to determine if any information stored in the file has been modified since the selected point in time.

A further embodiment of the present invention includes a method of tracking files to be traversed. The method may include storing a set of data structures that correspond to a plurality of files that are logically stored in a tree; tracking a set of snapshots that govern subsets of files in the tree; receiving an identifier for a first file to be modified; and determining whether the first file is governed by any of the set of snapshots by traversing at least a portion of the tree.

Another embodiment of the present invention may include a system for tracking snapshots of a file system. The system may include a file structure comprising a plurality of files that are logically stored in a tree; for each of the plurality of files, a data structure corresponding to each of the files and directories, the data structure comprising an indication of the snapshot data currentness of the data structure; a modification module configured to receive a request to modify one of the plurality of files; and an update module configured to update at least one of the data structures to determine whether the at least one data structure is governed by a snapshot.

A further embodiment of the invention includes a processor accessible data storage system allowing for the storage of data representing a file system with a root-accessible directory-level snapshot structure. The system may include a hierarchical structure for storing data including a root directory node, directory nodes, and file nodes; and a representation of a snapshot of at least one branch of the hierarchical structure, at least one branch comprising a top node; a sequence of at least one mini-snapshot node representing a path from the root directory node to the top node at the time of the creation of the snapshot, each mini-snapshot node comprising a reference from the mini-snapshot node to a child mini-snapshot node or the top node.

An additional embodiment of the invention includes a method of maintaining path-accessibility for snapshots in subnodes of a hierarchical structure. The method may include receiving an indication of at least one branch of a hierarchical structure, at least one branch comprising a top node; and generating a mini-snapshot of an ancestor node of the top node, the mini-snapshot comprising a reference from the mini-snapshot node to a child mini-snapshot node or the top node.

Another embodiment of the invention includes a data storage system capable of preserving data snapshots of portions of the stored data as of selected points in time. The data structure may include a data storage tree structure to store current data in directories and files; a snapshot module configured to create snapshots in time of directories and files; and snapshot data structures of snapshot versions of a file, wherein the snapshot file version identifies blocks of data modified from the next more recent version of the file.

A further embodiment of the invention includes a method of preserving snapshots of data as of selected points in time in a hierarchical data storage structure including files. The method may include creating a first snapshot file version of a current file when a snapshot of a portion of data in the data storage structure which includes said file is taken, wherein said first snapshot file version is separate and independent of the current file version and references blocks of the next more recent snapshot version of the file that are the same as the first snapshot file version and stores direct references to blocks which are different from the next more recent snapshot version of the file, wherein the next more recent snapshot version of the file is the current file; creating a second snapshot file version of a current file when a snapshot of a portion of data in the data storage structure which includes said file is taken, wherein said second snapshot file version is separate and independent of the current file version and references blocks of the next more recent snapshot version of the file that are the same as the current snapshot file version and stores direct references to blocks which are different from the next more recent snapshot version of the file; and wherein the next more recent snapshot version of the file for the second snapshot file version is the current file and the next more recent snapshot version of the file for the first snapshot file is the second snapshot file version.

An additional embodiment of the invention may include a data storage system capable of preserving data snapshots of portions of the stored data as of selected points in time. The system may include a data storage tree structure to store current data in directories and files; a snapshot module configured to create snapshots in time of directories and files; and snapshot data structures of snapshot versions of a directory, wherein the snapshot directory version identifies children of the directory that are different from the next more recent version of the directory.

A further embodiment of the present invention includes a data storage system accessible by a processor. The data storage system may include a hierarchical data storage structure with directory nodes and file nodes in a tree structure, at least some of said directory nodes having a plurality of file nodes as children; a snapshot identifier associated with a directory to designate a snapshot as of a given time, the snapshot including the directory and all subdirectories, if any, and all files under the directory; and the same snapshot identifier associated with each of the subdirectories, if any, and files under the directory.

An additional embodiment of the present invention includes a method of traversing a portion of data stored hierarchically in a data storage system in which the portion of the data represents a snapshot of the data stored in said system as of a point in time. The method may include identifying the desired snapshot point in time and the desired file or files within the storage system; and traversing the nodes of the storage system that are identified at the nodes as associated with the desired snapshot to find the desired file or files.

Another embodiment of the present invention includes a storage system that track of a plurality of versions of selected data portions as of selected points in time. The storage system may include a snapshot module configured to track multiple snapshots of the same and/or different portions of the data stored in said storage system at substantially the same and/or different points in time; a data structure configured to store the current data of the storage system and to store the snapshot versions of the data generally only to the extent the snapshot versions of the data differ from the storage system's current data; snapshot data structures related to the snapshot versions configured to store information about nodes within the snapshot versions that have been modified; and said snapshot module further configured to permit deletion of any one or more of the snapshot versions of the data after reviewing the modified nodes indicated in the snapshot data structures that correspond to the one or more snapshot versions to be deleted.

A further embodiment of the present invention includes a method for keeping track of snapshots in a storage system. The method may include creating a snapshot tracking file when a snapshot is created, wherein the snapshot identifies certain data stored in the storage system to be preserved as of a particular point in time; adding a data identifier to the snapshot tracking file whenever data stored in the storage system and covered by the snapshot is modified; and using the information in the snapshot tracking file to recreate the snapshot data when this is desired.

An additional embodiment of the present invention includes a method of deleting a snapshot in a storage system wherein the storage system is comprised of a hierarchical data structure of directory and file nodes wherein generally only the portions of blocks of data that have been modified by the system are stored in the snapshot portion of the storage system to permit recreation of the data as of the point in time of the snapshot, the method of deletion of a snapshot. The method may include vesting all files covered by the snapshot which have been modified since the creation of the snapshot; deleting the reference to the snapshot in the active snapshot list; and deleting blocks of data no longer in use.

For purposes of this summary, certain aspects, advantages, and novel features of the invention are described herein. It is to be understood that not necessarily all such advantages may be achieved in accordance with any particular embodiment of the invention. Thus, for example, those skilled in the art will recognize that the invention may be embodied or carried out in a manner that achieves one advantage or group of advantages as taught herein without necessarily achieving other advantages as may be taught or suggested herein.

BRIEF DESCRIPTION OF THE DRAWINGS

FIG. 3 illustrates one embodiment of elements in an inode data structure.

FIG. 4A illustrates one embodiment of elements of a snapshot tracking file immediately after a snapshot has been created.

FIG. 4B illustrates one embodiment of elements of a snapshot tracking file after modifications have been made to files and/or directories governed by one embodiment of a snapshot.

DETAILED DESCRIPTION OF PREFERRED EMBODIMENTS

Figure 1A:
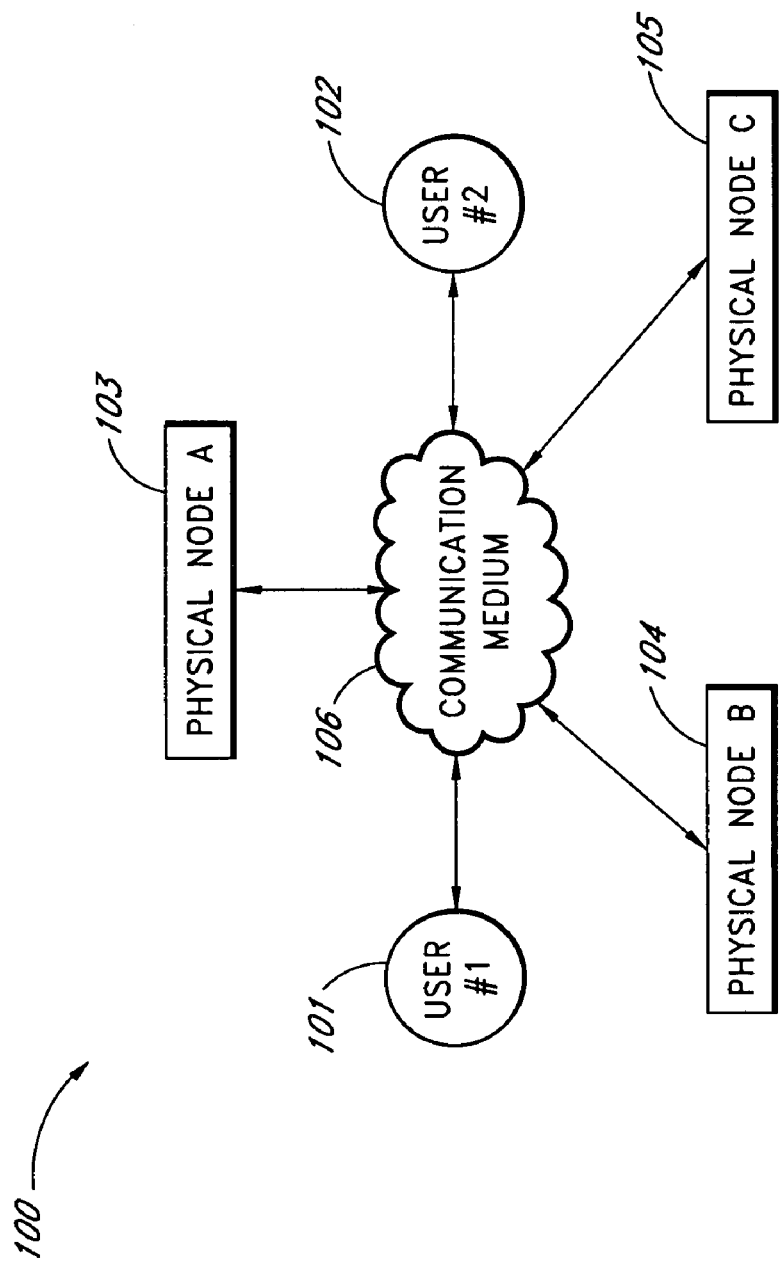
FIG. 1A illustrates one embodiment of the connections of physical nodes in one embodiment of a distributed file system.

Systems, methods, processes, and data structures which represent one embodiment of an example application of the invention will now be described with reference to the drawings. Variations to the systems, methods, processes, and data structures which represent other embodiments will also be described.

For purposes of illustration, some embodiments will be described in the context of a distributed file system. Embodiments of a distributed file system suitable for accommodating embodiments of snapshots disclosed herein are disclosed in U.S. patent application Ser. No. 10/007,003, titled, "SYSTEMS AND METHODS FOR PROVIDING A DISTRIBUTED FILE SYSTEM UTILIZING METADATA TO TRACK INFORMATION ABOUT DATA STORED THROUGHOUT THE SYSTEM," filed Nov. 9, 2001 which claims priority to Application No. 60/309,803 filed Aug. 3, 2001, U.S. patent application Ser. No. 10/281,467 entitled "SYSTEMS AND METHODS FOR PROVIDING A DISTRIBUTED FILE SYSTEM INCORPORATING A VIRTUAL HOT SPARE," filed Oct. 25, 2002, and U.S. patent application Ser. No. 10/714,326 entitled "SYSTEMS AND METHODS FOR RESTRIPING FILES IN A DISTRIBUTED FILE SYSTEM," filed Nov. 14, 2003, which claims priority to Application No. 60/426,464, filed Nov. 14, 2002, all of which are hereby incorporated by reference herein in their entirety.

For purposes of illustration, some embodiments will also be described with reference to updating data structures in a file system using information stored in related data structures of the file system. Embodiments of a file system capable of updating data structures with information stored in related data structures of a file system are disclosed in U.S. patent application Ser. No. 11/255,337, titled, "SYSTEMS AND METHODS FOR ACCESSING AND UPDATING DISTRIBUTED DATA," and is hereby incorporated by reference in its entirety.

In one embodiment of a distributed file system, metadata structures, also referred to as inodes, are used to monitor and manipulate the files and directories within the system. An inode is a data structure that describes a file or directory and may be stored in a variety of locations including on disk and/or in memory. The inode in-memory may include a copy of the on-disk data plus additional data used by the system, including fields associated with the data structure.

As used herein, a file is a collection of data stored in one unit under a filename. A directory, similar to a file, is a collection of data stored in one unit under a directory name. A directory, however, is a specialized collection of data regarding elements in a file system. In one embodiment, a file system is organized in a tree-like structure. Directories are organized like the branches of trees. Directories may begin with a root directory and/or may include other branching directories. Files resemble the leaves or the fruit of the tree. Files, typically, do not include other elements in the file system, such as files and directories. In other words, files do not typically branch. Although in the illustrated embodiment an inode represents either a file or a directory, in other embodiments, an inode may include metadata for other elements in a distributed file system, in other distributed systems, in other file systems, or other systems.

As used herein, data structures are collections of associated data elements, such as a group or set of variables or parameters. In one embodiment a structure may be implemented as a C-language "struct." One skilled in the art will appreciate that many suitable data structures may be used.

Some of the figures and descriptions relate to an embodiment of the invention wherein the environment is that of a distributed file system. The present invention is not limited by the type of environment in which the systems, methods, processes and data structures are used. The systems, methods, structures, and processes may be used in other environments, such as, for example, other file systems, other distributed systems, the Internet, the World Wide Web, a private network for a hospital, a broadcast network for a government agency, an internal network of a corporate enterprise, an intranet, a local area network, a wide area network, a wired network, a wireless network, and so forth. It is also recognized that in other embodiments, the systems, methods, structures and processes may be implemented as a single module and/or implemented in conjunction with a variety of other modules and the like.

I. Overview

In one embodiment, a user or client device is connected to a distributed file system comprised of one or more physical nodes (for example, storage devices). The data on each of the physical nodes are arranged according to inodes which store metadata about files and directories within the file system. In particular, each inode points to locations on a physical disk that store the data associated with a file or directory.

Some of the embodiments disclosed herein permit a user to take a snapshot of data stored on the file system. The snapshot may include a single file, a single directory, a plurality of files within a directory, a plurality of directories, a path on the file system that includes nested files and subdirectories, or more than one path on the file system that each includes nested files and directories.

A path to a file or directory specified to create a snapshot will be referred to herein as "the root of the snapshot." For example, the command "snap create /ifs/data/dir1" creates a snapshot of directory "dir1" and the files and directories nested within "dir1." Accordingly, "dir1" is the root of the snapshot. In one embodiment, if the root of the snapshot is a file, then the snapshot is of the file only. Thus, the file is "governed" by the snapshot. If the root of the snapshot is a directory, then the root of the snapshot and all files and directories nested within the root of the snapshot as well as their descendents are governed by the snapshot. Accordingly, in some embodiments, more than one snapshot may govern a particular file or directory.

Additionally, the most current version of data on the file system will be referred to as the "current version," "HEAD version," or "active version" whereas, previous versions will be referred to as "snapshot data," the "snapshot version," or "past versions." In one embodiment, if the current version of a file or a directory has been deleted from the system, it is possible for a file or directory to have snapshot versions but not have a current version.

In one embodiment, when a snapshot is created, it is created in constant time. That is, no copying of data is required. Instead, a snapshot is created by creating a snapshot tracking data structure associated with the new snapshot, a mini-snapshot(s) if applicable, and an indication in the governance list field of the metadata structure associated with the root of the snapshot. A snapshot is said to be created in constant time because substantially little time is required to create the snapshot. Accordingly, snapshot creation does not substantially interfere with read requests to files and directories governed by the snapshot. This feature and other features of the embodiments disclosed herein will be described in more detail below.

II. System Architecture

In FIG. 1A, a distributed file system 100 comprises various physical nodes 101, 102, 103, 104, 105 that communicate over a communication medium 106. In one embodiment, the communication medium 106 is the World Wide Web. In other embodiments, as described above, the distributed file system 100 may be comprised of one or more hard-wired connections between the physical nodes or any combination of communication types known to one with ordinary skill in the art.

In the depicted embodiment, the physical nodes are either interfaces 101, 102, such as a personal computer, a mainframe terminal or a client application, or data storage systems 103, 104, 105. It will be appreciated by one with ordinary skill in the art that the distributed file system 100 may comprise one or a plurality of interfaces and one or a plurality of data storage systems. In one embodiment, the interfaces 101, 102 may comprise data storage systems such as, for example, data storage systems 103, 104, and 105.

Figure 1B:
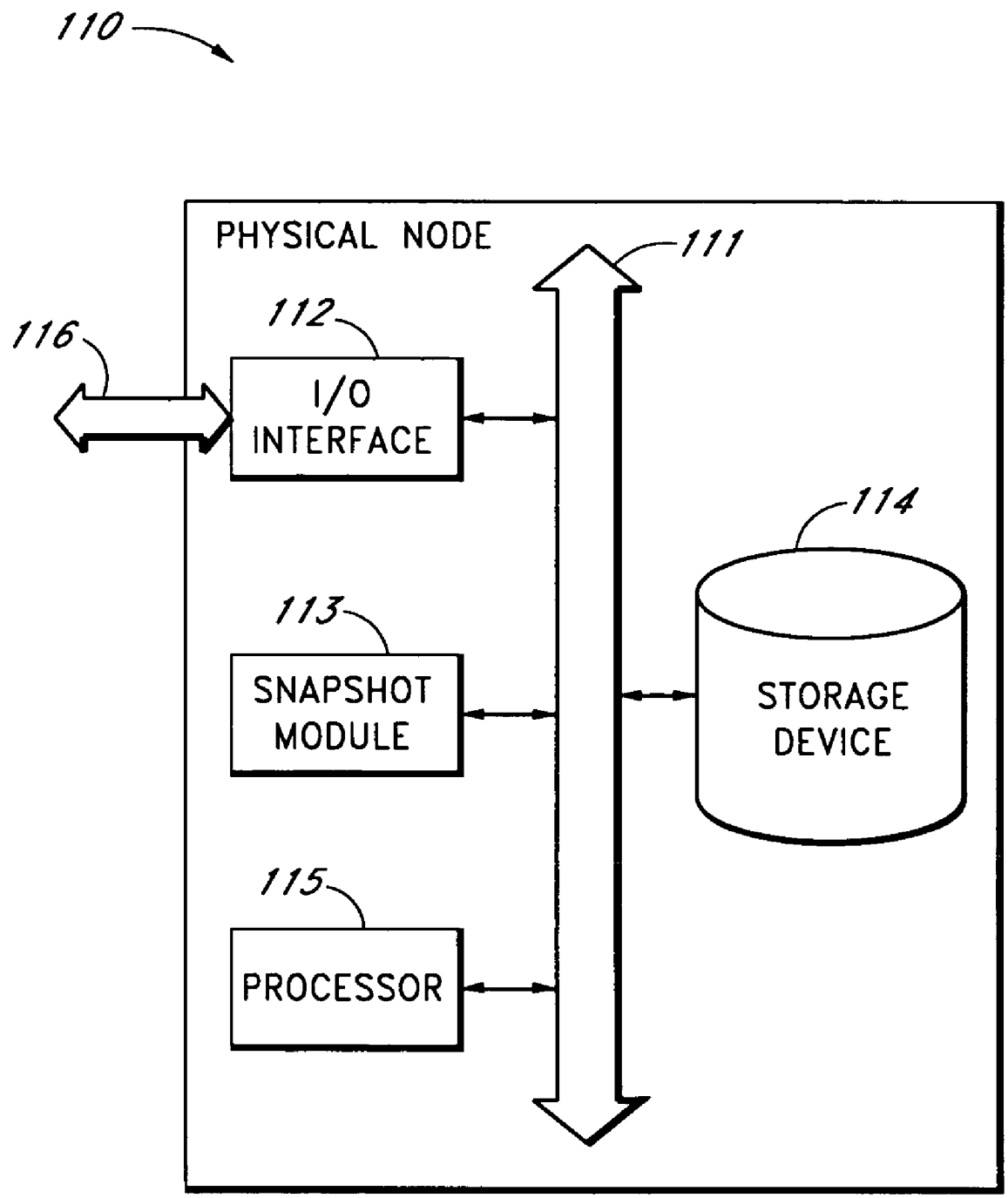
FIG. 1B illustrates one embodiment of a physical node in a distributed file system.

FIG. 1B illustrates one embodiment of a data storage system 110 of the distributed file system 100. The data storage system 110 comprises several subcomponents which may include, for example, an Input/Output Interface 112 that provides for external communication 116, a snapshot module 113, a processor 115, and a storage device 114. In one embodiment, these subcomponents communicate with one another over a bus 111. In some embodiments, the data storage systems may include only a portion of the depicted subcomponents or only the storage device 114.

In one embodiment, the snapshot module 113 is capable of executing the processes and methods described herein. The word module refers to logic embodied in hardware or firmware, or to a collection of software instructions, possibly having entry and exit points, written in a programming language, such as, for example, C or C++. A software module may be compiled and linked into an executable program, installed in a dynamically linked library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Moreover, although in some embodiments a module may be separately compiled, in other embodiments a module may represent a subset of instructions of a separately compiled program, and may not have an interface available to other logical program units.

In one embodiment, the processor 115 receives and processes requests to create snapshots, to delete snapshots, to read snapshot data, to modify data governed by a snapshot, and/or other snapshot related processes. In other embodiments, the processor 115 executes some or all of the processes and/or methods described herein. In yet other embodiments, the processor 115 calls the snapshot module to execute snapshot related processes.

In one embodiment, the storage device 114 stores files and directories of the file system and the inode metadata associated with the files and directories. Examples of the arrangements of files and directories stored on the storage device 114 can be found in FIGS. 2A and 2B. In some embodiments, the storage device may be a physical disk. In other embodiments, the storage device may comprise a plurality of physical disks in communication with one another and/or the bus. In yet other embodiments, the storage device may include a magnetic storage medium, an optical disk, a random access memory, a hard drive, and a partitioned portion of a hard drive.

The data storage system 110 may run on a variety of computer systems such as, for example, a computer, a server, a smart storage unit, and so forth. In one embodiment, the computer may be a general purpose computer using one or more microprocessors, such as, for example, an Intel® Pentium® processor, an Intel® Pentium® II processor, an Intel® Pentium® Pro processor, an Intel® Pentium® IV processor, an Intel® Pentium® D processor, an Intel® Core™ processor, an xx86 processor, an 8051 processor, a MIPS processor, a Power PC processor, a SPARC processor, an Alpha processor, and so forth. The computer may run a variety of operating systems that perform standard operating system functions such as, for example, opening, reading, writing, and closing a file. It is recognized that other operating systems may be used, such as, for example, Microsoft® Windows® 3.X, Microsoft® Windows 98, Microsoft® Windows® 2000, Microsoft® Windows® NT, Microsoft® Windows® CE, Microsoft® Windows® ME, Microsoft® Windows® XP, Palm Pilot OS, Apple® MacOS®, Disk Operating System (DOS), UNIX, IRIX, Solaris, SunOS, FreeBSD, Linux®, or IBM® OS/2® operating systems.

III. User Interface

Figure 2A:
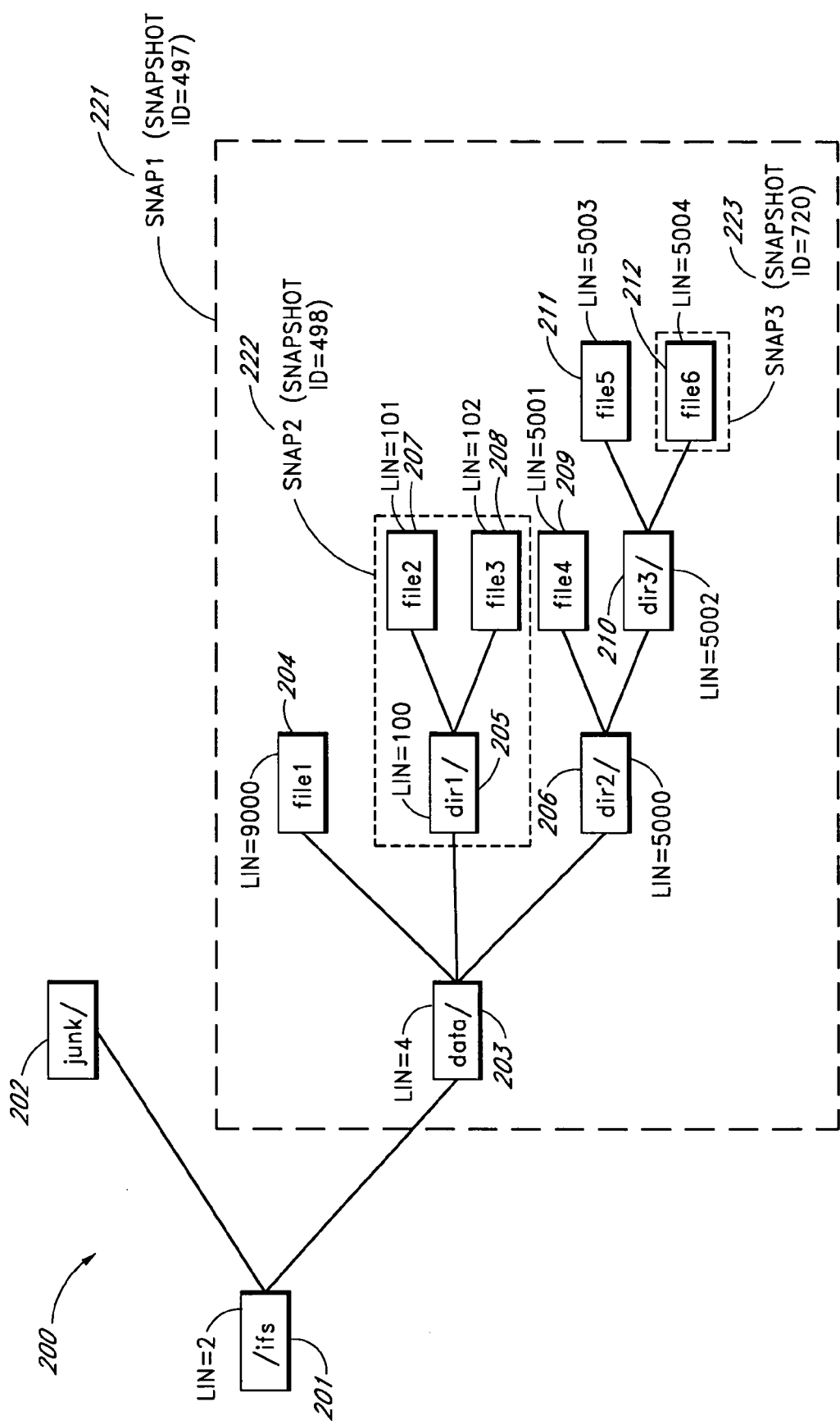
FIG. 2A illustrates one embodiment of a file system hierarchy indicating one embodiment of snapshots taken on the file system hierarchy.

FIG. 2A illustrates one embodiment of a file system hierarchy indicating one embodiment of snapshots taken on the file system hierarchy. As shown, each of the files and directories within the file system 200 is assigned a unique identifier referred to as a Logical Inode Number ("LIN"). The LIN uniquely refers to the on-disk data structures for the file or directory. For example, the LIN associated with /ifs is 2. Accordingly, this inode will be referred to herein as inode two.

As depicted, the root of the file system 200 is /ifs 201. From here, files and directories branch outward, each with a corresponding inode. In one embodiment, inodes that correspond to directories may have one or more child inodes and possibly even one or more grandchild, great-grandchild inodes, and/or other descendents. In another embodiment, inodes that correspond to files do not have any child inodes. For example, inode four corresponds to the directory /data 203 and has child inodes one hundred, five thousand and nine thousand. The grandchild inodes of inode four include inodes one hundred one, one hundred two, five thousand one and five thousand two; the great-grandchild inodes of inode four include inodes five thousand three and five thousand four. In other embodiments, inodes corresponding to files may have child inodes, grandchild inodes, and so forth.

The dashed lines 221, 222, 223 in FIG. 2A correspond to snapshots of the file system 200. In one embodiment, each of the snapshots has a snapshot identifier ("snapshot ID"). In one embodiment, the snapshot ID provides an indication as to the relative time the snapshot was created. For example, if the snapshot ID of snapshot A is greater than the snapshot ID of snapshot B, it is understood that snapshot A was created after snapshot B. In one embodiment, the snapshot ID is assigned to snapshots based on a monotonically increasing global snapshot counter ("global count"). In other embodiments, the snapshot ID may be randomly assigned or otherwise be unrelated to the relative time the snapshot was created.

In FIG. 2A, snapshot one 221 has snapshot ID 497. The root of snapshot one 221 is data and is represented by the path "/ifs/data/". Thus, directory data/203 is the root of snapshot one 221. Accordingly, data/203 and all of the files and directories 204, 205, 206, 207, 208, 209, 210, 211 nested within data/203 are governed by snapshot one 221.

Snapshot two 222 has snapshot ID 498. The root of snapshot two 222 is represented by the path "/ifs/data/dir1." Thus, directory dir1/205 is the root of the snapshot two 222. Accordingly, dir1/205 and all of the files and directories 207, 208 nested within dir1/205 are governed by snapshot two 222. Additionally, because dir1/205 is also governed by snapshot one 221, dir1/205 and all of the nested files and directories under dir1/205 are governed by both snapshot one 221 and snapshot two 222.

Snapshot three 223 has snapshot ID 720. The root of snapshot three 223 is represented by the path "/ifs/data/dir2/dir/3/file6". Thus, file6 212 is the root of snapshot three 223. Because no files or directories are nested within file6 212, file6 212 is the only file or directory governed by snapshot three 223. However, file6 212 is also governed by snapshot one 221 because it is a file nested within data/203 which is governed by snapshot one 221.

Figures 1, 2B:
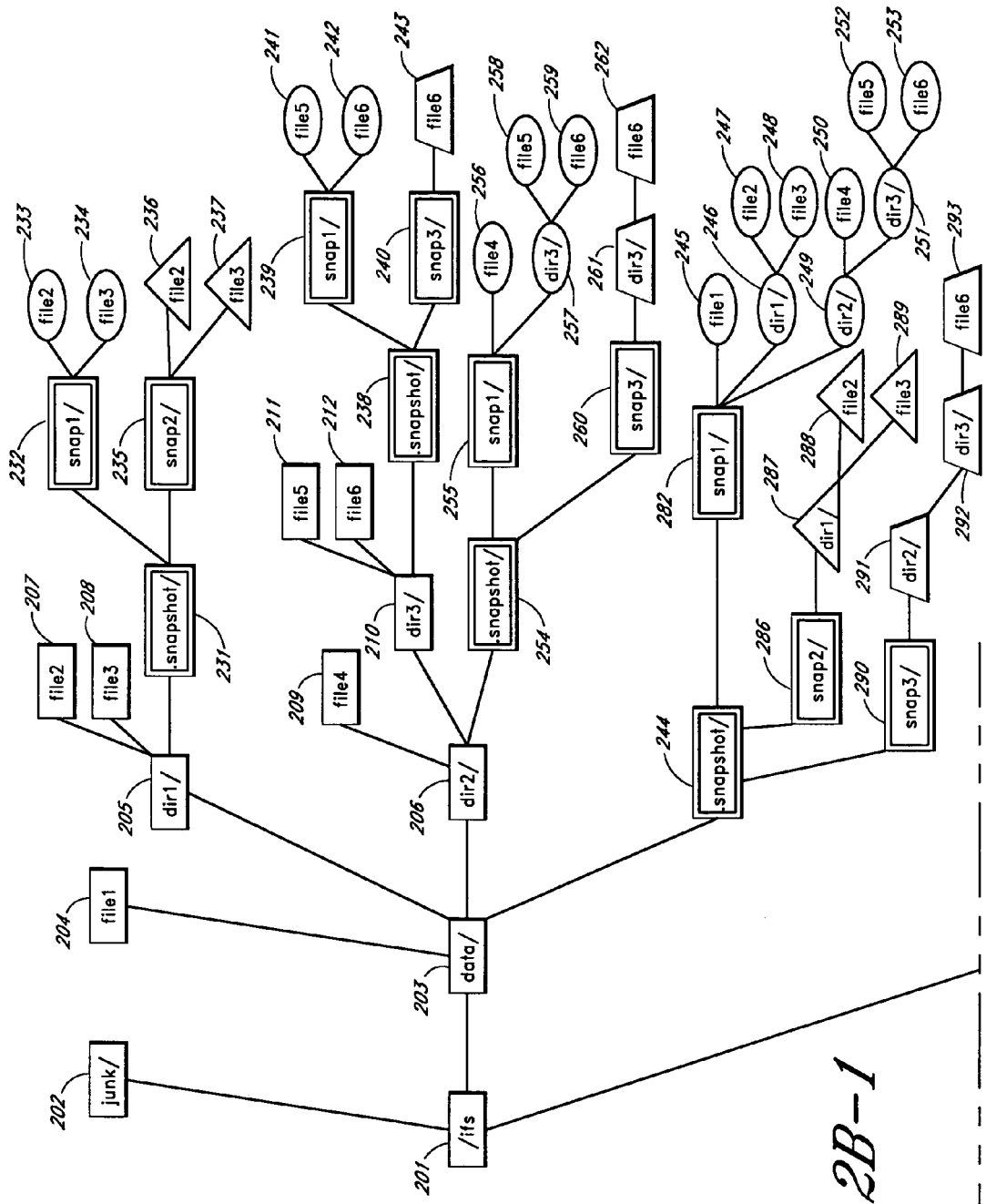
FIG. 2B (2B-1 and 2B-2) illustrates one embodiment of a file system hierarchy indicating one embodiment of virtual directories used to access snapshot data.
Figures 2, 2B:
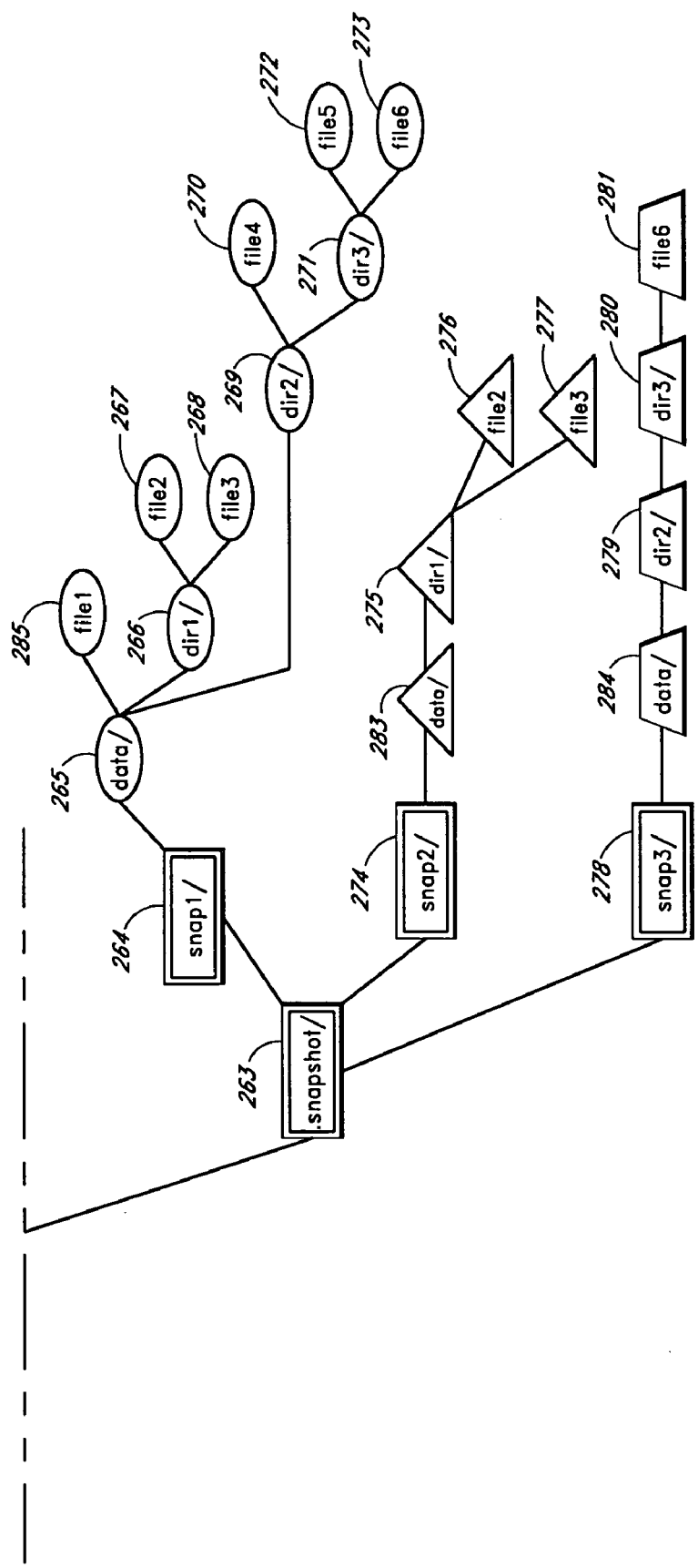

FIG. 2B illustrates one embodiment of a file system hierarchy indicating one embodiment of virtual directories used to access snapshot data. In the depicted embodiment, snapshot data can be accessed in two ways, (1) through a top-level .snapshot/directory 263 or (2) through .snapshot/directories 231, 238, 244, 254 nested within subdirectories of a file system hierarchy.

In the depicted embodiment, current versions of the files and directories within the file system 200 are represented using rectangles (for example, data/203). Virtual directories that provide access to snapshot data are represented using double rectangles (for example, snapshot/244). Files and directories associated with snapshot one 221 are represented using ovals (for example, data/265); files and directories associated with snapshot two 222 are represented using triangles (for example, data/283); and files and directories associated with snapshot three 223 are represented using trapezoids (for example, data/284). In one embodiment, the snapshot versions of files and directories on a file system are virtual files and directories.

As shown in FIG. 2B, the top-level snapshot/directory 263 is a subdirectory of the root of the file system 201,/ifs. The top-level .snapshot/directory 263 includes subdirectories for each of the three snapshots: snap1/264 for snapshot one 221, snap2/274 for snapshot two 222, and snap3/278 for snapshot 3 223. Using an operating system-compatible "change directory" command (for example, "cd" for UNIX), a user can access the snapshot data for snapshot one 221 using the path/ ifs/.snapshot/snap1 264. Once at this path 264, the file system will appear as the file system at the time snapshot one 221 was created. For example, file6 273 from snapshot one can be accessed using the path /ifs/.snapshot/snap1/data/dir2/dir3/file6 273.

The /ifs/.snapshot/snap2/subdirectory 274 is similar in many respects to the snap1/subdirectory 264. The file system appears as it did at the time of snapshot two 222 was created. However, because snapshot two 222 governs only dir1/205 and the files 207, 208 nested within it, the parent directory to dir1/275 data/283, includes enough information to access the snapshot version of dir1/275. As used herein, ancestor directories that are not governed by a snapshot but include children files or directories to navigate to snapshot data are referred to as "mini-snapshots." For example, though the current version of data/203 has as its children file1 204, dir2/206, and dir1/205, the mini-snapshot of data/283 for snapshot two 222 has its only child dir1/275.

Mini-snapshots serve as stand-ins for the portions of the directory tree between the file system root 201 and the root of a snapshot. Consequently, snapshot data can be accessed in an intuitive way without being computationally expensive.

For example, the .snapshot/snap3/directory 278 utilizes three mini-snapshot directories, data/284, dir2/279, and dir3/280 to provide access to the snapshot version of file6 281 governed by snapshot three 223. Accordingly, each of the mini-snapshot directories, do not store information unrelated to accessing file6 281; data/284 does not store information related to file1 or dir1/; dir2/279 does not store information related to file4; and dir3/280 does not store information related to file5.

The embodiment depicted in FIG. 2B also shows how snapshot data can be accessed via .snapshot/subdirectories nested within the file system hierarchy 230. Each directory that includes (or, in some instances, formerly included) data with a snapshot version also has a snapshot subdirectory. These snapshot/subdirectories 231, 238, 244, 254 are similar to the snapshot/subdirectory 263 of /ifs 201 in that they preserve the intuitive feel of the file system 200 when accessing snapshot versions. Accordingly, the .snapshot/subdirectories 231, 238, 244, 254 also utilize mini-snapshots.

One example of a nested snapshot/subdirectory can be found within data/203. The .snapshot/subdirectory 244 includes three subdirectories: snap1/282, snap2/286, and snap3/290. Because data/203 is the root of snapshot one 221, the subdirectories and files located within snap1/282 appear as the subdirectories and files of data/203 at the time that snapshot one 221 was created.

Similarly, dir2/206 includes a .snapshot/subdirectory 254 that includes snapshot data related to snapshot one 221, snap1/255, and snapshot three 223, snap3/260. The data within snap1/255 can be accessed as if /ifs/data/dir2/206 was accessed at the time that snapshot one 221 was taken. However, the data within snap3/260 is limited to only file6 262 because snapshot three 223 only governs file6 262. Accordingly, dir2/291 and dir3/261 are mini-snapshots that provide access to file6 262.

The .snapshot/subdirectory 238 found within dir3/210 also includes data associated with snapshot one 221 and snapshot three 240. Subdirectory snap1/239 includes the snapshot versions of file5 241 and file6 242. In contrast, subdirectory snap3/240 only includes the snapshot version of file6 243 because file6 212 is the root of snapshot three 223.

Subdirectory dir1/205 also includes a .snapshot/subdirectory 231. Nested within .snapshot/231 are subdirectories snap1/232 and snap2/235. Each of snap1/232 and snap2/235 include versions of file2 233, 236 and file 3 234, 237 that correspond to the versions of file2 207 and file3 208 at the times that snapshot one 221 and snapshot two 222 were created.

In one embodiment, the .snapshot/subdirectories 231, 238, 254, 244, 263 are virtual directories that are not explicitly represented on disk. Information necessary to create the snapshot data found in each virtual directory can be found by consulting the inode of the "parent" of the virtual directory and the snapshot tracking data structures associated with each snapshot version of the files and/or directories nested within the parent. The virtual directory can be created by (a) determining which snapshots govern each of the files and directories, and (b) accessing the data associated with each version. In some embodiments, to preserve the intuitive feel of the file system, the subdirectories to the .snapshot/directories that specify the snapshot version (for example, snap1/264, snap2/274, and snap3/278) are also virtual directories. In other embodiments, the .snapshot/directories and/or their subdirectory(s) are non-virtual directories that are explicitly represented on disk.

IV. Data Structures a. Metadata

FIG. 3 illustrates one embodiment of some of the data elements of an inode data structure in a file system. As used herein, the data elements associated with a particular inode data structure are referred to as the metadata for the inode. In one embodiment, each element is a field that stores information about the inode, and the metadata is a collection of the information stored in the fields. As used herein, the metadata associated with a file or directory will be referred to as an inode.

In the depicted embodiment, the fields in the inode metadata structure 300 include, but are not limited to, the mode field 301, the LIN field 302, the last snapshot identifier field ("last snapshot ID") 303, and the governance list field 304. In other embodiments, the metadata structure 300 may include fewer or more fields, such as a reverse lookup hint field, a name field, and/or a field indicating the amount of data referenced by the inode. In addition, the metadata structure may be stored using a different type of data structure.

The mode field 301, indicates, for example, whether the inode corresponds to a file or a directory.

As stated previously, the LIN 302 is a unique identifier in the file system for the inode.

The governance list field 304 includes all of the snapshot IDs that govern the particular inode. In other words, if the inode corresponds to a version(s) of a file or directory, the snapshot ID associated with the version(s) appears in the governance list of the inode. For example, when a snapshot of a file or a directory is created, but before any modifications to the file or directory have been made, the governance list of the current version will include the snapshot ID of the newly created snapshot. However, when that file or directory is modified, the inode associated with the snapshot version will have the snapshot ID in the governance list and the current version will store an empty set in its governance list. Accordingly, a current version of a file without any snapshot versions will also store an empty set in its governance list. The governance list may be implemented using a variety of data structures known to one with ordinary skill in the art such as a linked list or an array.

The last snapshot ID field 303 includes information about the corresponding file or directory that was modified. After modification, the version of the modified file or directory is updated or "painted" with the global count (that is, the snapshot ID at the time the modification is made). In one embodiment, updating the inode with the global count serves to indicate the last time the governance list of the inode was modified.

In one embodiment, the metadata is implemented using an array. In another embodiment, the metadata is implemented using a linked list. A person with ordinary skill in the art will recognize that the metadata can be implemented using a variety of data structures.

b. Snapshot Tracking File

In one embodiment, a snapshot tracking data structure (or, "snapshot tracking file") is created each time a snapshot is created. Accordingly, a snapshot tracking file is associated with each snapshot. The snapshot tracking file provides information regarding each file or directory governed by a snapshot that was modified or deleted after the snapshot was taken.

In one embodiment, the snapshot tracking file can be used to determine which files and directories of a particular version are examined when deleting a snapshot. In another embodiment, the snapshot tracking file can be used to track information about a particular snapshot. This information may include, but is not limited to, disk usage.

FIG. 4A illustrates one embodiment of elements of a snapshot tracking file 310 immediately after a snapshot has been created. The snapshot tracking file 310 can includes several fields such as, for example, a snapshot tracking file LIN field (not shown), a snapshot ID field 311, and LIN fields(s) 312, 313, 314, 315, 316, 317. In other embodiments, the snapshot tracking file 310 may include fewer or more fields than those depicted in FIG. 4A.

In one embodiment, the snapshot tracking file LIN field is a unique identifier associated with the snapshot tracking file 3 10, and is similar in purpose to the LIN associated with a file or a directory.

In one embodiment, the snapshot ID field 311 is the genesis snapshot ID of the snapshot that the snapshot tracking file 310 corresponds to. In one embodiment, the genesis snapshot ID is equal to the global count at the moment the corresponding snapshot was created. In another embodiment, the snapshot ID field 311 is equal to the time or a representation of the time that the snapshot was created. In yet another embodiment, the snapshot ID field 311 is some other identifier that indicates a correspondence with a related snapshot.

In one embodiment, the LIN field(s) 312, 313, 314, 315, 316, 317 stores the LINs associated with files or directories that have been modified or deleted from the file system after the corresponding snapshot was created. In another embodiment, the LIN field(s) stores the LINs of files or directories that have been read after the snapshot was created. In yet another embodiment, the LIN field(s) stores the LINs of files and directories accessed before a subsequent snapshot is created. While FIG. 4A illustrates a set of six LIN fields, it is recognized that a wide number of LIN fields may be included and/or a variable number of LIN fields may be used, depending on the number of modified LINs.

FIG. 4B illustrates one embodiment of elements of a snapshot tracking data structure 310 after modifications have been made to files and/or directories encompassed by one embodiment of a snapshot. As explained below, with reference to FIGS. 13A-D, the LINs of files and directories modified after snapshot one 221 was taken are added to the snapshot tracking file associated with snapshot ID 497. For example, file4 209 with LIN 5001, file5 211 with LIN 5003, and file6 212 with LIN 5004 were either modified or deleted after snapshot one 211 was taken.

In one embodiment, the snapshot tracking file 310 is a fixed-length array that stores empty sets for LIN fields 312, 313, 314, 315, 316, 317 that have not yet been populated. In other embodiments, the snapshot tracking file 310 is a linked list that adds entries each time a file or directory is modified or deleted. A person with ordinary skill in the art will recognize that a snapshot tracking file can be implemented using a variety of suitable data structures.

c. LIN Table

Figure 5:
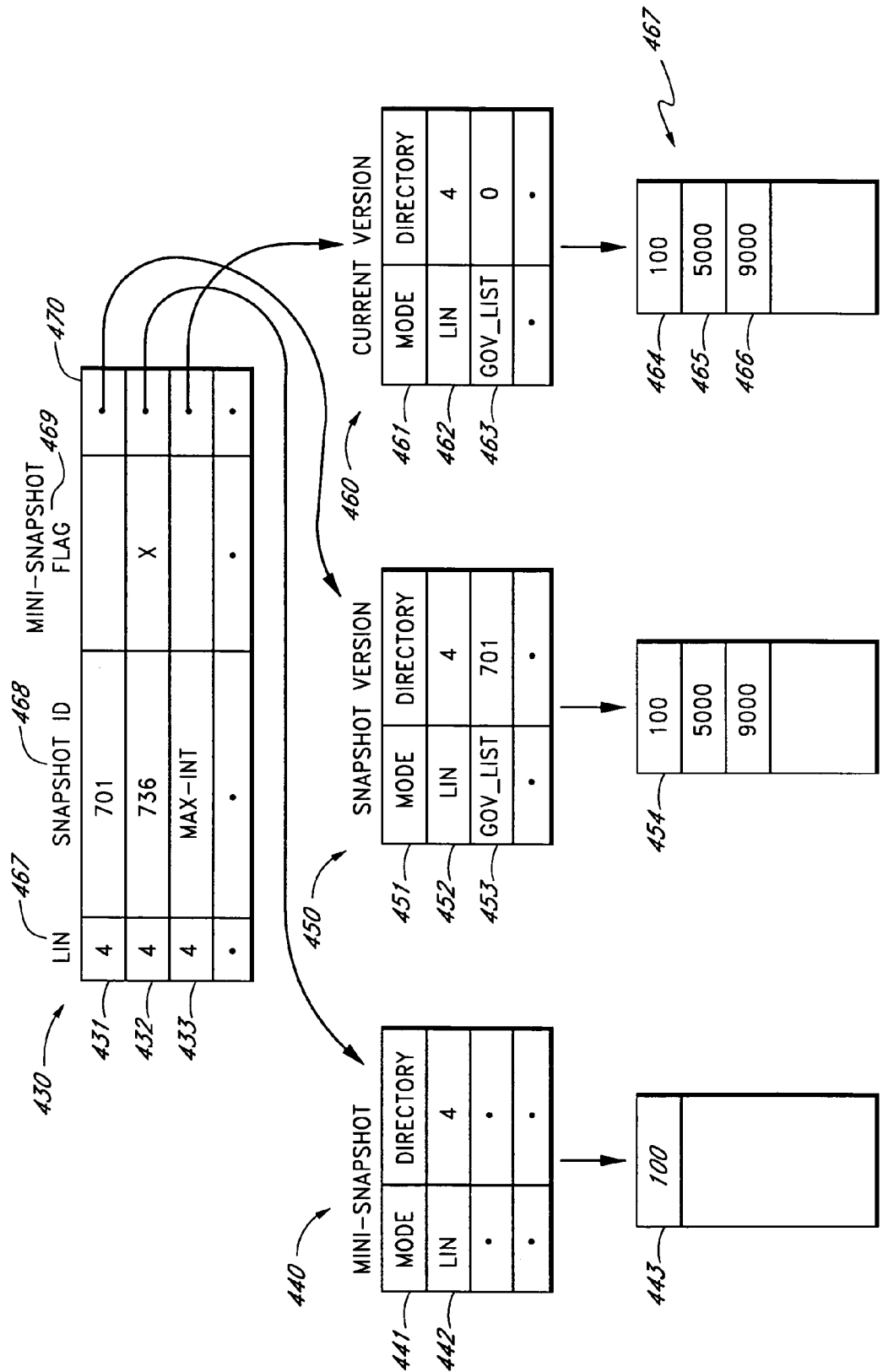
FIG. 5 illustrates one embodiment of a LIN table and one embodiment of a mini-snapshot.

FIG. 5 illustrates one embodiment of a LIN table 430 and one embodiment of a mini-snapshot 440. In one embodiment, the LIN table stores the LIN/snapshot ID pairs of all of the files and directories in the system. Accordingly, each LIN/snapshot ID pair references the corresponding inode version of a file or directory using, for example, a pointer.

In one embodiment, the LIN table 430 comprises a plurality of rows 431, 432, 433. Each row stores data for a particular version of a file or a directory. Each row 431, 432, 433 is comprised of several fields 467, 468, 469, 470 which may include, but are not limited to, a LIN field 467, a snapshot ID field 468, a mini-snapshot flag 469, and a reference (or, pointer) field 470. In another embodiment, the LIN field 467 and the snapshot ID field 468 comprise a single field. For example, the LIN/snapshot ID pair may be represented using a sixteen byte binary value, with the LIN occupying the most significant bits of the sixteen byte value and the snapshot ID occupying the least significant bits. In another embodiment, the LIN table 430 may include fewer or more fields, such as, for example, the mode, the governance list, the creation date, and so forth.

The LIN field 467 includes the LIN of the inode version that a particular row 431, 432, 433 in the LIN table 430 references.

The snapshot ID field 468 includes the genesis snapshot ID of the inode version that a particular row 431, 432, 433 in the LIN table 430 references.

In one embodiment, the mini-snapshot flag field 469 indicates whether a directory is a mini-snapshot rather than a version of a directory in the file system. In some embodiments, a mini-snapshot is indicated when the flag is set. In other embodiments, a mini-snapshot is indicated when the flag has been cleared.

In one embodiment, the reference field 470 includes a pointer to the inode that corresponds to a LIN/snapshot ID pair represented in the LIN table. For example, row 431 includes the LIN/snapshot ID pair (4, 701) which points to inode 450. Accordingly, inode four hundred fifty includes in its metadata the same LIN 452. Also, inode four hundred fifty includes a governance list 453 that provides a representation of the snapshots that govern this version of inode four hundred fifty. In one embodiment, the governance list 453 does not store the same value(s) as the genesis snapshot ID 468 stored in the LIN table 430.

In some embodiments, the LIN table 430 references inodes 440, 450, 460 that further reference metatrees 443, 454, 467. Metatrees are data structures specific to a version of a file or directory. In one embodiment, metatrees 443, 454, 467 associated with a directory inode store references to the children of the inode. For example, the metatree 467 for inode four stores references to children with LIN one hundred 464, LIN five thousand 465, and LIN nine thousand 466. Thus, the current version of inode four has three children. Metatree 443 has only one entry because it is a mini-snapshot for a file or directory nested within inode one hundred. Therefore, though the current version 460 and a previous version 450 indicate that inode four has three children, the inode 440 associated with the mini-snapshot only references the child 443 necessary to access data governed by snapshot 736.

Row 432 in the LIN table 430 has the mini-flag set in the mini-snapshot flag field 469. In the depicted embodiment, when the flag is set, the row in the LIN table 430 references a mini-snapshot. Accordingly, row 432 references inode 440 which is a mini-snapshot associated with snapshot ID 736. In one embodiment, the metadata for an inode associated with a mini-snapshot does not include a governance list. In this embodiment, a governance list is not needed because no data stored in the data blocks of the inode can be altered because subsequent "versions" of mini-snapshots cannot exist. That is, mini-snapshots are only used to facilitate downward navigation to snapshot data.

Row 433 in the LIN table 430 references inode 460. In one embodiment, the snapshot ID associated with row 433 is "MAX_INT." MAX_INT represents a binary value wherein all of the bits are set (for example, all bits are set to "1"). In one embodiment, the value MAX_INT is used to represent the current version of a file or directory. For example, whenever the user wishes to modify a file or directory with snapshot ID MAX_INT, the user knows that the current version of the file is being modified. In another embodiment, the current version can be assigned a snapshot ID wherein all bits are cleared (for example, all bits are set to "0"). In a further embodiment, the current version can be assigned a snapshot ID with an empty set or some other representation that identifies the current version.

In one embodiment, each row 431, 432, 433 is implemented using a fixed length array. In another embodiment, each row 431, 432, 433 is implemented using a linked list. In yet another embodiment, the rows are associated with one another using an array or a linked list. A person with ordinary skill in the art will recognize that the LIN table can be implemented using a variety of different data structures.

V. Snapshot Creation

Figure 6:
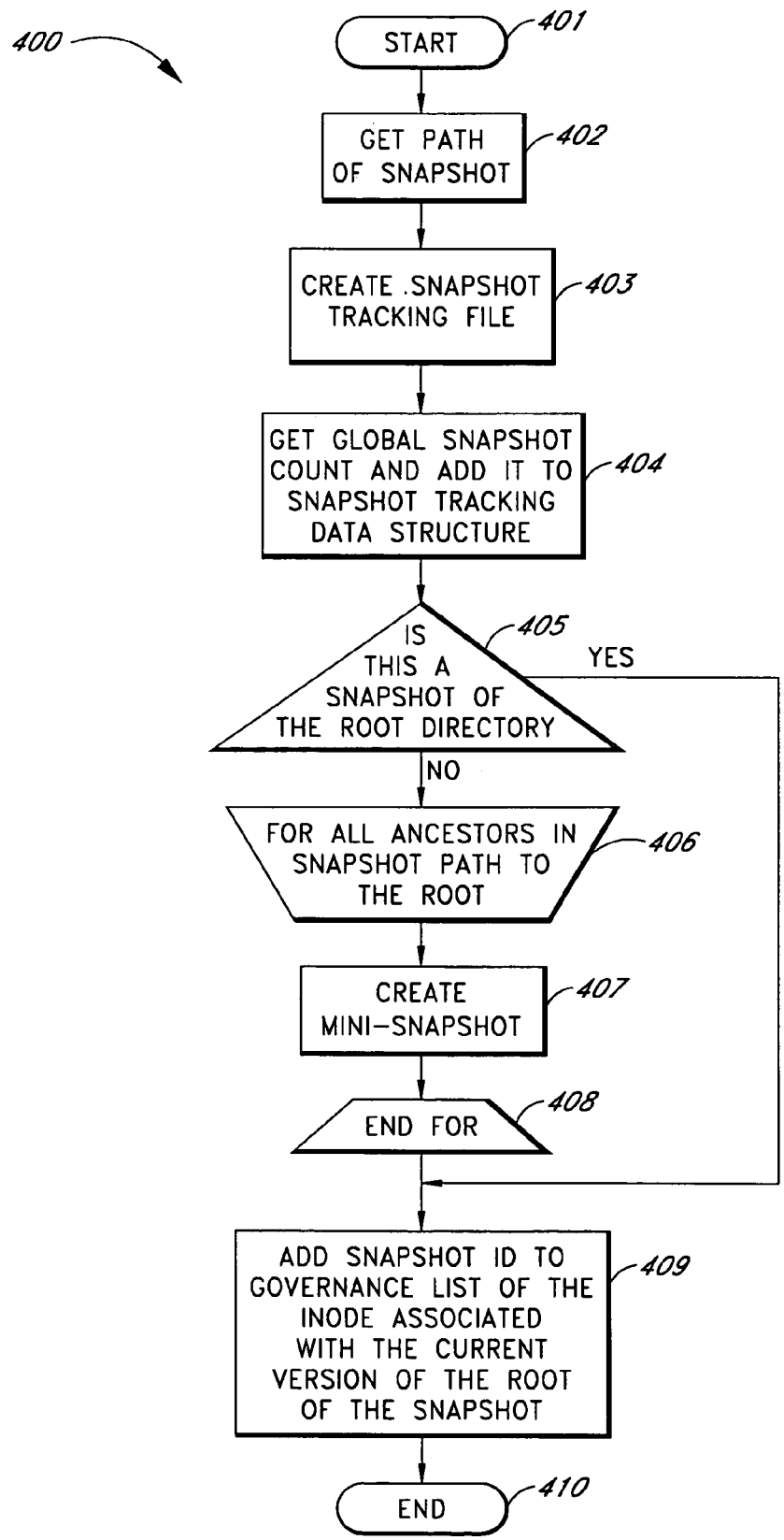
FIG. 6 illustrates one embodiment of a flowchart of operations for creating a snapshot.

FIG. 6 illustrates one embodiment of a flowchart of operations 400 for creating a snapshot. In the depicted embodiment, the process 400 executes when a snapshot is created. The process 400 begins 401 by getting the path of the root of the snapshot to be created 402. In one embodiment, the root of the snapshot is the top-most level in the file system hierarchy governed by the snapshot. Accordingly, the snapshot governs the root of the snapshot and the descendents of the root of the snapshot. In one embodiment, the root of the snapshot is either a file or directory. In other embodiments, the root of the snapshot is only a file or only a directory.

Next, a snapshot tracking file 310 is created 403 with fields including, for example, the snapshot ID field 311 and the LIN field(s) 312, 313, 314, 315, 316, 317 empty. Then, the global count is accessed and added to the snapshot ID field 311 of the snapshot tracking file 310.

After the snapshot tracking file has been created 403 and the global count added 404, decision block 405 determines whether the root of the snapshot is also the root of the file system. If it is the root of the file system, the operations in blocks 406, 407, and 408 can be skipped. However, if it is not the root of the file system, a for loop for all ancestors of the root of the snapshot to the root of the file system 406 is initiated.

For all of these ancestors, a mini-snapshot is created 407. In one embodiment, creating a mini-snapshot includes two steps. First, an inode is created. The inode comprises at least a mode field and a LIN field. In one embodiment, the mode field indicates that the inode is associated with a directory because, in the exemplary embodiment, files cannot have children. In other embodiments, where either files or directories may have children, the mode field indicates either a file or a directory. The LIN field indicates the LIN of the corresponding ancestor of the root of the snapshot. Second, a reference is created that points to a child of the ancestor in the path to the root of the snapshot. In some embodiments, a mini-snapshot is a virtual data structure that is created when a snapshot version with mini-snapshots is accessed.

In one embodiment, after the mini-snapshots for all ancestors up until, but not including, the root have been created 407, the for loop ends 408. In another embodiment, the for loop ends 408 when mini-snapshots have been created 407 for all ancestors including the root directory. After the for loop ends 408, the genesis snapshot ID is added to the governance list of the inode associated with the current version of the root of the snapshot 409.

In another embodiment, multiple paths to multiple roots of a snapshot are accepted. It is recognized that a person with ordinary skill in the art would be capable of modifying process 400 to accommodate a snapshot that has multiple roots.

While FIG. 6 illustrates one embodiment of a create snapshot operation, it is recognized that other embodiments may be used. For example, the inputs and outputs may be passed as values, references, and/or stores in an accessible memory location.

VI. Copy On Write

Figure 7A:
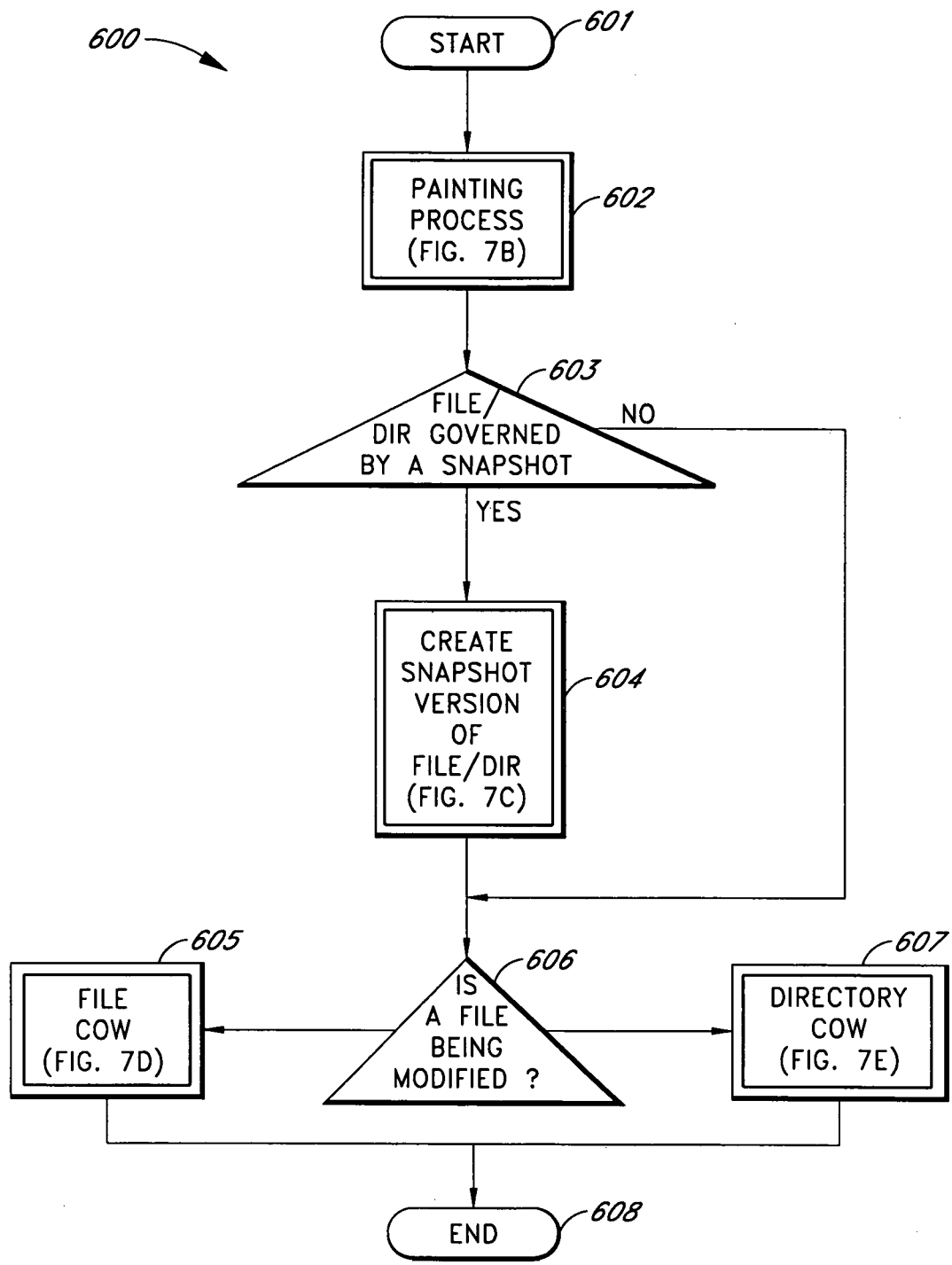
FIG. 7A illustrates one embodiment of a top-level flowchart of operations for modifying a file or a directory.

FIG. 7A illustrates one embodiment of a top-level flowchart of operations 600 for modifying a file or a directory. Because the operations needed for modifying a file or a directory, in some instances, involve copying data only in response to a write request, some of the operations discussed herein will be referred to as a "copy on write" ("COW"). Moreover, in the depicted embodiment, the top-level flowchart of operations calls various processes 602, 604, 605, 607 in order to complete the operation. In other embodiments, some or all of these processes may comprise a single process. In yet other embodiments, process 600 may be embodied as a single process.

Figure 7B:
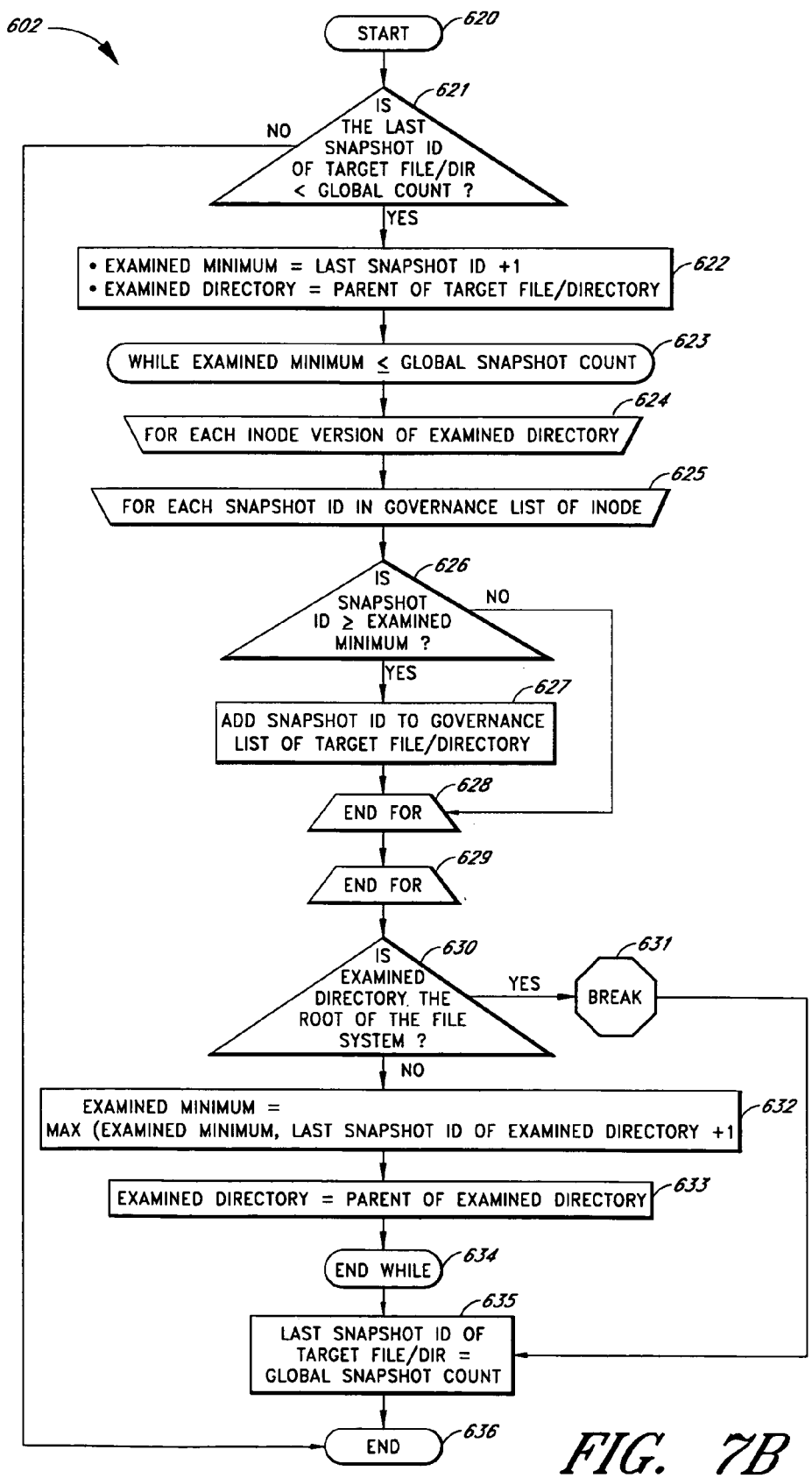
FIG. 7B illustrates one embodiment of a flowchart of operations for painting files or directories with governing snapshot data.

The process 600 of modifying a file or directory begins 601 by executing the painting operation 602 depicted in FIG. 7B.

After the painting process 602 terminates 636, decision block 603 determines whether the file or directory that will be modified is governed by a snapshot. The painting process 602, in part, can determine whether the file or directory is governed by a snapshot. If the file or directory is governed by a snapshot, then the create snapshot version of file or directory process 604 is executed. However, if the file or directory is not governed by a snapshot, the create version of file or directory process 604 is skipped.

Next, decision block 606 determines whether a file or a directory is being modified. If a file is being modified, the file COW process 605 is executed. However, if a directory is being modified, the directory COW process 607 is executed. Then, after either the file COW process 605 or the directory COW process 607 finishes executing, the operation ends 608.

While FIG. 7A illustrates one embodiment of a create snapshot operation, it is recognized that other embodiments may be used. For example, the inputs and outputs may be passed as values, references, and/or stores in an accessible memory location.

a. Painting

FIG. 7B illustrates one embodiment of a flowchart of operations 602 for painting files or directories with governing snapshot data. In one embodiment, painting is used because the governance list of a file or directory is not updated each time a snapshot that governs the file or directory is created. For example, if in FIG. 2A, when snapshot one 221 was created, only the governance list of data/203 is "painted" with the snapshot ID of snapshot one 221 because it is the root of the snapshot. Faster snapshot creation is facilitated by only painting the root of the snapshot. However, before modifying a file or directory within data/203, the process traverses up the tree to data/203 to discover whether the file or directory is governed by snapshot one 221. In other embodiments, files and directories governed by a snapshot are painted when the snapshot is created. In these embodiments, painting a file or directory before modifying with a list of governing snapshots is unnecessary.

In one embodiment, the painting process 602 begins 620 at decision block 621 by asking whether the last snapshot ID stored in the file or directory to be modified (or "target file/dir"), is less than the global count. As discussed previously, the global count can be used to indicate the relative time when a snapshot was created or when the governance list of a particular inode was updated. Thus, in the depicted embodiment, the global count is a value that is greater than or equal to any snapshot ID stored in the system. If the last snapshot ID is not less than the global count, then we know that the snapshot ID is equal to the global count and the governance list of the inode is, therefore, up to date. Then, the process ends 636.

However, if the last snapshot ID is less than the global count 621, two variables are initialized 622: EXAMINED MINIMUM=last snapshot ID+1; and EXAMINED DIRECTORY=parent inode of the target file/dir. Next, a while loop initiates 623 and executes the operations nested within it while EXAMINED MINIMUM is less than or equal to the global snapshot count. Therefore, even if the snapshot ID was one less than the global count, the operations in the while loop will execute at least once because EXAMINED MINIMUM must be greater than the global snapshot count to terminate the while loop 623.

Next, a for loop 624 considers each inode version of the EXAMINED DIRECTORY. Within for loop 624, is nested for loop 625 which considers snapshot ID in the governance list of the considered inode version.

Thus, for each snapshot ID of a particular inode version, decision block 626 asks whether the snapshot ID is greater than or equal to EXAMINED MINIMUM. If it is not, the next snapshot ID is considered 628. In other words, if the snapshot ID is not greater than or equal to EXAMINED MINIMUM, the governance list of the target file/dir was updated after the particular snapshot was taken. Thus, the snapshot ID is ignored because it would already be included in the governance list of the target file/dir.

However, if the snapshot ID is greater than or equal to EXAMINED MINIMUM 626, the snapshot ID is added to the governance list of the target file/dir 627. In other words, the snapshot associated with the particular snapshot ID is more recent than the last time the target file/dir was painted 626. Thus, the governance list of the target file/dir is updated 627.

Next, after each snapshot ID in a particular version has been considered, the for loop ends 628 and the next version of EXAMINED DIRECTORY, as dictated by for loop 624, is considered. Then, after all of the snapshot IDs of all of the inode versions of EXAMINED DIRECTORY have been considered, for loop 624 ends 629.

Decision block 630 then determines whether EXAMINED DIRECTORY is the root of the file system. If it is the root of the file system, the while loop 623 breaks 631. After breaking 631, the last snapshot ID field of the target file/dir is updated with the global snapshot count 635 to indicate when it was last painted. Then, the painting process 602 ends.

However, if EXAMINED DIRECTORY is not the root of the file system 630, EXAMINED MINIMUM is assigned a value equal to the greater of EXAMINED MINIMUM and last snapshot ID of EXAMINED DIRECTORY+1 632. In other words, block 632 determines whether the EXAMINED DIRECTORY or the child of the EXAMINED DIRECTORY (which was previously considered by for loops 624 and 624) was last painted. Then, if EXAMINED DIRECTORY is not out of date, as determined by the global snapshot count and the condition presented in the while loop 623, EXAMINED DIRECTORY is updated to be the parent of the previous EXAMINED DIRECTORY (given these conditions, a trivial operation) 633, and the while loop 623 ends 634 because EXAMINED MINIMUM is equal to the global count. Then, the last snapshot ID field of the target file/dir is updated with the global count to indicate when it was last painted 635, and the process ends 636.

Alternatively, if EXAMINED MINIMUM is still less than or equal the global snapshot count, the operation of reassigning EXAMINED DIRECTORY to the parent of the previous EXAMINED DIRECTORY 634 is meaningful because the snapshot IDs of all inode versions of the new EXAMINED DIRECTORY are considered in order to update the governance list of the target file/dir 627. The while loop persists until one of two conditions occur: the EXAMINED DIRECTORY is the root of the file system 631 or the EXAMINED DIRECTORY is one that is not out of date 634. When either of these conditions occur, as explained above, the last snapshot ID of the target/file directory is updated 635 and the process ends 636.

While FIG. 7B illustrates one embodiment of a painting operation, it is recognized that other embodiments may be used. For example, the process may also paint ancestors of the target file/dir or may use other looping instructions. Alternatively, the inputs and outputs may be passed as values, references, and/or stores in an accessible memory location.

b. Creating A Snapshot Version

Figure 7C:
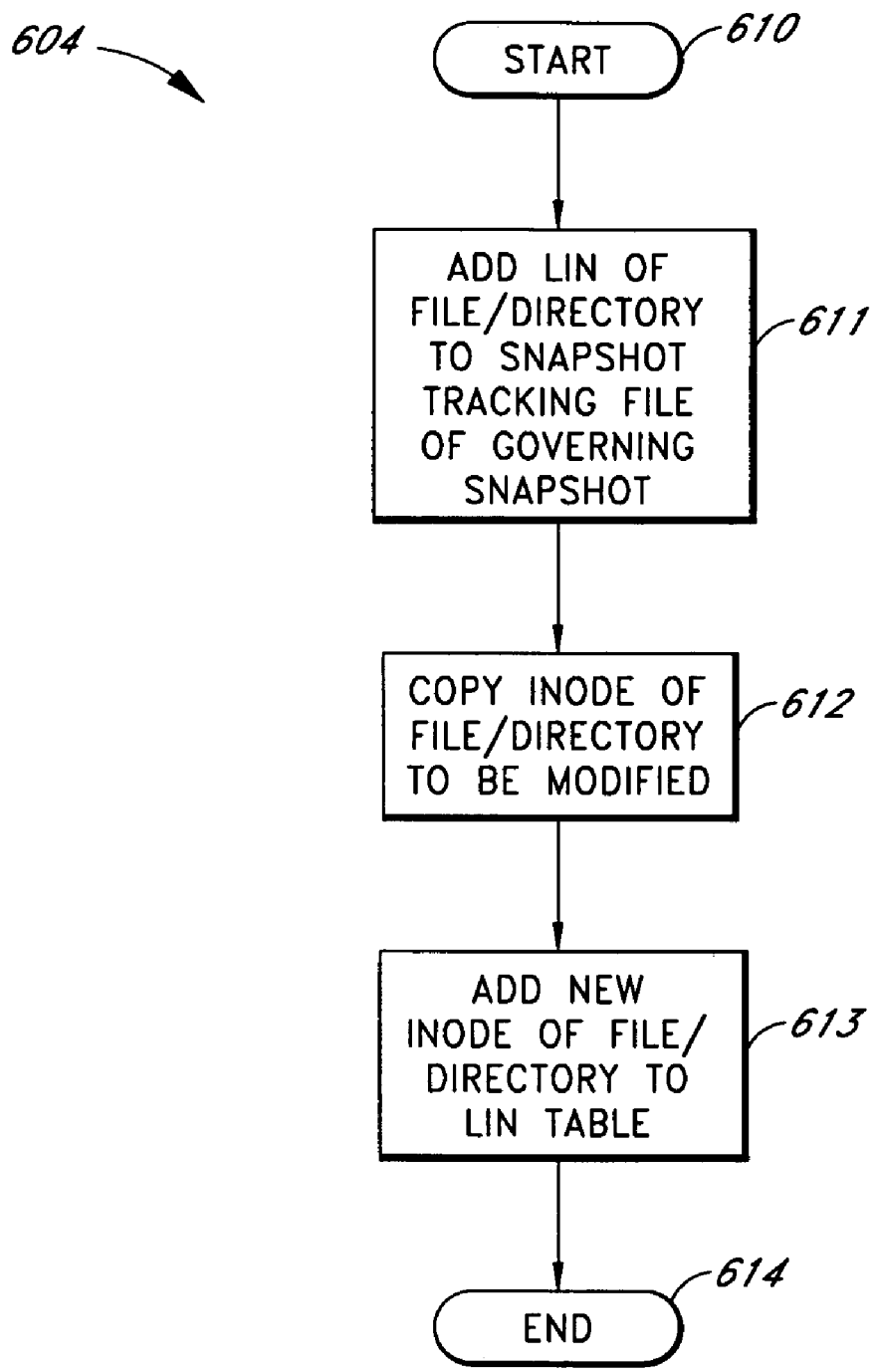
FIG. 7C illustrates one embodiment of a flowchart of operations for storing snapshot data.

FIG. 7C illustrates one embodiment of a flowchart of operations 604 for creating a snapshot version. In one embodiment, process 604 creates an inode associated with the snapshot version of a file or directory. Thus, by copying the inode of the target file/dir, creates metadata associated with a snapshot version of the file.

In one embodiment, the creating a snapshot version process 604 begins 610 by adding the LIN of the target file/dir to the snapshot tracking file associated with the governing snapshot 611. As stated previously, a list of all modified files or directories governed by a snapshot can be used when deleting the snapshot or performing other functions. Next, the inode of the target file/dir is copied 612. The copy is then added to the LIN table 612. The LIN table stores the LIN of the target file/dir and the highest snapshot ID in the governance list of the file to be modified. Then, the create snapshot version process 604 ends.

While FIG. 7C illustrates one embodiment of a creating a snapshot version operation, it is recognized that other embodiments may be used. For example, the inputs and outputs may be passed as values, references, and/or stores in an accessible memory location.

c. File: Copy On Write

Figure 7D:
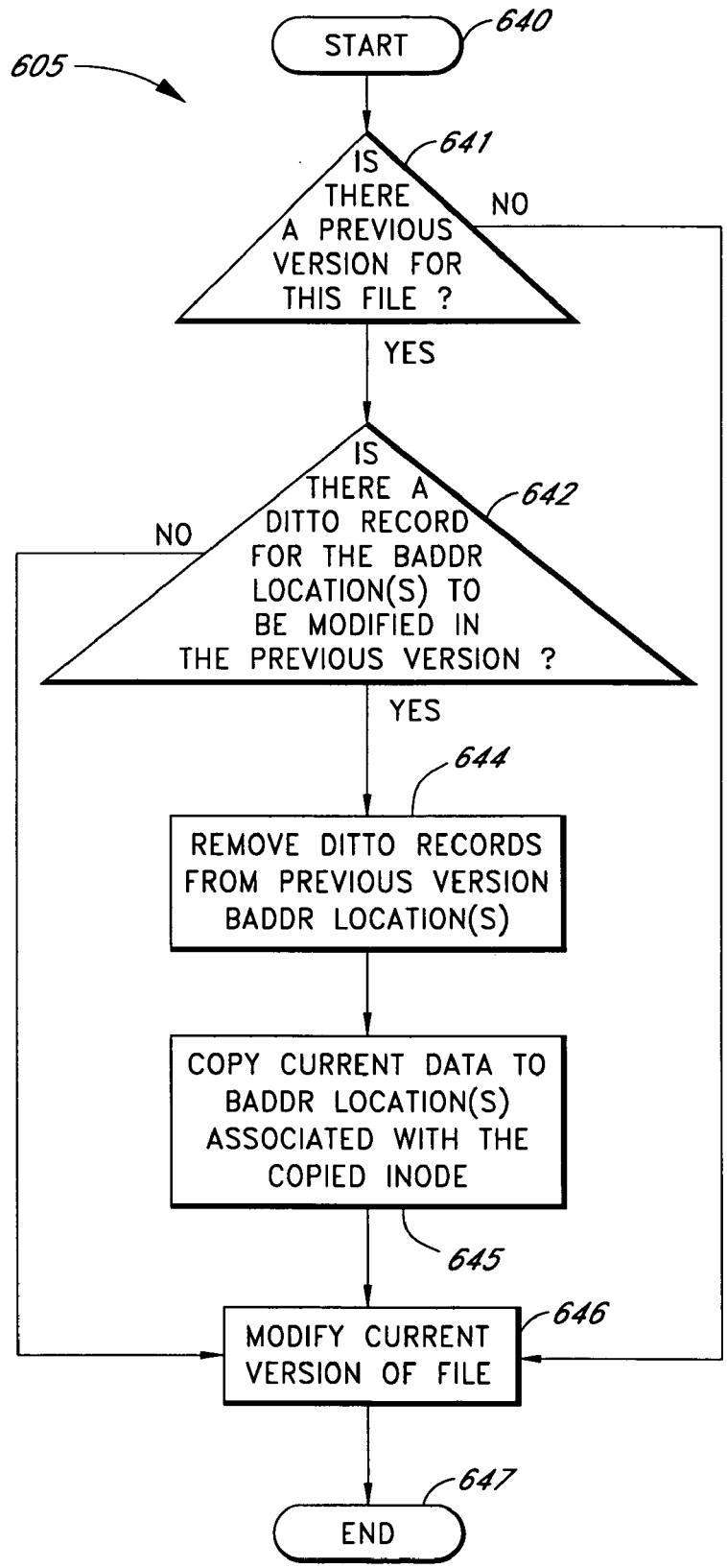
FIG. 7D illustrates one embodiment of a flowchart of operations for modifying a file governed by a snapshot.

FIG. 7D illustrates one embodiment of a flowchart of operations 605 for COWing data associated with a modified file. The file COW process 605 copies data from the version of the target file to a previous version of the file before permitting modification of the current version. Thus, the snapshot version preserves the previous version of the file. In the depicted embodiment, the process 605 performs a COW based on units consisting of data blocks. Only the data blocks of the file are written back to the snapshot version. The data blocks can vary in size and can be, for example, 1 bit, 8 bytes, 1 megabyte, 100 megabytes, or 1 gigabyte. In other embodiments, the entire file is copied to a snapshot version before the current version is modified.

In the depicted embodiment, the process 604 begins 640 in decision block 641 which determines whether there is a previous version of the target file. If there is not a previous version of the target file, the version of the target file can be modified 646 without performing a COW. A COW is unnecessary when a version of the target file does not have a previous version because that version does not need to be preserved. After the version of the target file has been modified 646, the process ends 647.

However, if there is a previous version of the target file, decision block 642 asks whether there is a ditto record or indicator for the block address location(s) ("BADDR") to be modified in the previous version. As used herein, BADDRs are used to refer to the physical address of a data block on disk. In the illustrated embodiments, files are comprised of inodes which store the metadata. The inode references a plurality of BADDR locations stored in a metatree. The BADDR locations can either point to a data block located on a physical disk or reference the next version of the target file (referred to herein as a "ditto record"). If a BADDR location is accessed and it includes an address, then it will use the address to locate data on the physical disk. However, if the BADDR location includes a ditto record, the process will look to that BADDR location in the metatree of the next most recent version. If a ditto record is located in that BADDR location, the process will look to the BADDR location in the metatree of the same BADDR location in the metatree of the next most recent version. This process continues until a BADDR location is reached that includes an address. Then, the data is retrieved from the physical disk or the cache.

In one embodiment the metatree is comprised of an array. In other embodiments, the metatree is comprised of a linked list. In yet other embodiments, the metatree is comprised of a hybrid of a linked list and a plurality of arrays. A person with ordinary skill in the art will recognize that other data structures are considered suitable for storing information related to file data.

In decision block 642, if a ditto record is not found at a BADDR location(s), an address has been found. Thus, the data has already been COWed to the BADDR location(s). In other words, the corresponding BADDR location(s) has been modified at least once the snapshot was created. Therefore, the BADDR location(s) can be modified in the current version 646 directly and the process ends 647.

However, if a ditto record exists at the BADDR location(s), the ditto record is removed 644. Then, data from the BADDR location(s) of the target file is copied to the BADDR location (s) of the previous version 645. Next, the BADDR location(s) of the target file are modified 646 and the process ends 647.

While FIG. 7D illustrates one embodiment of a file COW operation 605, it is recognized that other embodiments may be used. For example, the inputs and outputs may be passed as values, references, and/or stores in an accessible memory location. Additionally, other embodiments may represent and store data common to more than one version using different data structures such as, for example, using a physical model, a hybrid model or a log-based model.

d. Directory: Copy on Write

Figure 7E:
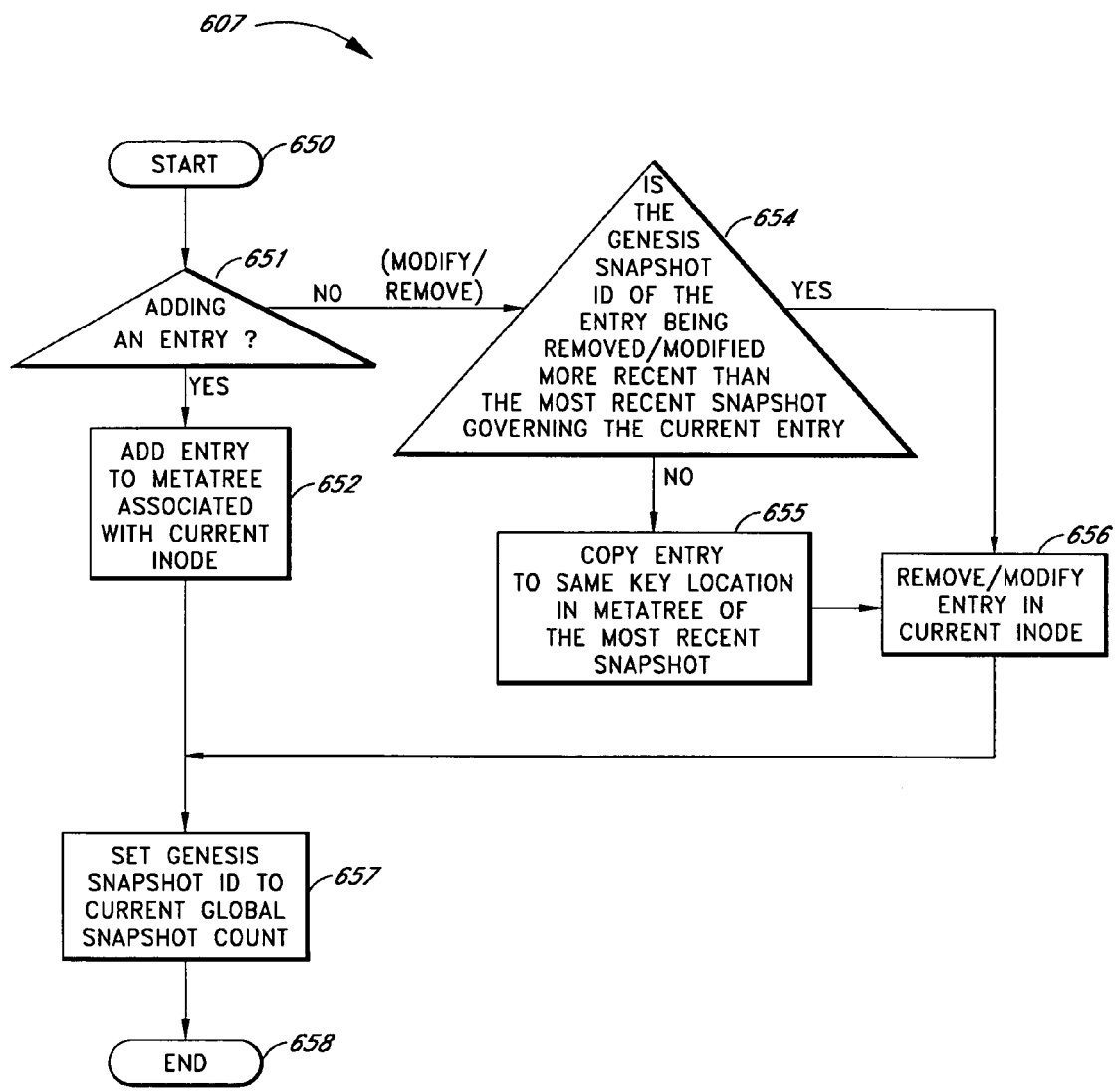
FIG. 7E illustrates one embodiment of a flowchart of operations for modifying a directory governed by a snapshot.

FIG. 7E illustrates one embodiment of a flowchart of operations 607 for COWing data associated with a modified directory. The directory COW process 607 copies references to old versions of files and directories before permitting modification. In the depicted embodiment, an inode associated with a directory references a metatree that stores information about the child inodes located within the directory. In some embodiments, information about child inodes includes, but is not limited to, the name associated with the child inode, the LIN of the child inode, and the genesis snapshot ID associated with a particular version of the child inode. In other embodiments, less or more information may be stored in the metatree such as, for example, the size of the file or directory associated with the child inode.

In the depicted embodiment, process 607 begins 650 in decision block 651 by determining whether the entry is being added to a target directory or whether an entry within the target directory is being modified or removed. In one embodiment, if an entry is being added to the current version, it is unnecessary to COW the new entry because previous versions of the target directory do not include the new entry. Consequently, the entry can be added to the metatree associated with the target directory 652. Then, the genesis snapshot ID of the entry in the metatree of the target directory is set to the global snapshot count 657 and the process ends 658.

If, however, an entry in the target directory is being modified or removed, decision block 654 asks whether the genesis snapshot ID of the entry is more recent than the most recent snapshot ID in the governance list of the target directory. If the snapshot ID of the entry is more recent than the most recent governing snapshot, the entry is not governed by a snapshot. Therefore, the entry can be removed or modified 655 without COWing the entry to a previous version of the target directory.

However, if the snapshot ID of the entry is not as recent as the latest governing snapshot, the entry is copied to the next-most previous version of the target directory 655 before the target directory can be removed or modified 656. In some embodiments, the entry is copied to the same location in the metatree of the previous version.

After the target directory has been modified, the genesis snapshot ID of the entry is set to the global count 657, and the process ends 658.

While FIG. 7E illustrates one embodiment of a directory COW operation 607, it is recognized that other embodiments may be used. For example, an entry may be added, removed or modified in any version of the directory. Additionally, the inputs and outputs may be passed as values, references, and/ or stores in an accessible memory location.

VII. Snapshot Deletion

Figure 8:
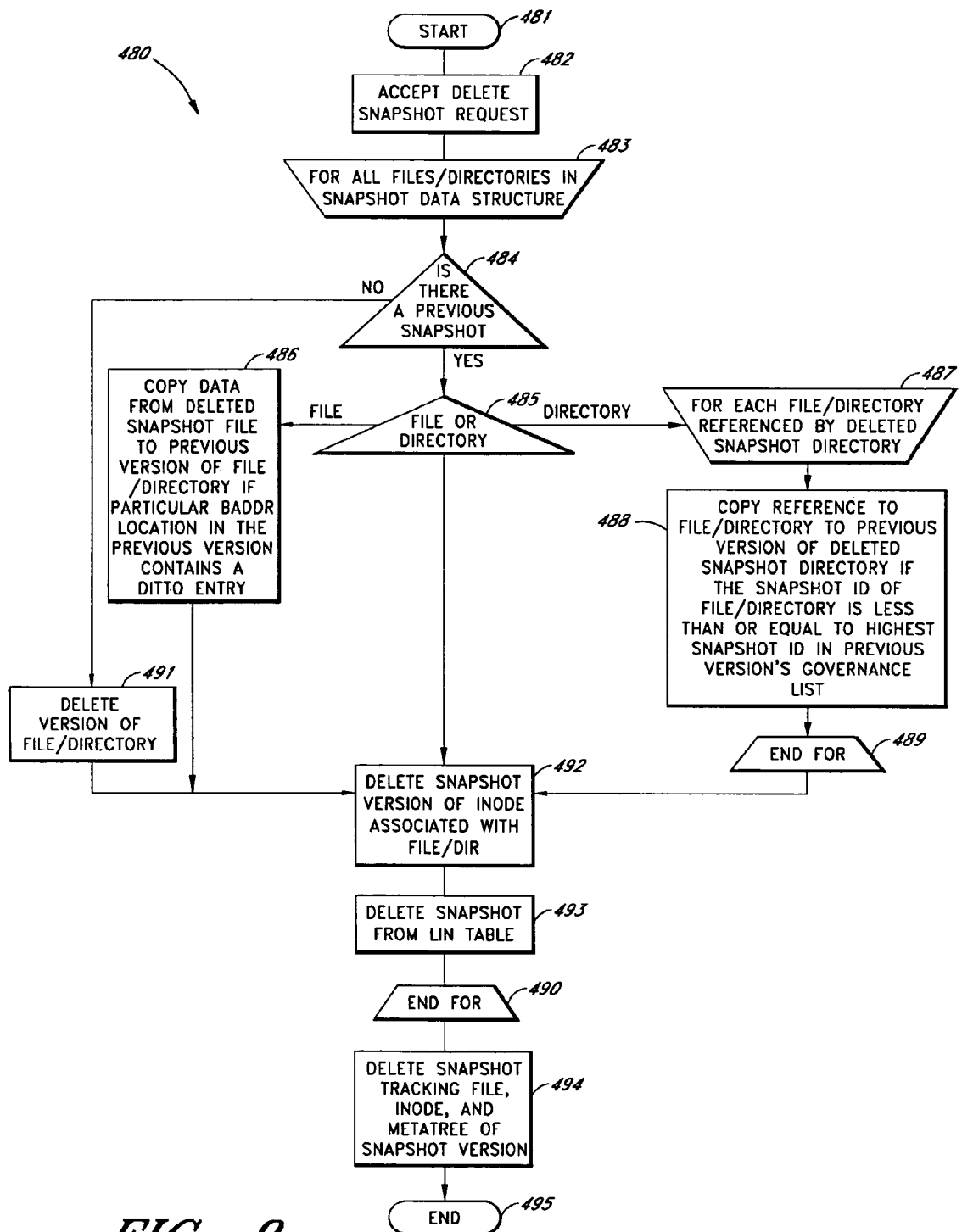
FIG. 8 illustrates one embodiment of a flowchart of operations for deleting a snapshot.

FIG. 8 illustrates one embodiment of a flowchart of operations 480 for deleting a snapshot. Snapshot deletion is a useful tool for freeing physical disk resources. For example, suppose a portion of a file system is used to develop an upcoming software release. Also suppose that snapshots are taken of that portion on a daily basis in order to preserve changes to files during the development process. When the software is released, there may no longer be a need to access previous versions of the software. Therefore, a system administrator can utilize the delete snapshot operation of FIG. 7 in order to free disk space occupied by previous versions. In one embodiment, snapshots older than a specified time may be deleted. In another embodiment, snapshots that fall between a specified time range may be deleted. In the depicted embodiment, a single snapshot is deleted.

The delete snapshot process 480 begins 481 by accepting a delete snapshot request 482 from a user, client application, application, or other source. Next, a for loop 483 considers all files and/or directories in the snapshot tracking file. As previously discussed, in one embodiment, the snapshot tracking file comprises a list of all files and directories that were modified or deleted after the snapshot was created.

For each considered file, decision block 484 asks whether a previous snapshot governs the snapshot to be deleted. If there is not a previous governing snapshot, the snapshot version of the considered file or directory can be deleted 491. In one embodiment, the version of the file or directory is deleted without any copy operations because previous versions do not store data referenced by future versions.

Next, the inode associated with the snapshot of the considered file or directory is deleted 492. Then the LIN/snapshot ID pair for the considered version of the file or directory is deleted from the LIN table 493. Then, for loop 483 considers the next file or directory in the snapshot tracking file.

However, in decision block 484, if there is a previous snapshot, decision block 485 asks whether a file or directory is being considered by the for loop 483. If a file is being considered, data is copied to BADDR locations in a previous version of the file if the particular BADDR location includes a ditto entry referencing the deleted snapshot.

If, however, decision block 484 considers a directory, for loop 487 considers each file or directory referenced by the directory considered by for loop 483. For each referenced file or directory, process considers whether the snapshot ID of the referenced file or directory is less than or equal to the highest snapshot ID in the governance list of the previous snapshot 488. If it is, the reference to the file or directory is copied to the previous version. This comparison of snapshot IDs determines whether the referenced file or directory was created after the next-most previous snapshot was created. Thus, if the referenced file or directory was created after the previous snapshot, then COWing the referenced file or directory is unnecessary because the referenced file or directory did not exist at the time the previous snapshot was created. After all of the referenced files or directories have been considered, the for loop 487 ends 489.

After the file or directory in the snapshot tracking file has been COWed 486, 488, operations 492 and 493 execute.

Then, after all of the files and directories in the snapshot tracking file have been considered, the for loop 483 ends 490. Next, the snapshot tracking file associated with the snapshot is deleted 494, and the delete snapshot process 480 ends 495.

While FIG. 8 illustrates one embodiment of a delete snapshot operation 480, it is recognized that other embodiments may be used. For example, the inputs and outputs may be passed as values, references, and/or stores in an accessible memory location.

VIII. Read File

Figure 9:
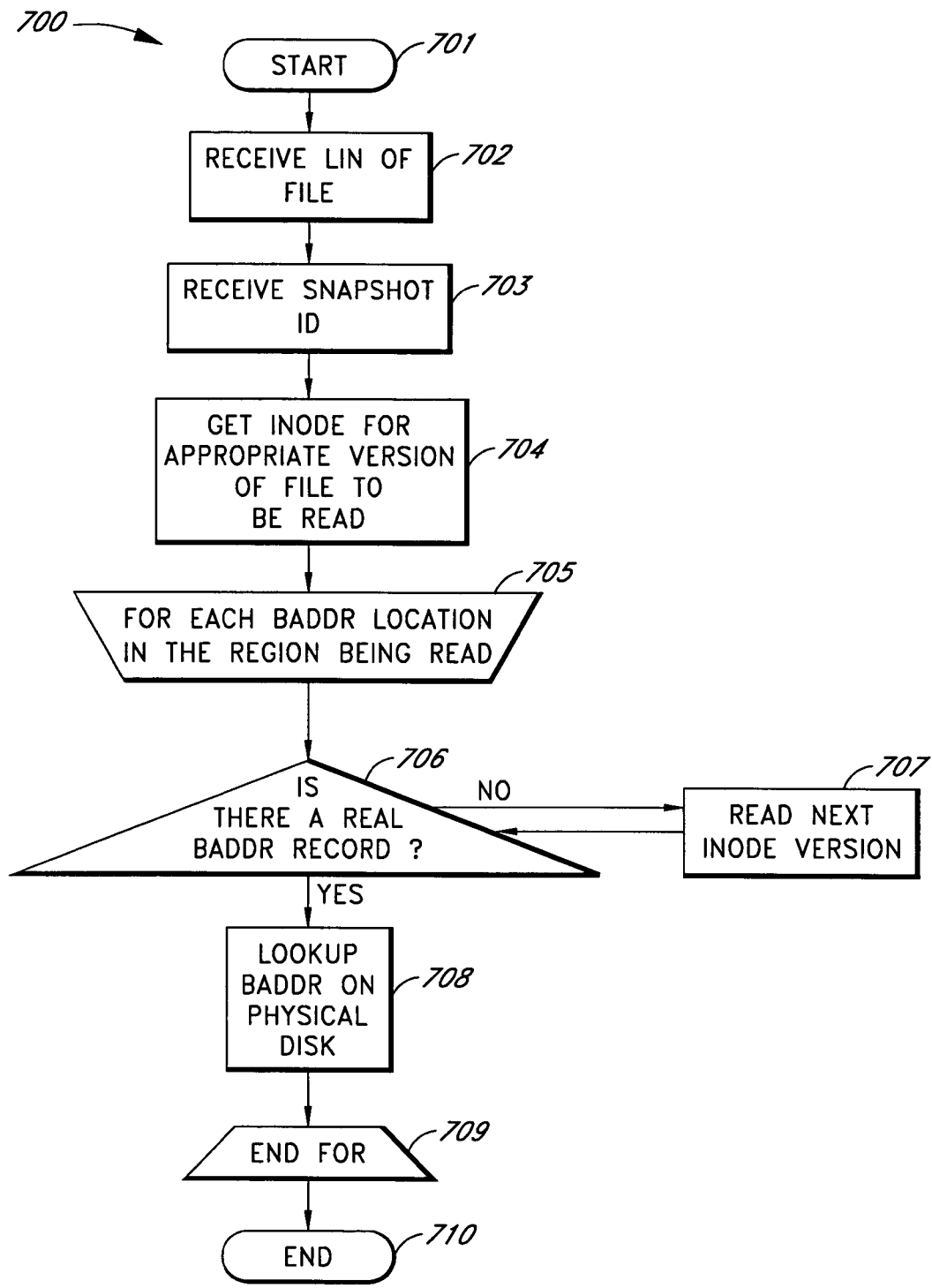
FIG. 9 illustrates one embodiment of a flowchart of operations for reading a version of a file.

FIG. 9 illustrates one embodiment of a flowchart of operations 700 for reading a version of a file governed by a snapshot. In the depicted embodiment, the metatree is the current version of a file includes addresses in all of its BADDR locations. That is, no ditto records are found in the current version. Thus, the current version can be read directly by accessing the metatree and referencing the indicated locations on the physical disk. However, when accessing a snapshot version of a file, some BADDR locations may include a ditto record. For these BADDR locations, subsequent versions of the file need to be accessed until a location is reached that includes an address ("a real BADDR record").

In one embodiment, the read file process 700 begins 701 by receiving the LIN of the file version to be read 702 and the snapshot ID of the file version 703. In another embodiment, the path to the file version is received. In one embodiment, the snapshot ID of the file version 703 is stored in an in-memory cache structure. In embodiments that utilize the user interface described with respect to FIG. 28, the path includes a snapshot/subdirectory if a snapshot version is sought.

Next, the process gets the inode that corresponds to the received LIN/snapshot ID pair. This step can be performed using lookup techniques known to those with ordinary skill in the art.

After the inode has been retrieved, a for loop 705 considers each BADDR location in the portion of the metatree being read. Then, for each BADDR location, decision block 706 asks whether there is a real BADDR record exists. If a real BADDR record exists, the process looks up the BADDR on the physical disk 708 and retrieves data. However, if a real BADDR record does not exist, the process reads the next inode version 707. Again, the process will determine if a real BADDR record exists in the next version 706. The process will continue looking to subsequent versions 707 until it finds a real BADDR record in the considered BADDR location. When a real BADDR record is found, the process looks up the BADDR on the physical disk 708 and retrieves the data.

After all of the BADDR locations in the portion of the metatree being read have been considered, the for loop ends 709 and the read file process ends 710.

While FIG. 9 illustrates one embodiment of a read file operation 700, it is recognized that other embodiments may be used. For example, the inputs and outputs may be passed as values, references, and/or stores in an accessible memory location.

IX. Directory Lookup

Figure 10:
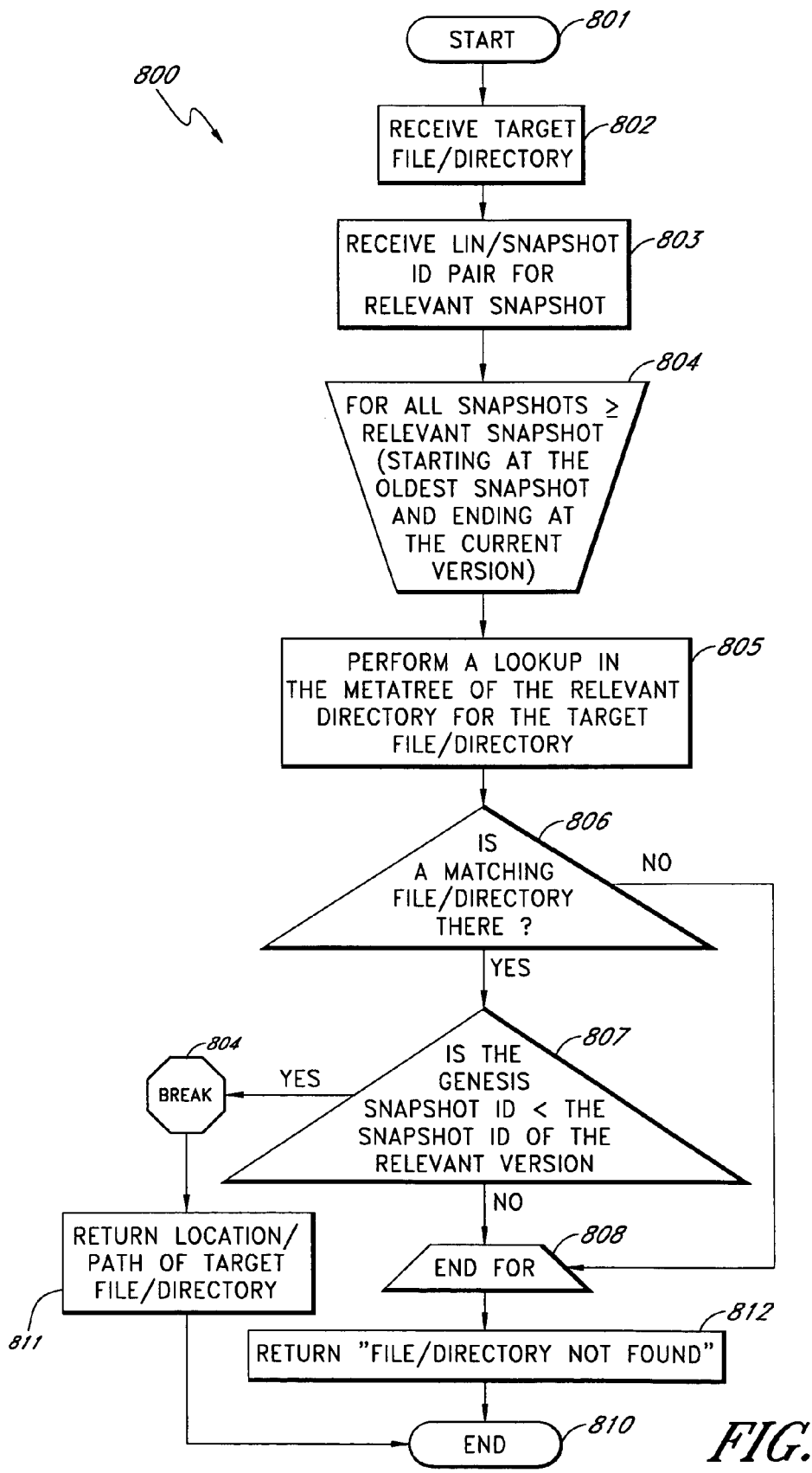
FIG. 10 illustrates one embodiment of a flowchart of operations for performing a lookup operation on a version of a directory.

FIG. 10 illustrates one embodiment of a flowchart of operations for performing a lookup operation 800 on a version of a directory governed by a snapshot. This process permits a user or client application to determine whether a target file or directory is located in a particular snapshot version of a directory. For example, if the user or client application wants to access the version of a target file at the time a particular snapshot was created, process 800 determines whether the target file existed at the time of the snapshot. If the target file did exist for that snapshot, the process returns the location of the file. However, if the target file did not exist for that snapshot, the process returns an indication that the target file could not be found.

In one embodiment, the directory lookup process 800 begins 801 by receiving a target file or directory. The target file or directory is the version of a file or directory a user or client application wishes to access from a particular snapshot. Next, the process receives the LIN/snapshot ID of the particular snapshot 803, the "relevant snapshot," of a parent directory, the "relevant directory," that may or may not include the target file or directory.

Then, a for loop 804 considers all snapshots of the relevant directory that have a snapshot ID greater than or equal to the snapshot ID of the relevant snapshot. In one embodiment, the range of snapshots are considered from oldest to newest. Considering the snapshots in this way can speed up the lookup operation for target files or directories that have been modified frequently. That is, if the target file or directory has been modified frequently, the COWed version of the target file or directory is more likely to appear as an entry in an older version of the relevant directory rather than a newer version of the relevant directory. In other embodiments, the for loop 804 considers the range of snapshots from newest to oldest. Considering snapshots in this order is more efficient for target files directories that are rarely, if ever, modified because they are more likely to appear in a newer version of the relevant directory.

For the snapshot being considered, the process performs a lookup in the metatree of the relevant directory for the target file or directory. In other embodiments, the lookup may be performed in another data structure that stores entries corresponding to the children of the relevant directory.

Next, decision block 806 asks whether an entry matching the target file or directory is found in the metatree of the considered version of the relevant directory. If it is not, the next snapshot is considered 804 and the lookup is repeated 805. However, if a matching entry is found in the considered version, decision block 807 asks whether the genesis snapshot ID of the matching entry is less than the snapshot ID of the relevant version. If the genesis snapshot ID of the entry is less than the snapshot ID of the relevant version 807, the for loop breaks 809 and the location or path of the appropriate version of the target file or directory is returned 811. Then, the process 800 ends 810.

However, if the genesis snapshot ID of the matching entry is not less than the snapshot ID of the relevant version 807, the matching entry was a version created after the relevant snapshot and was, therefore, not an entry in the relevant version of the relevant directory. The process then considers the next snapshot within the range. If the for loop 804 considers every snapshot within the range and is unable to find a matching entry 806 with a genesis snapshot ID less than the snapshot ID of the relevant version 807, the for loop 804 ends 808. Thus, the process returns an indication that the target file or directory was not found 812.

While FIG. 10 illustrates one embodiment of a directory operation 800, it is recognized that other embodiments may be used. For example, the inputs and outputs may be passed as values, references, and/or stores in an accessible memory location.

X. Read Directory

Figure 11:
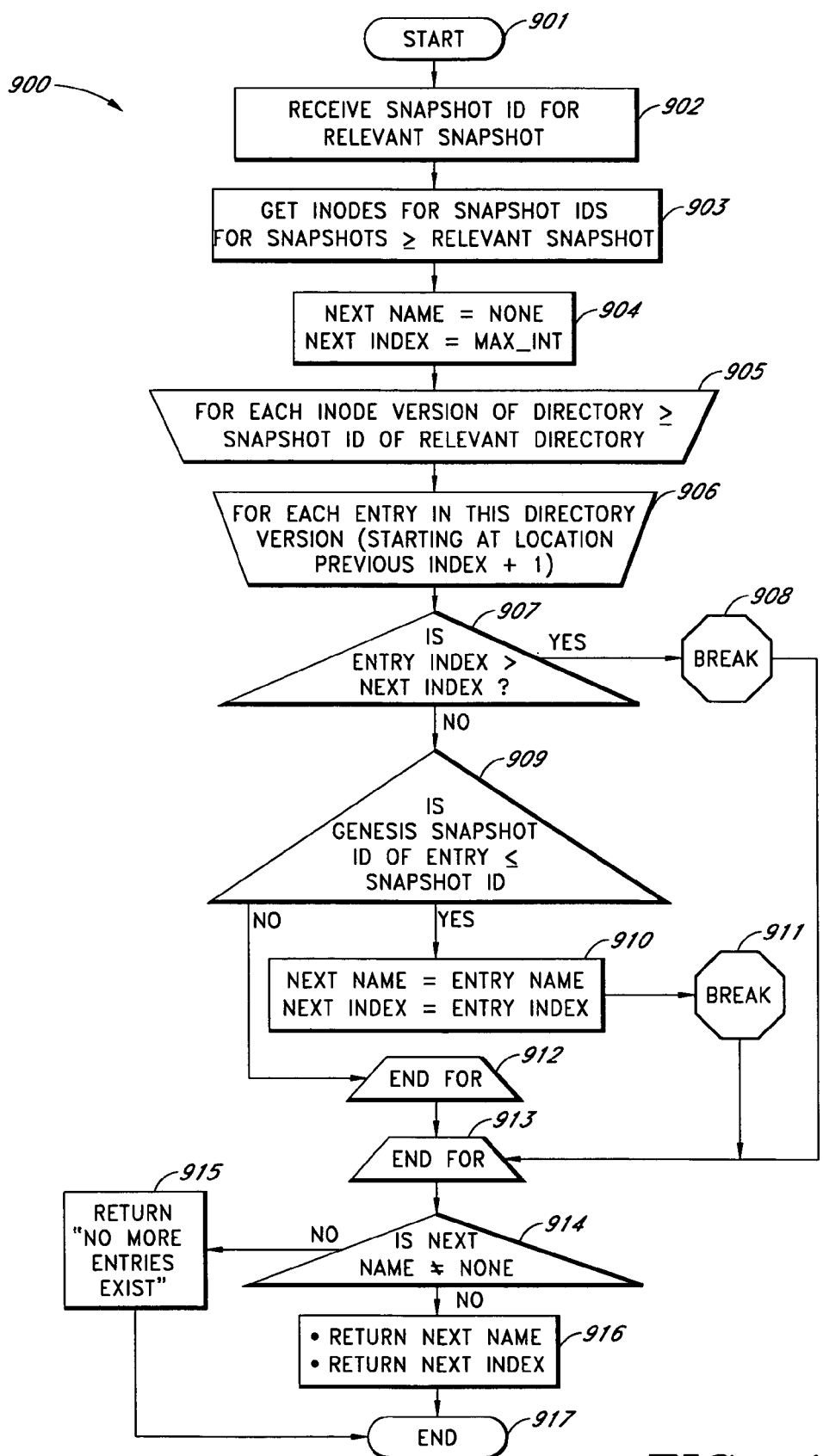
FIG. 11 illustrates one embodiment of a flowchart of operations for performing a read directory operation on a version of a directory.

FIG. 11 illustrates one embodiment of a flowchart of operations for performing a read directory operation 900 on a version of a directory governed by a snapshot. In the depicted embodiment, the read directory operation returns one entry (such as, a file or a directory) located in a version (or, "relevant version") of a directory (or, "relevant directory") each time it is executed. It will be appreciated by one with ordinary skill in the art that the depicted embodiment may be modified to return some or all of the entries located within the relevant version of the relevant directory.

Because the depicted embodiment, returns only one entry from the relevant version at a time, an index is used. The index serves as a bookmark that indicates which entry in the relevant version the read directory operation returned last. In the depicted embodiment, the bookmark is implemented using a variable named NEXT INDEX. In one embodiment, NEXT INDEX is the key of the directory entry in the B-tree structure of the relevant directory. It will be appreciated by one with skill in the art that the key is a value that is a identifier of the entry that is unique to at least one of a file system, a B-tree, a storage node, and a storage device. Accordingly, NEXT NAME is the name of the entry that has a key equal to NEXT INDEX.

Additionally, because the read directory operation 900 returns one entry at a time, the process returns an entry in response to an index value, PREVIOUS INDEX, that corresponds to the key of the last entry returned by the operation. The use of PREVIOUS INDEX helps ensure that process 900 does not return entries that were previously returned. Thus, process 900 is a function of PREVIOUS INDEX.

The process 900 begins 901 by receiving the snapshot ID of the relevant snapshot 902. Then, the process gets all snapshots with snapshot IDs greater than or equal to the snapshot ID of the relevant snapshot 903. In one embodiment, the process retrieves this range of snapshots because entries for a particular version of a directory are stored either as an entry in that directory version or in subsequent versions. Thus, the process looks at the relevant version or look ahead to retrieve entries located within the relevant version. After the inodes are retrieved 903, the process creates the variable NEXT NAME, and the variable NEXT INDEX, initializing it to a value of MAX_INT 904.

Then, a for loop 905 considers each of the retrieved inodes. Next, a nested for loop 906 considers each entry in the version considered by for loop 905, starting at a location in the relevant directory corresponding to PREVIOUS INDEX+1.

Decision block 907 asks whether the index of the considered entry is greater than NEXT INDEX. For the first entry considered, the index of the entry will not be greater than NEXT INDEX because NEXT INDEX is initialized to MAX_INT. However, for subsequent considered entries, if the index of the entry is greater than NEXT INDEX, the for loop 906 breaks 908 and the next version of the relevant directory is considered 905.

If the index of the considered entry is not greater than NEXT INDEX 907, decision block 909 asks whether the genesis snapshot ID of the entry is less than or equal to the snapshot ID of the relevant version. If it is not, the next entry in the version is considered 906.

However, if the genesis snapshot ID of the considered entry is less than or equal to the snapshot ID of the relevant version, the entry was created before the relevant version and is, therefore, a child of the relevant version of the relevant directory. Thus, NEXT NAME is assigned a value that corresponds to the name of the considered entry, and NEXT INDEX is assigned a value that corresponds to the index of the entry 910. Next, for loop 906 breaks 911 and the next inode version is considered 905. However, if all of the entries in the considered version have neither an entry index greater than NEXT INDEX 907 nor a genesis snapshot ID less than or equal to the snapshot ID of the relevant version 909, for loop 906 ends 912 and the next version is considered 905.

Even if the operation of block 910 executes in a previous iteration of for loop 905, the next version is considered because there could exist an entry that has an index that is greater than PREVIOUS INDEX+1 but less than the present value of NEXT INDEX. After all versions of the relevant directory within the range have been considered, for loop 905 ends 913. Next, decision block 914 asks whether NEXT NAME stores a value. If it does store a value, an entry within the relevant version with an index greater than PREVIOUS INDEX was found, and the process returns NEXT NAME and NEXT INDEX 916. However, if NEXT NAME does not store a value, no entry in the relevant version with an index greater than PREVIOUS INDEX was found, and the process returns "NO MORE ENTRIES EXIST" 915.

While FIG. 11 illustrates one embodiment of a directory operation 900, it is recognized that other embodiments may be used. For example, all entries may be returned by recursively calling operations 905-916 and reassigning PREVIOUS INDEX to equal NEXT INDEX, each time the operations 905-916 are called. Additionally, the inputs and outputs may be passed as values, references, and/or stores in an accessible memory location.

XI. File Structure Implementations

In the embodiment discussed above, inodes associated with files reference BADDR locations in a metatree that store either real BADDR records or ditto records which reference the next version of the file. For ease of reference, this file structure implementation will be referred to as the logical model. However, it is recognized that other file structure implementations exist, such as, for example, a physical model, a hybrid model and a log-based model. Each of these models is described in detail below.

a. Logical Model

Figure 12A:
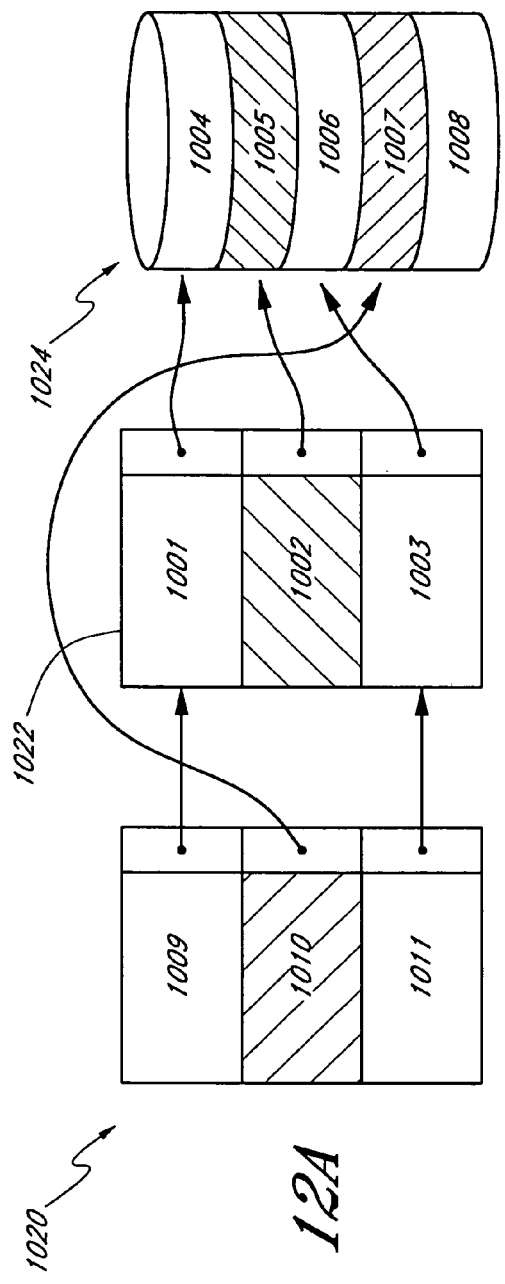
FIG. 12A illustrates one embodiment of a logical model file structure implementation.

FIG. 12A illustrates one embodiment of a logical model file structure implementation. The logical model utilizes an inode/metatree pair for the current version of the file and an inode/metatree pair for each snapshot version of the file. Metatree 1022 represents the current version of a file and metatree 1020 represents a snapshot version of the file. The current version stores records for all BADDR locations in the metatree that point to the physical disk 1024. Thus, the BADDR addresses corresponding to locations 1001 reference data blocks 1004, BADDR locations 1002 reference data blocks 1005, and BADDR locations 1003 reference data blocks 1006.

The snapshot version of the file only references data blocks on the physical disk 1024 that have been modified and thereby COWed since the snapshot was created. Accordingly, because BADDR locations 1002 were modified, BADDR locations 1010 reference data blocks 1007. The remaining BADDR locations in the snapshot version 1009, 1011 include ditto records which reference the next-most recent version 1022. Accordingly, ditto records such as 1009 and 1011 can represent large amounts of data by acting as a compact placeholder.

b. Physical Model

Figure 12B:
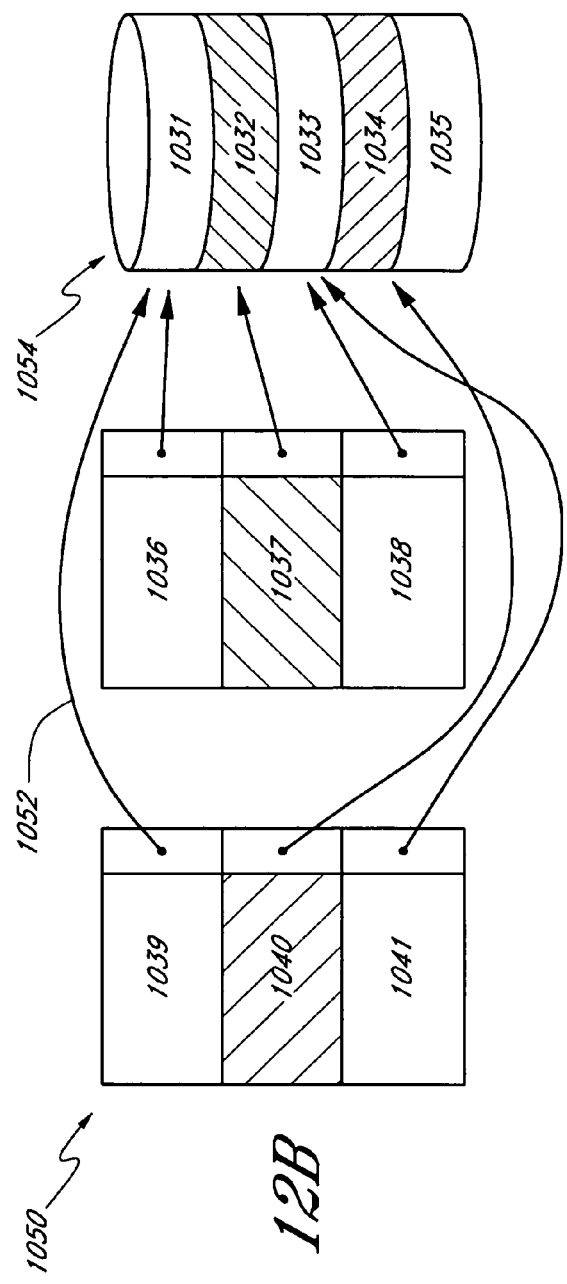
FIG. 12B illustrates one embodiment of a physical model file structure implementation.

FIG. 12B illustrates one embodiment of a physical model file structure implementation. The physical model utilizes an inode/metatree pair for the current version of the file and an inode/metatree pair for each snapshot version of the file. The current version stores records for all BADDR locations in the metatree that point to the physical disk 1054. Thus, the BADDR addresses corresponding to locations 1036 reference data blocks 1031, BADDR locations 1037 reference data blocks 1032, and BADDR locations 1038 reference data blocks 1033.

The snapshot version 1050 of the file references data blocks in the same way that the current version 1052 references data blocks. BADDR locations 1039 references the same data blocks 1031 as BADDR locations 1036 because the data was not modified after the snapshot was created, and BADDR locations 1041 similarly reference the same data blocks 1033 as BADDR locations 1038. However, BADDR locations 1040 reference different data blocks than BADDR locations 1037 because this portion of the file was modified and consequently COWed. Accordingly, BADDR locations 1040 reference data blocks 1034.

The physical model offers identical snapshot version and current version read times because real BADDR locations are stored in all BADDR locations of the snapshot version. That is, the indirection of the physical model is not present. However, the physical model may be less desirable than the logical model because unchanged portions of the metatree cannot be compactly stored using ditto records.

c. Hybrid Model

Figure 12C:
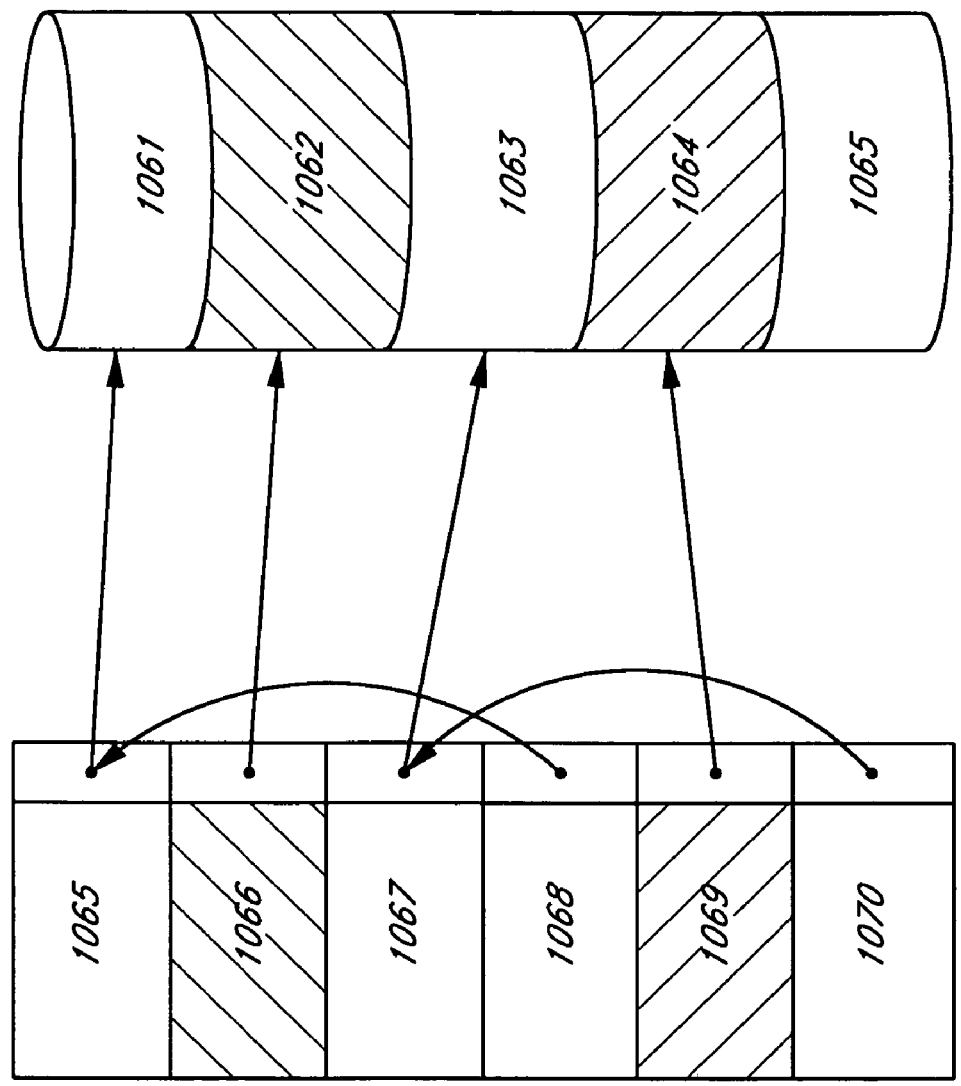
FIG. 12C illustrates one embodiment of a hybrid model file structure implementation.

FIG. 12C illustrates one embodiment of a hybrid model file structure implementation. In the hybrid model, the current version and all snap shot versions are stored in a single inode/metatree pair. BADDR locations 1065, 1066, and 1067 represent the current version. Accordingly, BADDR locations 1065, 1066 and 1067 reference data blocks 1061, 1062 and 1063, respectively, and BADDR locations 1068, 1069 and 1070 represent a snapshot version. Because the data in BADDR locations 1065 was not modified after the snapshot was created, BADDR locations 1068 reference BADDR locations 1065 of the current version. Similarly, BADDR locations 1070 references BADDR locations 1067 of the current version. However, because the data in BADDR locations 1066 was modified after the snapshot was created, BADDR locations 1070 references data blocks 1064.

The hybrid model may be more desirable than the logical model when a large number of snapshots have been modified frequently because the indirection in between data structured in the logical model may slow down read operations. However, lookups for delete snapshot operations in a potentially large metatree of the hybrid model may be computationally expensive.

d. Log-Based Model

Figure 12D:
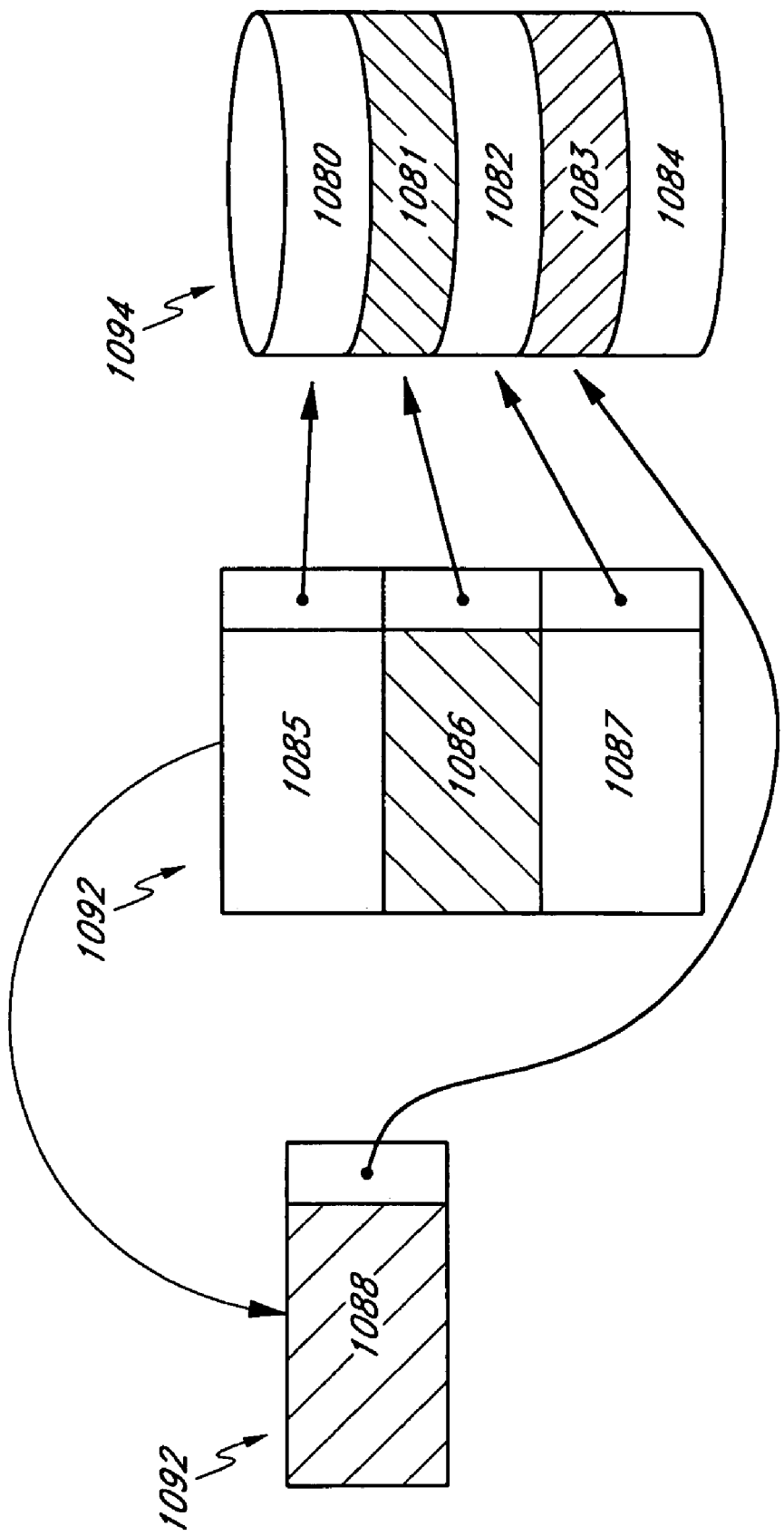
FIG. 12D illustrates one embodiment of a log-based model file structure implementation.

FIG. 12D illustrates one embodiment of a log-based model file structure implementation. In the log-based model, the current version of a file is stored in an inode/metatree pair 1092 that references the physical disk 1094. Portions of the file that have been modified are COWed to a log 1090 that is referenced by the metatree associated with the current version 1092. Thus, BADDR locations 1088 stored COWed data because data in BADDR locations 1086 have been modified. Reading snapshot data under the log-based model can be performed by reconstructing versions of the file by accessing both the log and the current version of the file. For example, in the depicted embodiment, reading the snapshot data would require accessing BADDR locations 1085, 1088 and 1087.

The log-based model may be more desirable than the other models because snapshot data can be stored compactly, permitting tracking of even single-byte modifications. However, the log-based model may be less desirable than the other models because read operations are more computationally expensive.

XII. Exemplary Applications

FIGS. 13A-D and FIGS. 14A-D provide examples of operations in a file system that implements one embodiment of the snapshot disclosed herein. It is recognized that, though considered, not all possible operations are discussed.

a. File Operations

Figure 13A:
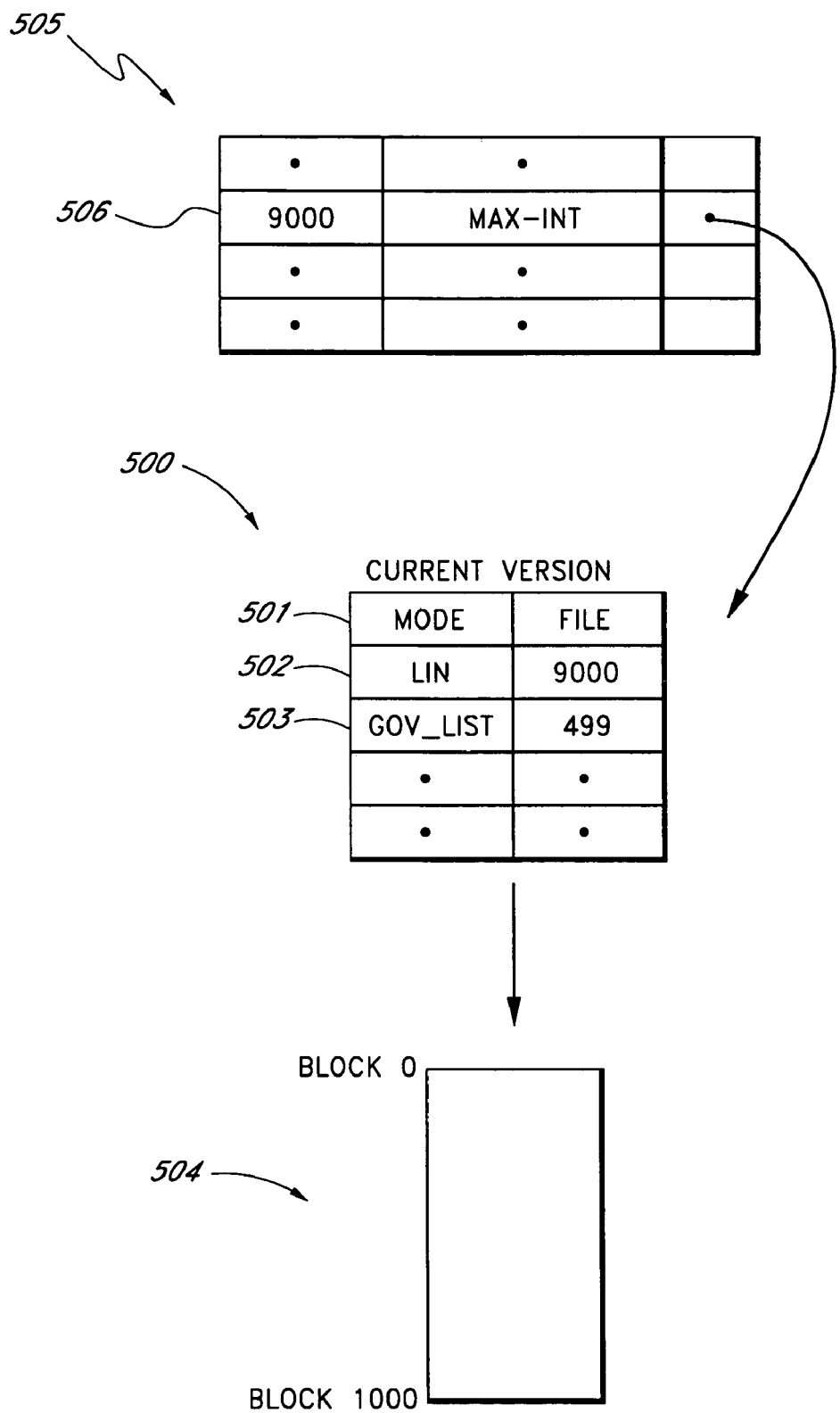
FIGS. 13A-D illustrate one embodiment of data structures for one embodiment of creating snapshots of a file, modifying the file, and deleting a snapshot of the file.

FIG. 13A illustrates one embodiment of a file. The depicted inode/metatree pair corresponds to the current version of a file that is governed by a snapshot. The inode 500 comprises fields corresponding to the mode 501, LIN 502, and the governance list 503. The inode 500 points to the metatree associated with the file 504. The metatree is comprised of BADDR locations that reference blocks on the physical disk.

Before the snapshot governed the file, the governance list of the file stored an empty set, indicating that no snapshots govern the file. Reference to FIG. 6, illustrates the creation of the snapshot of the file shown in FIG. 12A. The process received the path of the file 402 as the root of the snapshot. Next, a snapshot tracking data structure (not shown in FIG. 12A) was created that corresponds to the snapshot taken of the file 403. The global count at the time the snapshot was created is added to the snapshot tracking data structure 404. This value is the snapshot ID. In this example, the snapshot ID is 499.

Because the file is not the root of the file system, a mini-snapshot is created for each of the ancestors of the file to the root of the file system 406, 407, 408. Next, the snapshot ID is added to the governance list of the inode associated with the current version of the file 409. Thus, though the governance list of the snapshot was formerly an empty set, the snapshot of the file is created once the snapshot ID, 499, is added to the governance list 503 of the file's inode 500.

Additionally, the LIN table 505 includes an entry 506 that references the current version of the file. The entry 506 indicates the LIN of the file, 9000, and the genesis snapshot ID of the inode, MAX_INT. MAX_INT is used to indicate that the entry 506 references the most current version of the file. In the depicted embodiment, the LIN table 505 does not include an entry for snapshot ID 499, either before or after snapshot creation, because the current version was not modified after the snapshot was created. In this embodiment, if a user or client application wishes to access snapshot 499, a lookup in the LIN will reveal no entry for snapshot 499 and consequently, the inode with the next highest snapshot ID, MAX_INT, is accessed. In other embodiments, the LIN table 505 may include an entry with LIN 9000 and genesis snapshot ID 499 that references the current version of the file. In other words, there would be two entries in the LIN table 505 that reference the same inode.

Figure 13B:
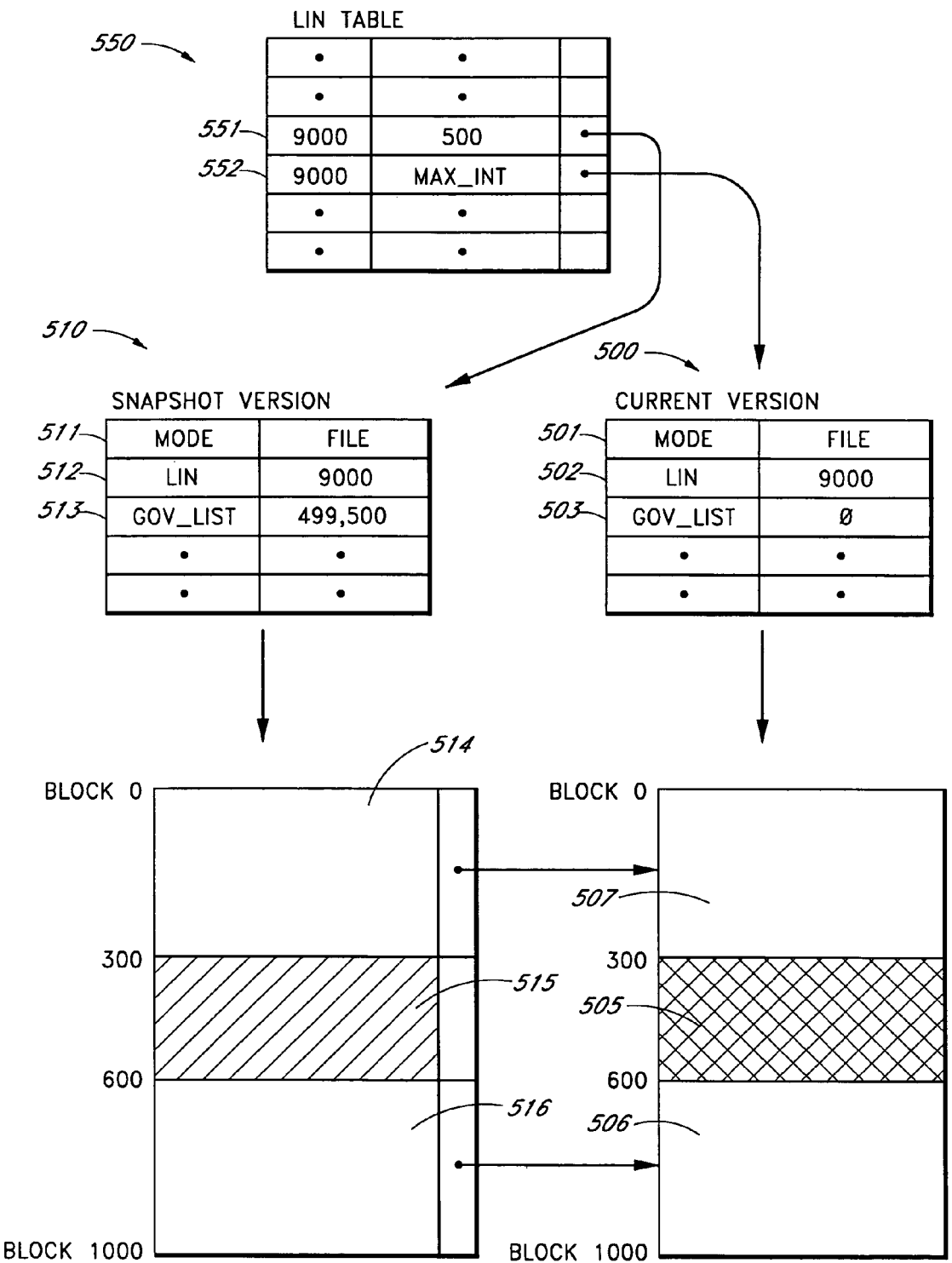

FIG. 13B illustrates the embodiment of FIG. 12A after two operations have been executed: a second snapshot of the file was created, and then, a portion of the file was modified.

When the second snapshot was created, process 400 of FIG. 6 was executed in a similar manner as described above with respect to snapshot 499. For this snapshot, the global count was 500 at the time the second snapshot was created. Therefore, the governance list of the inode associated with the current version listed snapshot IDs 499 and 500. Immediately after snapshot 500 was created, the LIN table did not change. Thus, a lookup for snapshot ID 500 would yield no match and the next highest snapshot ID, MAX_INT, would be accessed.

Next, the data associated with BADDR locations 300-600 505 in the current version were modified. Reference to FIG. 7A illustrates the relevant operations for modifying the current version of the file. The process begins 601 by calling the painting process 602 depicted in FIG. 7B. In the painting process 602, decision block 621 asks whether the snapshot ID of the target file/dir is less than the global count. Because we assume that the global count is 500, the snapshot ID, 500, is equal to the global count. Thus, the operations of the painting process 602 are not required and process 602 ends 636.

Next, decision block 603 asks whether the file is governed by a snapshot. The governance list of the current version indicates that both snapshots 499 and 500 govern the current version of the file. Thus, the create snapshot version of file/dir process 604 is called. First, the LIN of the file, 9000 is added to the tracking file of the governing snapshot (not shown) 611. Next, the inode of the file is copied 612. The copy of the inode is represented by data structure 510 in FIG. 13B. Accordingly, the inodes of the current version 500 and snapshot version 510 differ in that the snapshot version is governed by snapshot IDs 499 and 500 whereas, the current version is no longer governed by a snapshot. Finally, the LIN of the snapshot version is added to the LIN table 550. As depicted, LIN 9000 with snapshot ID 500 is added to the LIN table. Notably, snapshot ID 499 does not have to be added to the LIN table because snapshots 499 and 500 reference the same metatree locations.

Then, decision block 606 asks whether a file or a directory is being modified. Because a file is being modified, the file COW process 605 of FIG. 7D is called. The file COW process first asks whether a previous version of a file exists 641. In this example, previous versions corresponding to snapshot IDs 499 and 500 exist. Thus, decision block 642 asks whether there is a ditto record for the BADDR locations to be modified in the previous version. Because there have been no previous modifications to the file, all BADDR locations in the previous version include a ditto record. Thus, the ditto record from BADDR locations 300-600 in the snapshot version are removed 644 and the original data from BADDR locations 300-600 in the current version are copied to BADDR locations 300-600 in the snapshot version 645. Next, the BADDR locations 300-600 in the current version can be modified 646. Thus, the snapshot version includes ditto records for BADDR locations 0-300 514 and 601-1000 516. BADDR locations 300-600 515 includes references to the portion of the physical disk that stores the COWed data.

Figure 13C:
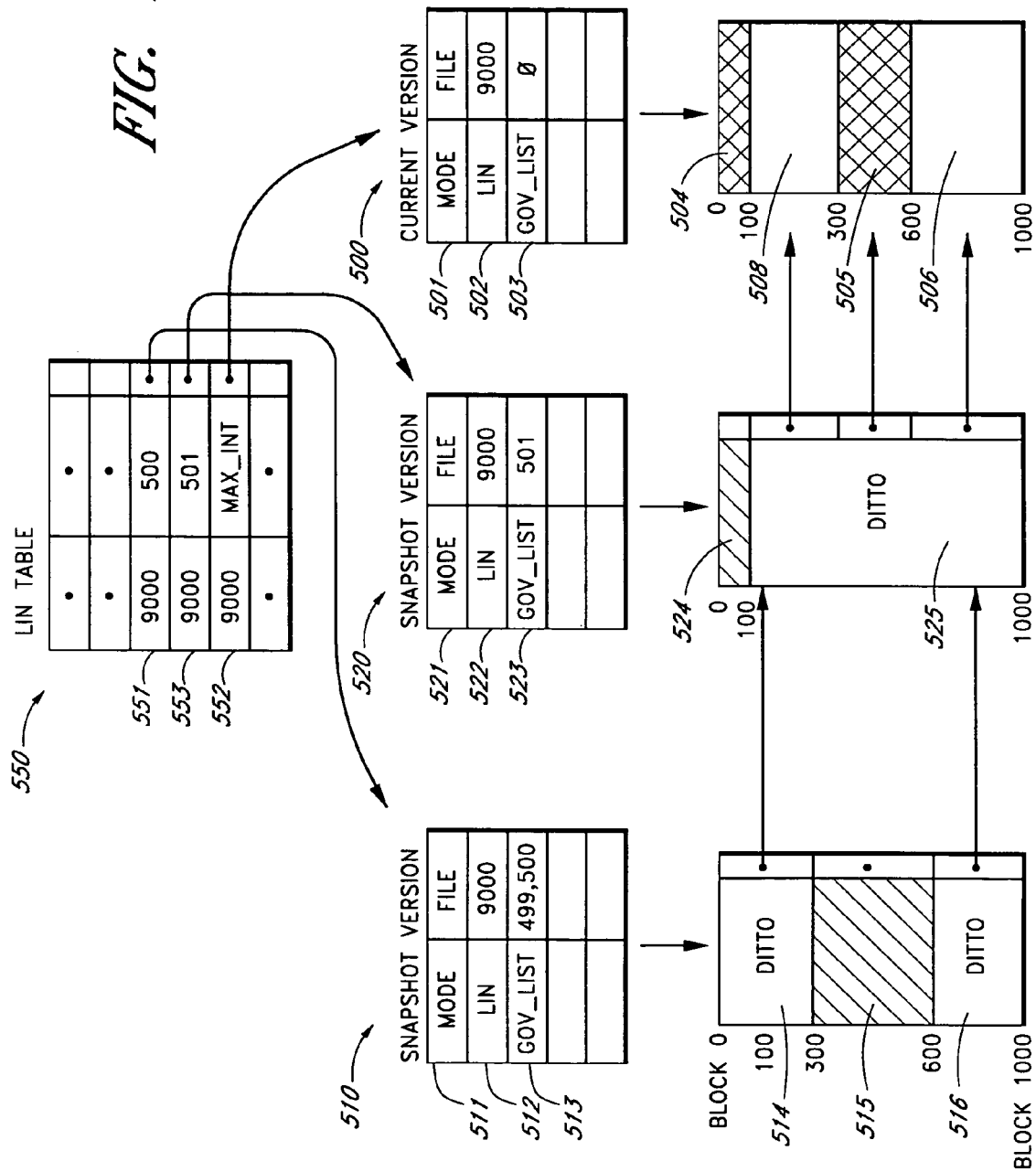

FIG. 13C illustrates an extension of the preceding example. The embodiment depicted shows the data structures associated with the snapshot versions 510, 520 and the current version 500 after the execution of two operations: a new snapshot was created, and then, the current version of the file was modified.

As discussed above with respect to FIGS. 13A and 13B, the snapshot creation process 400, adds the snapshot ID of the snapshot to the governance list of the current version 503. Assuming that the global snapshot count at the time the snapshot is taken is 501, snapshot ID 501 is added to the governance list of the current version and a snapshot tracking file associated with snapshot 501 (not shown) is created.

Next, a user or client application wishes to modify the data associated with BADDR locations 0-100 504 in the current version. Assuming that the global count is 501, the painting process 602 is bypassed because the snapshot ID, 501, is equal to the global count 621. Next, the LIN is added to the snapshot tracking file associated with snapshot 501 611, the inode of the current version is copied 612 so as to correspond to snapshot 501 520, and the new inode is added to the LIN table 613. As shown, the LIN table 550 includes new row 553 with the LIN/snapshot ID pair (9000, 501). This row 553 points to the inode associated with snapshot 501 520.

Next, because a file is being modified, the file COW process 605 is called. Because there exists a previous version of the file 641 with a ditto record in the BADDR locations to be modified 524, the data in BADDR locations 0-100 504 from the current version are copied to BADDR locations 0-100 524 of snapshot 501. Next, the data associated with BADDR locations 0-100 504 in the current version may be modified. Thus, in snapshot 501, BADDR locations 0-100 524 include a reference to the physical disk, and BADDR locations 101-1000 524 include ditto records.

Notably, in order to modify the current version governed by snapshot 501, changes to the metatrees associated with snapshot IDs 499 and 500 510 are not required. Therefore, snapshot version 500 is read in the following way: for BADDR locations 0-100, the ditto record references version 501 which includes references to the physical disk; for BADDR locations 101-300, ditto records in version 500 and 501 reference the current version which includes references to the physical disk; BADDR locations 301-600 include direct references to the physical disk; and for BADDR locations 601-1000, ditto records in version 500 and 501 reference the current version which includes references to the physical disk. Therefore, to read the entire contents of version 500, the metatrees for version 500, version 501 and the current version need to be accessed.

Figure 13D:
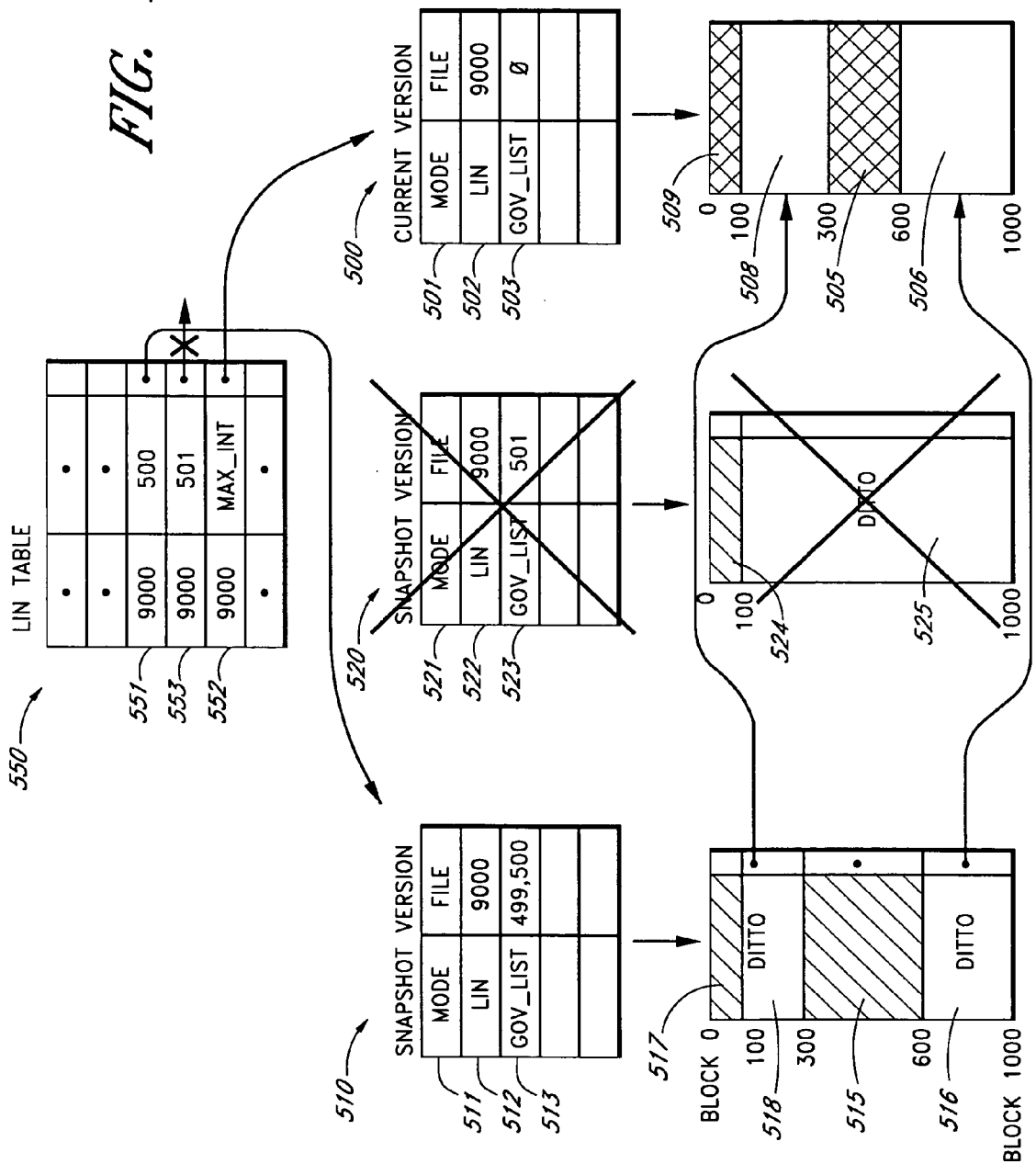

FIG. 13D illustrates an extension of the preceding example. The embodiment depicted shows the deletion of snapshot 501. Reference to FIG. 8 illustrates the operations executed in order to delete snapshot 501. After the delete snapshot request is accepted 482, for loop 483 considers each file or directory in the snapshot tracking file of snapshot 501. In this example, the root of the snapshot is a file that has no children. Therefore, the only entry in the snapshot tracking file of snapshot 501 corresponds to LIN 9000. Therefore, the operations in for loop 483 will execute only once. Decision block 484 asks whether there is a previous version of the file. Because snapshots 499 and 500 are previous versions of the file, the process proceeds to decision block 485 which determines that a file is under consideration. Next, the data from the snapshot to be deleted is copied to a previous version of the file. In the example, snapshot 501 stored real BADDR records only in locations 0-100. Therefore, only these records need to be copied to the same locations in the metatree 517 for snapshot 500.

Then, the inode and metatree associated with version 501 520 can be deleted 492, and the reference 553 in the LIN table to snapshot 501 can be deleted 493. In other embodiments, the entire row in the LIN table may be deleted. Because only one file was under consideration, for loop 483 ends 490 and the snapshot tracking file associated with snapshot 501 is deleted.

After the deletion of snapshot 501, a read operation on version 500 proceeds in the following manner. First, the inode of the file is received and each BADDR location in the region being read is considered. For locations 0-100 517, data can be accessed by performing a lookup of the BADDR locations on the physical disk 708 because a real BADDR record exists 706 for these locations. However, for BADDR locations 101-300 518, the next inode version needs to be read to find a real BADDR record. Thus, a lookup on the physical disk relies on real BADDR records 508. Similarly, a read on BADDR locations 301-600 515 occurs in a similar way to BADDR locations 0-100 517 because a real BADDR record exists. A read on BADDR locations 601-1000 516 occurs in a similar way to BADDR locations 101-300 518 because a ditto record exists.

b. Directory Operations

Figure 14A:
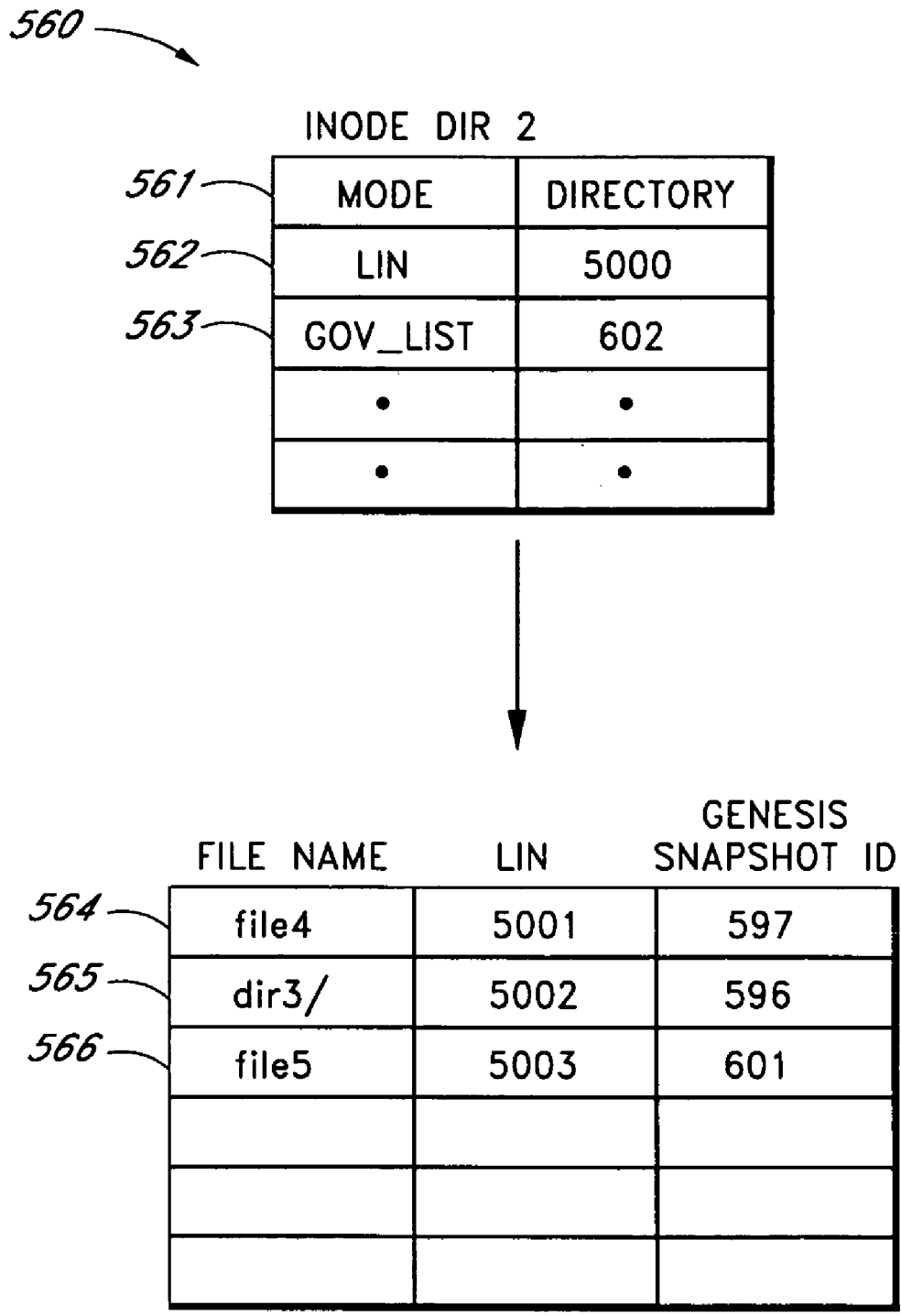
FIGS. 14A-D illustrate one embodiment of data structures for one embodiment of creating snapshots of a directory, modifying the directory, and deleting a snapshot of the directory.

FIG. 14A illustrates one embodiment of a directory, dir2/, governed by snapshot 602. When the directory was created, the inode 560 included an empty set in its governance list 563. The metatree for dir2/includes entries 564, 565, 566 associated with its child inodes. For example, file4 with LIN 5001 was added when the global snapshot count was 597; dir3/with LIN 5002 was added when the global snapshot count was 596; and file5 with LIN 5003 was added when the global snapshot count was 601. Note the deviation from the example file hierarchy in FIG. 2A (such as, in FIG. 14A, file5 is a child of dir2/).

Assuming the global snapshot count is 602 at the time the first snapshot of dir2/is created, creation of a snapshot with a root of dir2/first creates a snapshot tracking file 403 and adding snapshot ID 602 to the snapshot tracking file 404. Then, a mini-snapshot for each parent of dir2/to the root is created 406, 407, 408 because dir2/is not the root of the file system 405. Next, snapshot ID 602 is added 409 to the governance list 563 of the current version of dir2/409.

Figure 14B:
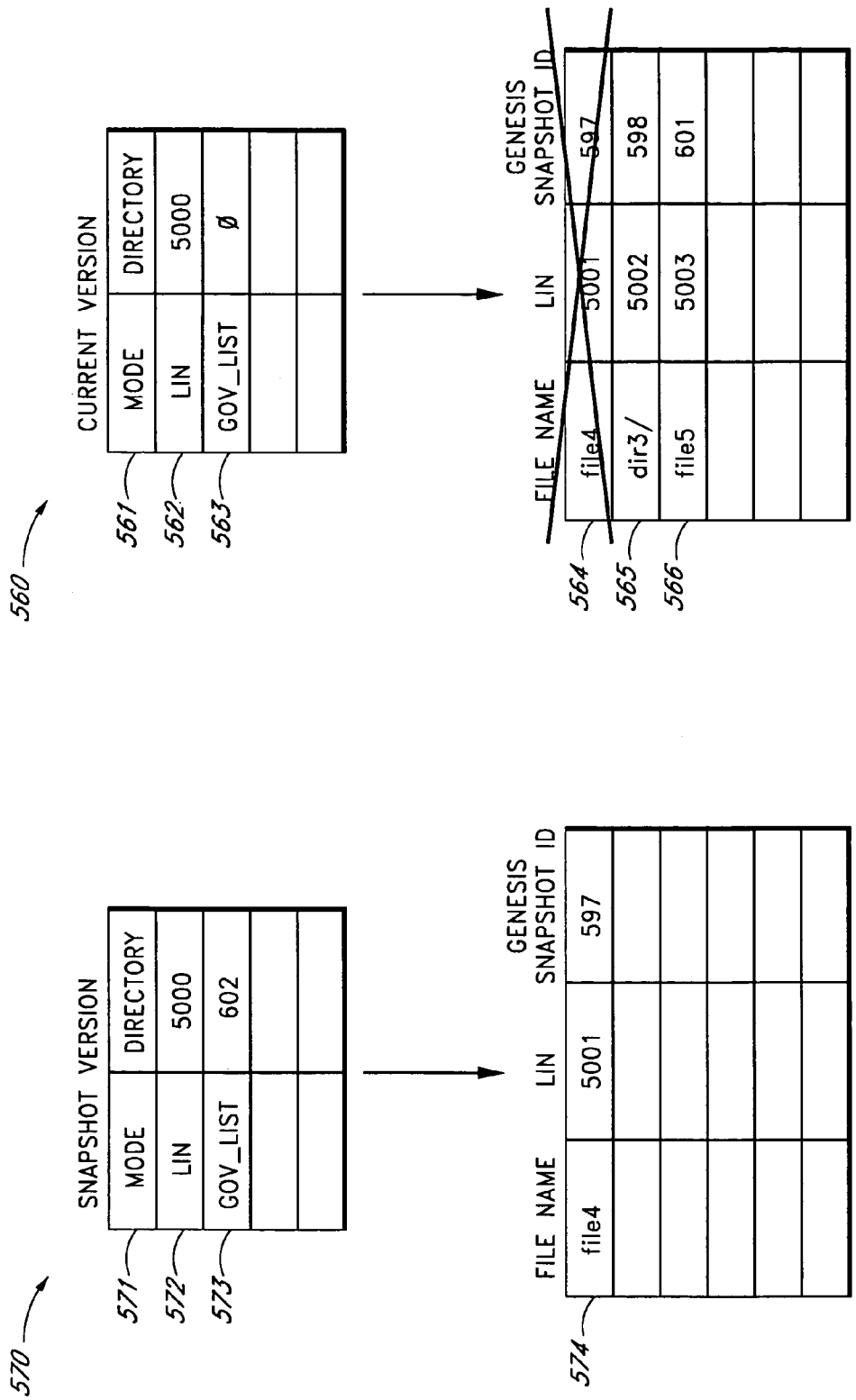

FIG. 14B illustrates an extension of the preceding example. The depicted embodiment shows the inode/metatree pair 570 associated with snapshot 602 and the inode/metatree 560 pair associated with the current version after file4 has been deleted from the current version. FIG. 7A provides one embodiment of the operations for deleting file4 from the current version. First, assuming the global snapshot count is 602, the painting process 602 is skipped because the snapshot ID, 602, is equal to the global snapshot count 621. Next, a snapshot version of dir2/is created by the create snapshot version of file/dir process 604. Process 604 adds the LIN of file4, 5001, to the snapshot tracking file 611 associated with snapshot 602; makes a copy of the inode of the current version 612; and adds the LIN/snapshot ID pair, (5000, 602) to the LIN table (not shown). Notably, when the inode is copied, the governance list of the snapshot version 573 is 602, and the governance list of the current version 563 includes an empty set.

Then, the directory COW process 607 is executed because a file included in dir2/is being modified. When removing an entry 651, the directory COW process asks 654 whether the genesis snapshot ID of file4 is more recent than the snapshot 602. Because the genesis snapshot ID of file4 is 597 and the governing snapshot ID is 602, the entry for file4 is copied 655 to the same key location 574 in the metatree for snapshot 602. Next, file4 is removed from the current version 655. Generally, after a file is modified, the genesis snapshot ID of the file in the current version is set to the global snapshot count 657. However, in this example, the genesis snapshot ID for file4 is not set to the global snapshot count because file4 was deleted from the current version.

Figure 14C:
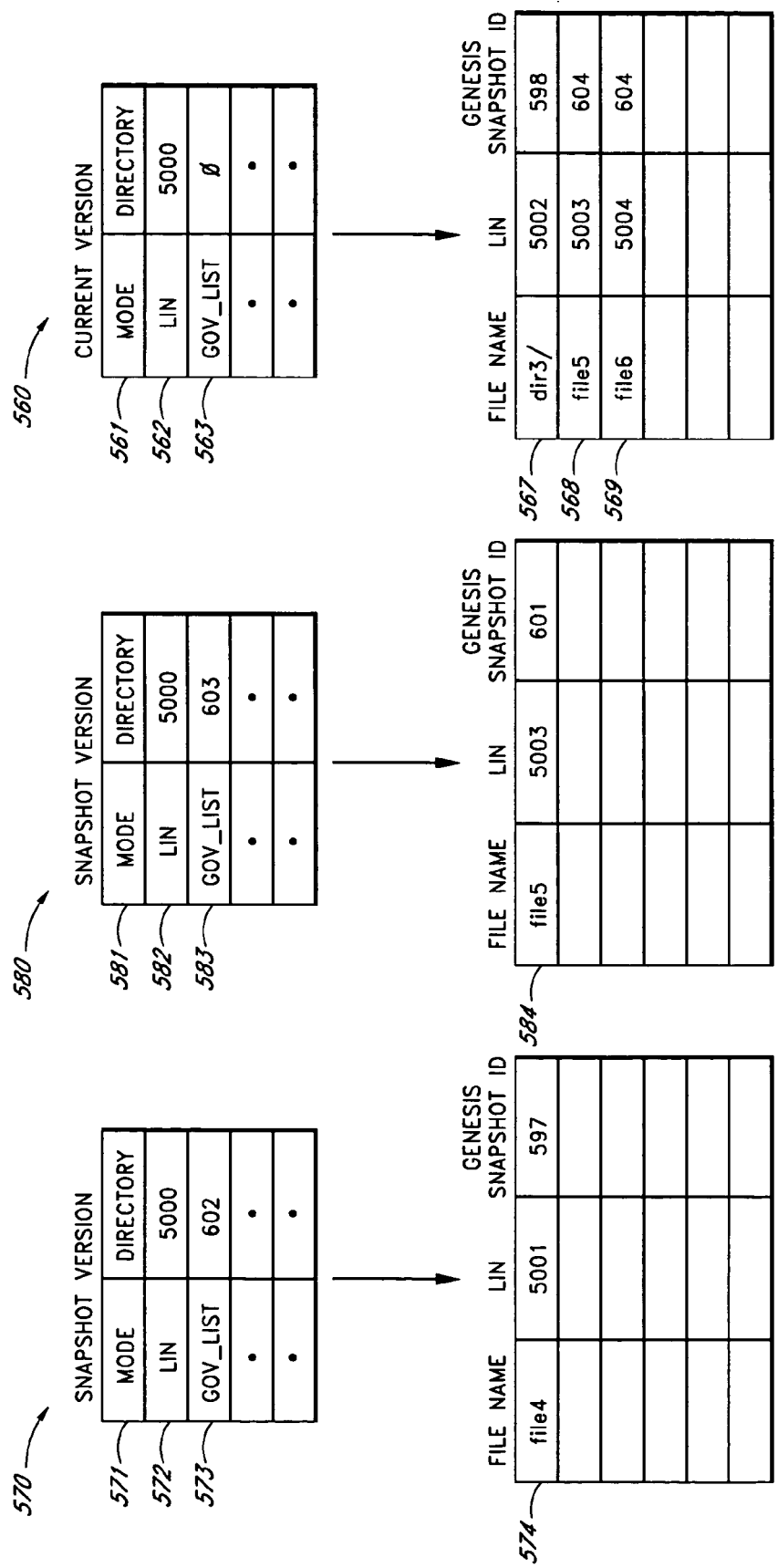

FIG. 14C illustrates an extension of the preceding example. The illustrated embodiment shows the inodes/metatree pairs associated with snapshot 602 570, snapshot 603 580 and the current version 560 after the following operations have executed in the recited order: (1) a snapshot was created when the global count was 603, (2) file5 was modified when the global snapshot count was 604, and (3) file6 was added when the global snapshot count was 604.

As discussed above with respect to FIGS. 14A and 14B, snapshot 603 is created by adding snapshot ID 603 to the governance list of the current version. Additionally, a snapshot tracking file with snapshot ID 603 is created. Then, when a request to modify file5 is accepted, the inode of the current version is copied. The copied inode 580 includes the snapshot ID 603 in its governance list 583, and the governance list of the current version 563 includes an empty set. Before file5 can be modified, it is copied to snapshot 603 because its snapshot ID is greater than genesis snapshot ID 601 of file5. After the COW 655 is complete, file5 is modified in the current version 656. Accordingly, the genesis snapshot ID of file5 in the current version 568 is set to global count 604, indicating when file5 was last modified.

Next, file6 with LIN 5004 is added to dir2/when the global count was 604. FIG. 7E illustrates how an entry may be added to a directory governed by a snapshot. First, the entry is added to the metatree associated with the inode of the current version 652. Then, in the LIN table, the snapshot ID for the entry is the same as the snapshot ID of the current version 653. Also, the genesis snapshot ID of file6 569 in the metatree of the current version of dir2/is set to the global count.

In order to perform a lookup operation for a particular file or directory in a particular version of dir2/, the directory lookup process 800 first receives the target file or directory and the LIN/snapshot ID pair of the relevant directory 803. For example, assume that the target file or directory is file5 and that the lookup operation is directed to the version 602 of dir2/, snapshot ID pair (5000, 602).

For loop 804 first examines snapshot 602 and determines that there is no matching entry in the local portion of the tree 806. Next, snapshot 603 is considered. A matching entry for file5 exists in the local portion of the tree 806. Thus, to determine if the matching entry was included in the current version of dir2/, decision block 807 asks whether the snapshot ID is less than the snapshot ID of the relevant version. Here, the snapshot ID for file5 in snapshot 603 is 601, and the snapshot ID of the relevant version is 602. Therefore, the for loop breaks 809 and the location and/or the path of file5 with genesis snapshot ID 601 is returned.

In order to perform a read directory operation for a particular version of dir2/, the read directory process 900 first receives the inodes for the snapshot versions that have snapshot IDs greater than the snapshot ID of the relevant version. For example, assume that the read directory operation is directed to snapshot 603 of the dir2/. Accordingly, the inodes for snapshot 603 and the current version are received. To retrieve each entry in version 603 of dir2/, the read directory operation examines each entry 906 in each received inode version 905. If the genesis snapshot ID of the considered entry is less than or equal to the snapshot ID of the relevant version 909, the process returns the name of the entry 916. However, if the snapshot ID of the entry is greater than the snapshot ID of the relevant entry, the process considers the next entry 911.

In the illustrated example, the process first considers file5 in version 603. It is returned as an entry in this version of dir2/because its snapshot ID, 601, is less than the relevant snapshot ID, 603. Similarly, the snapshot ID of each entry in the current version is considered. Therefore, dir3/is the only entry returned because the entries for file5 and file6 each have snapshot IDs greater than the snapshot ID of the relevant version. Thus, a read directory operation for the entire contents of snapshot version 603 of dir2/would indicate that dir2/includes file5 (with genesis snapshot ID 601) and dir3/ (with genesis snapshot ID 598).

Figure 14D:
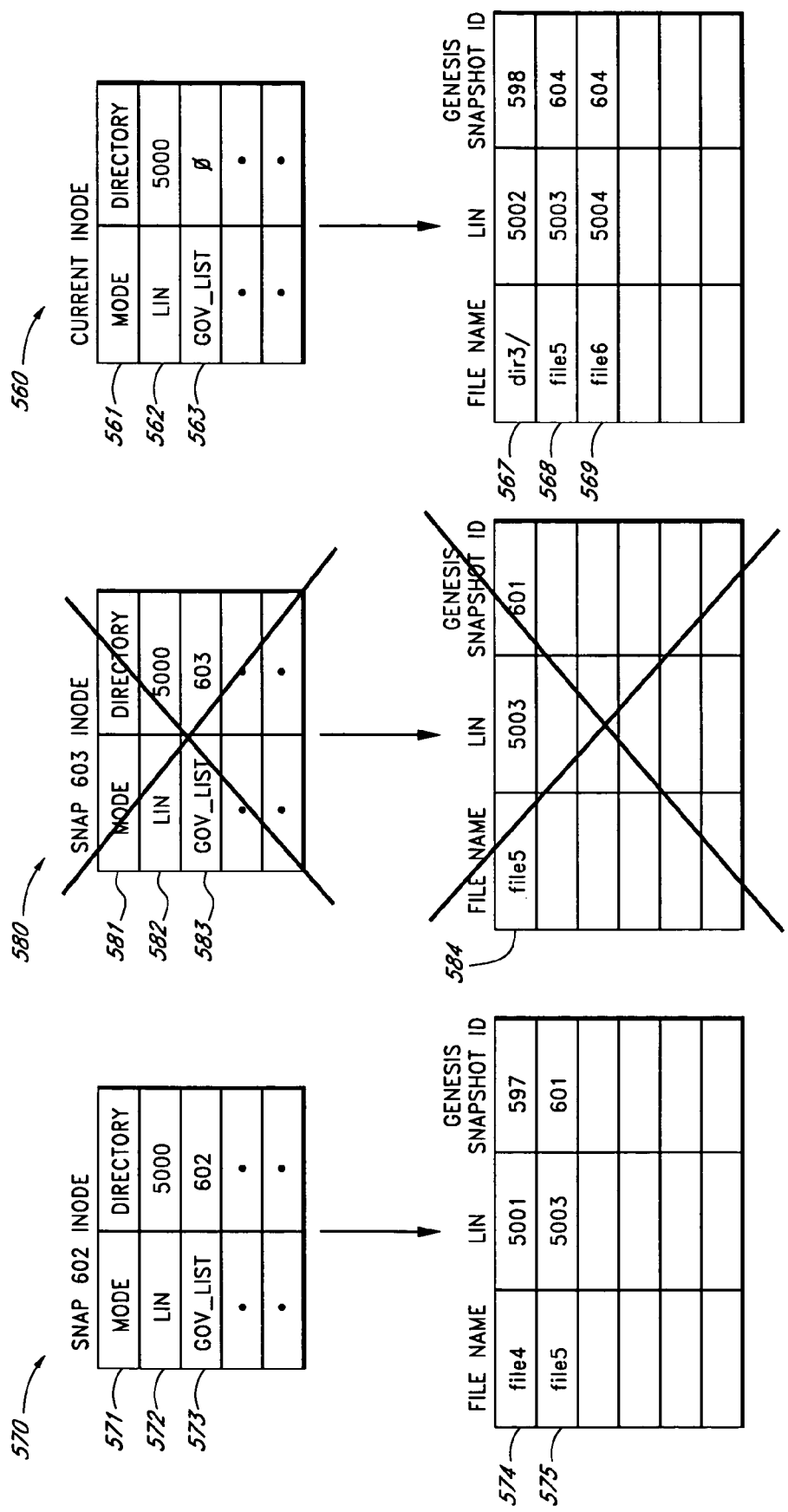

FIG. 14D illustrates an extension of the preceding example. In the depicted embodiment, the metatrees associated with snapshot 602 570 and the current version 560 are shown after snapshot 603 has been deleted. In order to delete snapshot 603, each file or directory in the snapshot tracking file for snapshot 603 is visited 483. Here, the only file in the snapshot tracking file for snapshot 603 is file5 with genesis snapshot ID 601. Thus, because a previous version, snapshot 602, of dir2/exists and file5 is a file, the entry in snapshot 603 is copied to snapshot 602. Then, the inode and metatree for snapshot version 603 of file5 is deleted 492, and the entry associated with the LIN/snapshot ID pair (5003, 603) is deleted from the LIN table 493. Afterward, the snapshot tracking file, inode and metatree associated with snapshot 603 of dir2/are deleted 494.

XIII. Other Embodiments

While certain embodiments of the invention have been described, these embodiments have been presented by way of example only, and are not intended to limit the scope of the present invention. Accordingly, the breadth and scope of the present invention should be defined in accordance with the following claims and their equivalents.

By way of example, the following alternatives are also contemplated. Although the data structures described herein have been directed to a distributed system, some embodiments of the invention may be used in a single file system. Additionally or alternatively, it will be recognized by one with ordinary skill in the art that the depicted embodiments may be modified to accommodate file structures under the logical model, physical model, hybrid model and/or log-based model. Further, in addition to adding the snapshot ID to the root of the snapshot upon snapshot creation, the snapshot ID may be added to some or all of the files and directories governed by the snapshot. Additionally, it is recognized that the root of a snapshot can be a single file or directory or more than one file or directory. Embodiments of a systems and methods for performing a reverse lookup are disclosed in U.S. patent application Ser. No. 12/554,752 [ISIL.0016A], titled "SYSTEMS AND METHODS OF REVERSE LOOKUP," filed on the same day as this application and is hereby incorporated by reference in its entirety.

The above-mentioned alternatives are examples of other embodiments, and they do not limit the scope of the invention. It is recognized that a variety of data structures with various fields and data sets may be used. In addition, other embodiments of the flow charts may be used.

What is claimed is:

1. A method of preserving a file or directory stored in a processor-accessible storage system as of a point in time, the method comprising:

accessing, by a computer processor, a target metadata node associated with the file or directory in a file system, the file system comprising multiple metadata nodes arranged in a logical hierarchy, one or more of the metadata nodes comprising a governance list, the governance list comprising one or more snapshot identifiers, each snapshot identifier uniquely identifying a snapshot governing the file or directory and indicating when the snapshot was taken, each snapshot identifier based on a global count of the file system at a time when its corresponding snapshot was taken, the global count indicating a time relative to when a snapshot is taken;

comparing, by the computer processor, the most recent snapshot identifier of the governance list of the target metadata node with the global count of the file system, the most recent snapshot identifier indicating when the most recent snapshot was taken relative to the global count;

based on the comparison of the most recent snapshot identifier to the global count, determining, by the computer processor, that one or more ancestors of the target metadata node must be accessed;
accessing, by the computer processor, at least one ancestor metadata node of the target metadata node;
determining, by the computer processor, that a snapshot identifier of the governance list of the at least one ancestor metadata node is more recent than the most recent snapshot identifier of the governance list of the target metadata node; and
adding, by the computer processor, the more recent snapshot identifier of the governance list of the at least one ancestor metadata node to the governance list of the target metadata node.

2. The method of claim 1 wherein the comparison is performed after receiving a request to modify at least a portion of the file or directory.

3. The method of claim 2, wherein the adding is performed prior to any modification of the at least a portion of the file or directory.

4. The method of claim 1 wherein the determining that one or more ancestors of the target metadata node must be accessed comprises determining that the target metadata node does not correspond to a root of the file system and that the most recent snapshot identifier of the governance list of the target metadata node is different than the global count.

5. The method of claim 1 wherein the accessing at least one ancestor metadata node comprises traversing ancestor metadata nodes of the target metadata node from the target metadata node toward a root metadata node corresponding to the root of the file system until either an ancestor metadata node is accessed which is not out-of-date or the root metadata node is accessed.

6. The method of claim 5, wherein each ancestor metadata node comprises an indication of the relative time that the governance list of the ancestor metadata node was last updated, the method further comprising determining that an ancestor metadata node is not out-of-date if the indication of the ancestor metadata node is greater than or equal to the global count.

7. The method of claim 1, further comprising:
accessing at least one different version of the target metadata node;
determining that a snapshot identifier of the governance list of the at least one different version is more recent than the most recent snapshot identifier of the governance list of the target metadata node; and
adding the more recent snapshot identifier of the governance list of the at least one different version to the governance list of the target metadata node.

8. The method of claim 1, wherein the at least one ancestor metadata node comprises at least two ancestor metadata nodes and the method further comprises:
determining that a snapshot identifier of the governance list of a first node of the at least two ancestor metadata nodes is more recent than a most recent snapshot identifier of the governance list of a second node of the at least two ancestor metadata nodes, the first node being an ancestor of the second node; and
adding the more recent snapshot identifier of the governance list of the first node to the governance list of the second node.

9. The method of claim 1, further comprising updating an indication in the target metadata node based on the global count, the indication indicating the relative time that the governance list of the target metadata node was last updated.

10. A system for tracking snapshots of a file system, the system comprising:
at least one computer processor;
at least one memory;
a file structure comprising a plurality of files and directories that are logically stored in a tree on the at least one memory;
a plurality of metadata structures, each metadata structure corresponding to a file or directory of the file structure, each metadata structure comprising a governance list, the governance list comprising one or more snapshot identifiers, each snapshot identifier uniquely identifying a snapshot governing the file or directory and indicating when the snapshot was taken, each snapshot identifier based on a global count of the file system at a time when its corresponding snapshot was taken, the global count indicating a time relative to when a snapshot is taken;
at least one executable software module executed by the at least one computer processor and configured to:
access a target metadata structure corresponding to a target file or directory of the file structure;
compare the most recent snapshot identifier of the governance list of the target metadata structure with the global count of the file system, the most recent snapshot identifier indicating when the most recent snapshot was taken relative to the global count;
based on the comparison of the most recent snapshot identifier to the global count, determine that one or more ancestors of the target metadata structure must be accessed;
access at least one ancestor metadata structure of the target metadata structure;
determine that a snapshot identifier of the governance list of the at least one ancestor metadata structure is more recent than the most recent snapshot identifier of the governance list of the target metadata node; and
add the more recent snapshot identifier of the governance list of the at least one ancestor metadata structure to the governance list of the target metadata structure.

11. The system of claim 10, wherein the at least one executable software module is further configured to:
receive a request to modify at least a portion of the target file or directory;
perform said comparison if a request to modify at least a portion of the target file or directory is received.

12. The system of claim 11, wherein the at least one executable software module is further configured to perform said addition prior to any modification of the at least a portion of the target file or directory.

13. The system of claim 10, wherein the at least one executable software module is configured to determine that one or more ancestors of the target metadata structure must be accessed if the target metadata structure does not correspond to a root of the file structure and the most recent snapshot identifier of the governance list of the target metadata structure is different than the global count.

14. The system of claim 10, wherein the at least one executable software module is configured to access the at least one ancestor metadata structure by traversing the ancestor metadata structures of the target metadata structure from the target metadata structure toward a root metadata structure corresponding to the root of the file structure until either an ancestor metadata structure is accessed which is not out-of-date or the root metadata structure is accessed.

15. The system of claim 14, wherein each ancestor metadata structure comprises an indication of the relative time that the governance list of the ancestor metadata structure was last updated, and the at least one executable software module is configured to determine that an ancestor metadata node is not out-of-date if the indication of the ancestor metadata node is greater than or equal to the global count.

16. The system of claim 10, wherein the at least one executable software module is further configured to:
  access at least one different version of the target metadata structure;
  determine that a snapshot identifier of the governance list of the at Least one different version is more recent than the most recent snapshot identifier of the governance list of the target metadata structure; and
  add the more recent snapshot identifier of the governance list of the at least one different version to the governance list of the target metadata structure.

17. The system of claim 10, wherein the at least one ancestor metadata structure comprises at least two ancestor metadata structures and the at least one executable software module is further configured to:
  determine that a snapshot identifier of the governance list of a first structure of the at least two ancestor metadata structures is more recent than a most recent snapshot identifier of the governance list of a second structure of the at least two ancestor metadata structures, the first structure being an ancestor of the second structure; and
  add the more recent snapshot identifier of the governance list of the first structure to the governance list of the second structure.

18. The system of claim 10, wherein the at least one executable software module is further configured to update an indication in the target metadata structure based on the global count, the indication indicating the relative time that the governance list of the target metadata structure was last updated.

* * * * *

UNITED STATES PATENT AND TRADEMARK OFFICE
CERTIFICATE OF CORRECTION

| | |
|---|---|
| PATENT NO. | : 7,680,836 B2 |
| APPLICATION NO. | : 11/506610 |
| DATED | : March 16, 2010 |
| INVENTOR(S) | : Robert J. Anderson et al. |

It is certified that error appears in the above-identified patent and that said Letters Patent is hereby corrected as shown below:

On page 2, column 1, line 49, Under U.S. Patent Documents, change "9/2001" to --9/2002--.

On page 3, column 2, line 68, Under Other Publications, change "Palto Alto" to --Palo Alto--.

On page 4, column 1, line 27, Under Other Publications, change "2007" to --2006--.

On page 4, column 1, line 35, Under Other Publications, change "2006" to --2007--.

On page 4, column 1, line 40, Under Other Publications, change "Plateform" to --Platform--.

On page 4, column 2, line 24, Under Other Publications, change "9-6" to --9-16.--.

In column 9, line 11 (approx.), Change "Per1" to --Perl--.

In column 10, line 58-59, Change "/ifs/data/dir2/dir/3/file6" to --/ifs/data/dir2/dir3/file6--.

In column 11, line 9, Change "snapshot/244)." to --.snapshot/244).--.

In column 11, line 18, Change "snapshot/directory" to --.snapshot/directory.--.

In column 11, line 63, Change "snapshot/subdirectories" to --.snapshot/subdirectories--.

In column 11, line 64, Change "snapshot/subdirectory" to --.snapshot/subdirectory--.

In column 13, line 52, Change "includes" to --include--.

In column 13, line 59-60, Change "3 10," to --310--.

In column 35, line 9, In claim 16, change "Least" to --least--.

Signed and Sealed this

Twenty-first Day of September, 2010

David J. Kappos
*Director of the United States Patent and Trademark Office*